(12) United States Patent
Harif

(10) Patent No.: US 8,317,436 B2
(45) Date of Patent: Nov. 27, 2012

(54) CUTTING TOOL HOLDER AND A CUTTING INSERT THEREFOR

(75) Inventor: Gershon Harif, Ramat Gan (IL)

(73) Assignee: No Screw Ltd, Holon (IL)

(*) Notice: Subject to any disclaimer, the term of this patent is extended or adjusted under 35 U.S.C. 154(b) by 954 days.

(21) Appl. No.: 12/314,428

(22) Filed: Dec. 10, 2008

(65) Prior Publication Data

US 2009/0092451 A1  Apr. 9, 2009

Related U.S. Application Data

(63) Continuation-in-part of application No. PCT/IL2008/000778, filed on Jun. 5, 2008.

(30) Foreign Application Priority Data

| Jun. 6, 2007 | (IL) | 183721 |
| Jun. 20, 2007 | (IL) | 184091 |
| Jul. 19, 2007 | (IL) | 184742 |
| Oct. 10, 2007 | (IL) | 186569 |
| Mar. 11, 2008 | (IL) | 190100 |
| Mar. 19, 2008 | (IL) | 190316 |

(51) Int. Cl.
 *B23C 5/16* (2006.01)
 *B23C 5/22* (2006.01)

(52) U.S. Cl. ............. 407/113; 407/103

(58) Field of Classification Search ............. 407/48, 407/103, 104, 105, 113, 114, 115, 116, 117
See application file for complete search history.

(56) References Cited

U.S. PATENT DOCUMENTS 5,167,473 A * 12/1992 Barnett ............. 407/104
7,168,895 B2 * 1/2007 Koskinen et al. ........ 409/140
(Continued)

FOREIGN PATENT DOCUMENTS

DE  1 602 799  4/1970
(Continued)

*Primary Examiner* — Will Fridie, Jr.
(74) *Attorney, Agent, or Firm* — Vorys, Sater, Seymour and Pease LLP; Suanne M. Hopkins; William L. Klima

(57) ABSTRACT

A cutting tool holder adapted for mounting thereon a cutting insert having a top face, a bottom face and formed with an insert bore having an inner surface extending between the top and the bottom face. The holder comprises a seat defined by a bottom surface and at least one side wall angled to the bottom surface, a seat bore with a bore axis having an open end at the bottom surface of the seat, and a securing mechanism for securing the cutting insert in the seat. The securing mechanism comprises a securing pin received within the seat bore and having a body with an outer surface extending between a proximal end and a distal end of the body and defining a pin axis therealong. The securing mechanism further comprises a displacement arrangement adapted for axially displacing the securing pin along the bore axis of the seat bore between at least a first, mounting position in which the distal end protrudes from within the seat bore through the bottom surface into the seat to a first extent so as to allow the cutting insert to be placed within the seat, having its bottom face aligned against the bottom surface, and a second, securing position in which the distal end protrudes from within the seat bore through the bottom surface into the seat to a second extent, greater than the first extent, so as to engage the inner surface of the insert bore, thereby securing the insert in place.

24 Claims, 59 Drawing Sheets

U.S. PATENT DOCUMENTS

| | | | |
|---|---|---|---|
| 7,168,896 B2 * | 1/2007 | Koskinen et al. | 409/140 |
| 7,217,070 B2 * | 5/2007 | Hecht | 408/154 |
| 7,597,509 B2 * | 10/2009 | Sheffler et al. | 407/103 |
| 7,775,750 B2 * | 8/2010 | Satran et al. | 407/113 |
| 2005/0152754 A1 * | 7/2005 | Wiman et al. | 407/103 |
| 2010/0104384 A1 * | 4/2010 | Orlov et al. | 407/41 |
| 2011/0103905 A1 * | 5/2011 | Morrison et al. | 407/48 |

FOREIGN PATENT DOCUMENTS

| | | |
|---|---|---|
| EP | 0 146 030 A2 | 6/1985 |
| EP | 1 190 795 A1 | 3/2002 |
| GB | 1 479 433 | 7/1977 |
| JP | 2001113408 | 4/2001 |
| WO | WO 03/022495 A1 | 3/2003 |
| WO | WO 2005/037474 A1 | 4/2005 |

\* cited by examiner

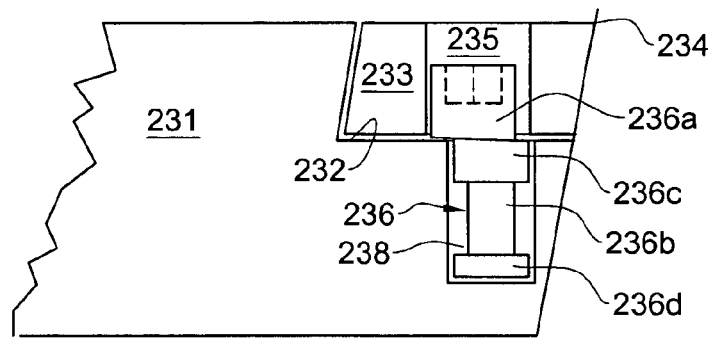
FIG. 30A
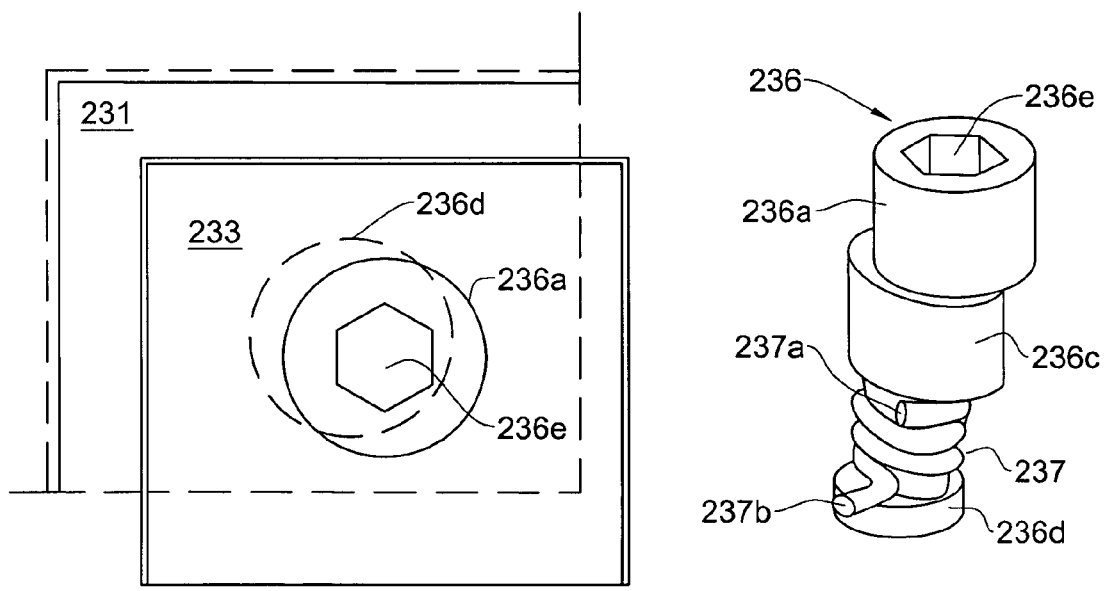
FIG. 30B
FIG. 30C

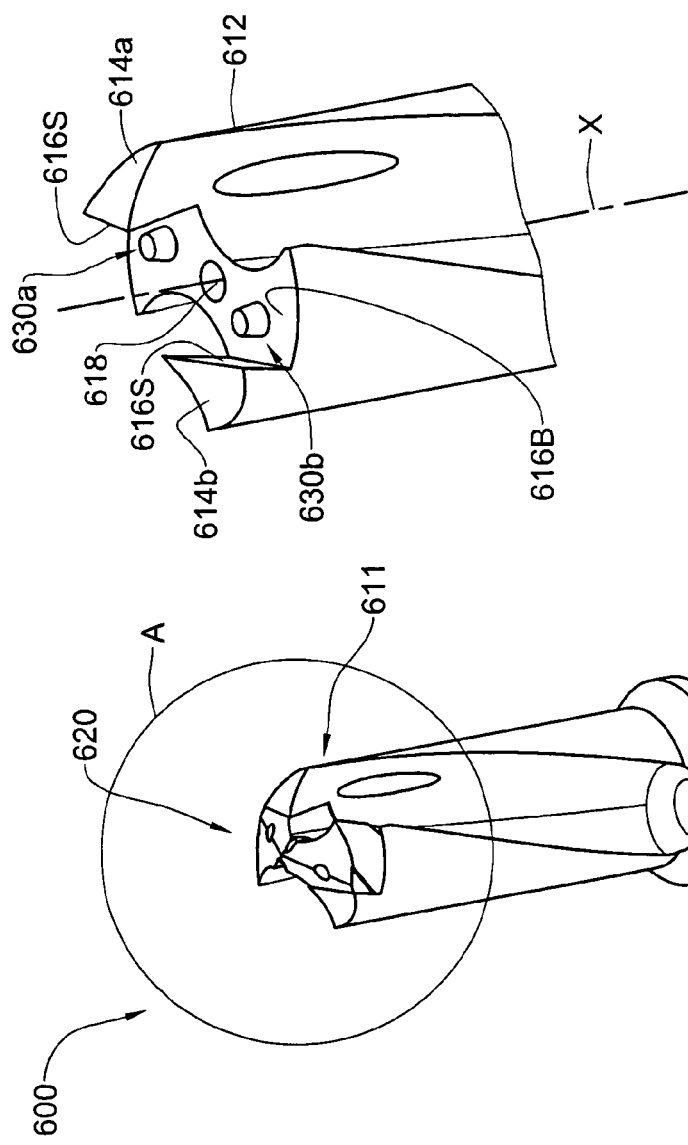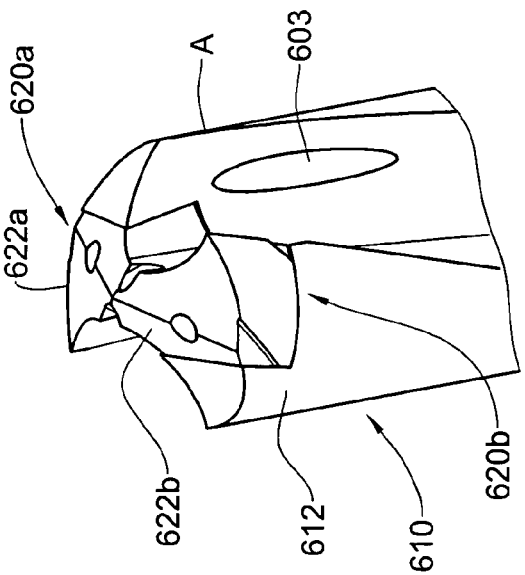
FIG. 45C
FIG. 45B
FIG. 45A

CUTTING TOOL HOLDER AND A CUTTING INSERT THEREFOR

This application is a Continuation-in-Part of International Application No. PCT/IL2008/000778 filed Jun. 5, 2008.

FIELD OF THE INVENTION

The present application relates variations and improvements in cutting tools, cutting tool holders and cutting inserts, in particular to securing arrangements for cutting inserts.

BACKGROUND OF THE INVENTION

The cutting edges of cutting tools wear rapidly when used for cutting operations, particularly when cutting hard materials such as metal, and therefore they must be frequently replaced or resharpened. In many types of cutter machines, such as milling machines, the cutting tool includes a plurality of such cutting edges formed in cutting inserts which are fixed within seats in the cutting tool. Each such cutting insert usually includes a plurality of cutting edges, which are sequentially oriented in cutting operations by indexing the cutting insert within the respective seat of the cutting tool.

In the conventional cutting tool, the cutting insert is attached within the seat of the cutting tool by a fastener passing through a bore in the cutting insert into the bottom of the seat in the cutting tool. Indexing the cutting insert to enable the use of another cutting edge requires the removal of the fastener, the reorientation of the cutting insert, and the reattachment of the cutting insert within the seat of the cutting tool. Each of these operations involves time and labor, and since cutting tools generally include a plurality of such cutting inserts, the time and labor costs involved in indexing the cutting inserts in a cutting tool are considerable.

SUMMARY OF THE INVENTION

An object of the present invention is to provide a cutting tool, and a cutting insert therefor, which enable indexing of the cutting insert to be effected in a minimum of time and with a minimum of labor. Another object of the invention is to provide a cutting tool, and a cutting insert thereof, which do not require the use of a separate fastener to be inserted and removed in order to permit the mounting of the cutting insert onto the cutting tool, as well as attachment and detachment of the cutting insert during an indexing operation.

According to one aspect of the present invention, there is provided a cutting tool holder adapted for mounting thereon a cutting insert having a top face, a bottom face and formed with an insert bore having an inner surface extending between said top and said bottom face; said holder comprising a seat defined by a bottom surface and at least one side wall angled to said bottom surface, a seat bore with a bore axis having an open end at the bottom surface of said seat, and a securing mechanism for securing said cutting insert in said seat, said securing mechanism comprising a securing pin received within said seat bore and having a body with an outer surface extending between a proximal end and a distal end of the body and defining a pin axis therealong, and a displacement arrangement adapted for axially displacing said securing pin along the bore axis of said seat bore between at least a first, mounting position in which said distal end protrudes from within the seat bore through said bottom surface into said seat to a first extent so as to allow said cutting insert to be placed within the seat, having its bottom face aligned against said bottom surface, and a second, securing position in which said distal end protrudes from within the seat bore through said bottom surface into said seat to a second extent, greater than said first extent, so as to engage the inner surface of said insert bore, thereby securing said insert in place.

It should be understood that the term 'aligned' refers to a configuration in which said bottom face and said bottom surface are generally parallel to one another. It should also be understood that said bottom face and bottom surface do not necessarily have to be in contact with one another, i.e. may be spaced from one another.

In addition, it is to be further understood that the term 'mounting position' is used hereinafter to define a position allowing not only mounting of the cutting insert onto the holder, but also dismounting of the cutting insert therefrom, as well as releasing the cutting insert to a certain extent allowing changing orientation thereof.

The arrangement may be such that in both positions said proximal end may be located within said seat bore. Alternatively, according to another example, said seat bore may be adapted for receiving an intermediary arrangement having a bore adapted to receive said securing pin, in which case in both positions, said proximal end located within the bore of said intermediary arrangement.

Said cutting insert may be further formed with a side face, wherein when the cutting insert is secured within the seat of the cutting tool holder, the securing pin is adapted to apply pressure on the inner surface of said insert bore so as to facilitate firm engagement of said at least one side face with said at least one side wall of said seat. Said cutting insert may further be formed with another side face comprising a cutting edge.

The arrangement of said securing pin and the inner surface of said cutting insert may be such that the pin axis is angled to the inner surface of said cutting insert to thereby apply pressure to said inner surface in the direction of said at least one side wall, i.e. such that a portion of the cutting insert defined between the inner surface and said at least one side face facing the side wall of said seat is fastened between the distal end of said securing pin and said side wall. Such an arrangement may be achieved by any of the following configurations:

the securing pin has a surface portion pin axis is perpendicular to the bottom surface of said seat and the inner surface of said cutting insert is angled to bottom face thereof;

the pin axis is angled to the bottom surface, i.e. not perpendicular thereto and the inner surface of said cutting insert is perpendicular to said bottom face; and both the pin axis and the inner surface are angled, i.e. not perpendicular, to the bottom surface of the seat and the bottom face of the cutting insert respectively.

It should also be noted in this connection that the angle between the bottom surface of said seat and said at least one side wall is not limited to an acute angle and may be a straight angle (90°) and may even be an obtuse angle.

Said displacement arrangement may be an arrangement separate from the securing pin adapted to mechanically engage the securing pin, or the proximal end thereof, such that displacement of the arrangement entails displacement of the securing pin in the axial direction. Examples of such arrangement may be a biasing spring, a bolt or a wedge adapted to press against the securing pin.

In particular, when a biasing spring is used as suggested above, it may be arranged such that the securing pin is constantly urged by the biasing spring into said securing position. Thus, switching the securing pin's position to the mounting position may be achieved by simple depression of the biasing spring.

According to another aspect of the present invention there is provided a securing pin and a biasing spring formed with means adapted for preventing disengagement of the securing pin from a cutting tool holder, by firm engagement of the biasing spring with the securing pin at one end thereof and firm engagement of the biasing spring with the cutting tool holder at another end thereof.

Before the cutting insert is mounted onto the cutting tool holder seat, in order to displace the securing pin from its securing position into its mounting position, the securing pin may be depressed by the cutting insert itself, such that the bottom face of the cutting insert applies pressure thereon. Thereafter, the cutting insert may be displaced laterally (all the time maintaining the securing pin within the seat bore) until the bore of the cutting insert is aligned with the securing pin, causing the securing pin's displacement back into its securing position by virtue of the biasing spring. Thus, displacement of the securing pin back into its securing position is achieved solely due to interaction of the pin with the cutting insert, requiring no additional tool or operation.

Specifically, in order to release a cutting insert from the holder, depression of the biasing spring may be achieve by applying pressure on the securing pin. According to one example, the cutting insert may be formed such that the insert bore is open at both ends, i.e. at the top and bottom face, wherein a pressure instrument may be inserted into the bore through the top face of the insert to apply pressure to the distal end of the securing pin for depression of the biasing spring. According to another example, said securing pin may be formed with a nook and said holder or said cutting insert is formed with a recess, arranged so as to be aligned with said nook at said securing position. Thus, a pressure instrument may be inserted into said recess to be received within said nook and apply pressure to said securing pin for depression of the biasing spring.

Alternatively, the securing pin may be integrally formed with the displacement arrangement, such that displacement of the pin in a certain direction entails its axial movement. One example of such an arrangement may be one in which said securing pin is formed with an external thread receivable within an inner thread of said seat bore such that rotation of the pin entails progression thereof along the axial direction. The securing pin may be formed at one of its ends with a bolt head adapted for receiving a rotary instrument such as a screwdriver adapted for rotation of the securing pin.

In particular, said securing pin may be designed such that the distal end thereof is formed with the bolt head, wherein said rotary instrument is adapted to engage the securing pin from the top, i.e. such that is first passes through said cutting insert to engage the bolt head. In such a case, the insert bore may have an opening at both the top and bottom face. Alternatively, said proximal end may be formed with said bolt head wherein said rotary instrument is adapted to engage the securing pin from the bottom, i.e. such that is first passes through the holder to engage the bolt head.

However, as previously defined, in displacement of the securing pin between the mounting position and the securing pin, the distal end of the securing pin, regardless of its being formed with a bolt head or not, is displaced farther away from the bottom surface and into the seat.

It should be noted with respect to the above examples, that the time required for mounting, dismounting or reversing a cutting insert is generally less time consuming than similar operations in conventional cutting tools (bolting), this being a result, inter alia, of the simplified method of changing the position of the securing pin (e.g. depression of a spring), and the fact that the securing pin remains within the seat bore at all times. This latter feature for example, may reduce the risk of losing a bolt during such an operation. It should also be noted that the importance of reducing the amount of time required for performing the above operation increases in direct proportion to the number of cutting inserts used in the cutting tool.

Said tool holder may be formed with two adjacent side walls, and the seat may be adapted is adapted to receive the cutting insert such that two adjacent side faces of the cutting insert are aligned with said two adjacent side walls of the seat. The two adjacent side walls of the seat may further be formed with a seat securing portion adapted to securely engage a matching insert securing portion formed in the two adjacent side faces of the cutting insert. The securing portion of said side face and side wall may be formed as a male/female type connection. For example, said side face may be formed with a groove extending along said side face generally parallel to said bottom surface, and defined by a first and a second groove surface, angled to one another, and said side wall may be formed with a corresponding protrusion, similarly extending, and being defined by a first and a second protrusion surfaces, matchingly angled to one another to be received within said groove. The angle between the groove surfaces may range from 150° to 30°.

In operation, a variety of loads is applied to the cutting insert, inter alia, an axial load in a direction generally perpendicular to said bottom surface which may cause disengagement of the bottom face from the bottom surface. However, the above described engagement between the securing portion of the side walls of the seat and the securing portion of the side faces of the cutting insert may be such that the cutting insert is adapted to bear against said axial load, so long as the bottom face of the cutting insert is prevented from sliding displacement with respect to the bottom surface of said seat in a direction facing away from said side walls. In other words, so long as disengagement of the securing portion of the side faces from the securing portion of the side walls is prevented, the cutting insert may withstand the axial load and prevent disengagement of the bottom face from the bottom surface.

For this purpose, said tool holder may be formed with an arresting member and said cutting insert may be formed with an arresting portion adapted to engage said arresting member when mounted onto the seat of the tool holder, in a manner preventing said sliding displacement. According to one example of the present invention, said securing pin may also constitute the arresting member, wherein the pressure applied to the inner surface of the cutting insert thereby is such that prevents said sliding displacement.

In addition, said cutting tool is also adapted to withstand a tangential load, i.e. a load applied in a direction parallel to the bottom surface and bottom face of the tool holder and cutting insert respectively, applying pressure against the side wall of said seat. According to a specific example, the side wall may be angled to the bottom surface at an acute angle, and said side face may be correspondingly angled to the bottom face at an acute angle. Such an arrangement may provide that the pressure applied to the side face due to the tangential load causes a wedge effect entailing downward pressure on the cutting insert firmly pressing the bottom face of the cutting insert to the bottom surface of the seat. It should also be noted that the angle is such that the wedge effect is sufficient to overcome the static friction generated between the side face and the side wall.

Said cutting tool holder may be used for a variety of cutting operations such as milling, drilling, turning etc. and may be adapted to receive a plurality of cutting inserts simultaneously.

According to one specific design embodiment of the present invention, said cutting tool holder may be used for a milling operation, in which case said cutting insert is a milling insert. Said tool holder may be adapted for receiving a plurality of milling inserts.

According to another specific design embodiment, said cutting tool holder is a drilling tool holder adapted for rotation about a central axis and said cutting insert is in the form of a drilling head. Said drilling head may comprise a drilling head body having drilling portion comprising at least one cutting edge and mounting portion adapted to engage with a securing mechanism, and a positioning element. In addition, said drilling head body may be formed with a plurality of body portions, each comprising a drilling portion and a securing mechanism. Accordingly, said tool holder may be formed with a plurality of seat portions adapted for securely receiving therein the securing mechanisms.

The securing mechanism may be formed with an insert bore adapted to receive a securing pin of the cutting tool, and a bottom and side faces adapted for alignment against corresponding bottom surface and side walls in a manner similar to that previously described. Particularly, the arrangement may be such that the side walls of the tool holder are counter-disposed, wherein the drilling head is securely held in place and prevented from rotating in one direction (e.g. CW) due to the side walls, and to the other direction (CCW) due to the securing pin.

It is important to note that the insert bore in the drilling head may be in the form of a closed bore, i.e. a bore in the form of a hole having a close contour, i.e. bordered on all sides by the surface in which the bore is formed, or it may be in the form of an open bore, i.e. a bore in the form of an open channel having an open contour, for example, having a semi-circular cross-section, so that the surface in which the bore is formed surrounds the bore only along a part its contour. It should be appreciated that the latter design of the insert bore may be used in a variety of cutting tools, for example, tools for milling, turning etc. and is not restricted to drilling tools.

Additionally, the bottom surface of the seat of the cutting tool may have a conical configuration with respect to the central axis thereof, e.g. having an outer edge and an inner edge, the outer edge being positioned axially lower with respect to the inner edge. The bottom face of the drilling portion of the drilling head may have a corresponding opposite configuration, i.e. having an outer edge and an inner edge, the outer edge being positioned axially higher with respect to the inner edge. Such a configuration may facilitate automatic self centralizing of the drilling head with respect to the tool holder.

Said positioning element may be adapted to be aligned with a corresponding positioning portion of said tool holder. For example, said positioning element may be an extension receivable within a corresponding bore of said tool holder. The positioning portions of the drilling head and of the tool holder may be formed with a bayonet arrangement, for further securing the drilling head from disengaging from the tool holder.

The cutting tool may be a variable diameter cutting tool adapted for rotation about a central axis thereof, and for receiving at least two cutting inserts circumferentially disposed about the central axis. Said cutting tool may further comprise a diameter regulating arrangement adapted for radially displacing the cutting inserts with respect to said central axis in order to increase/decrease the circumference envelope of the cutting tool.

In particular, said diameter regulating arrangement may have a portion thereof constituting the side wall of said seat, outwardly slanted from the central axis with respect to the bottom surface. Said side wall may thus extend between a proximal end adjacent said bottom surface and spaced at a radius $r_1$ from the central axis, and a distal end remote from the bottom surface and spaced at a radius $r_2>r_1$ from the central axis. Correspondingly, the cutting insert may be formed with a side face slanted with respect to the bottom face thereof, and extending between a top end adjacent said top face and a bottom end adjacent said bottom face. The angle between the side face and the bottom face may be such that allows aligning the side face of the cutting insert with the side wall of diameter regulating arrangement.

Said diameter regulating arrangement may be adapted to displace with respect to said bottom surface, and in particularly, displace such that the distal end of said side wall changes its axial position with respect to the bottom surface.

Thus, due to displacement of the diameter regulating arrangement, each cutting insert may displace between a first, completely overlapping position, in which the top end thereof is adjacent the distal end of side wall of the diameter regulating arrangement, and a second, partially overlapping position in which the top end thereof is adjacent the proximal end of side wall of the diameter regulating arrangement. It should also be noted that said cutting insert may assume a variety of intermediary positions between said completely overlapping and partially overlapping positions.

For example, said varying diameter element may be a screw having a conically shaped head constituting the side wall, wherein screwing and unscrewing of the bolt causes axial displacement of the head thereof and consequently radial displacement of the cutting inserts, facilitated by a wedge effect.

In case where the tool holder of the present invention is a drilling tool holder, there may be provided an extension member adapted for use therewith, said extension member having a body extending along a central axis and being formed at a distal end thereof with an extension member securing mechanism adapted for mounting thereon of a drilling head of said drilling tool holder, and at a proximal end thereof with an extension member mounting portion adapted for mounting said extension member onto said drilling tool holder, said securing mechanism being generally similar to the securing mechanism of said drilling tool holder and said mounting portion being generally similar to the mounting portion of said drilling head, and wherein the body of said extension member is formed along the central axis with channels adapted for evacuation of chips corresponding to those formed on the drilling head and/or drilling tool holder.

It is noted that the extension member may be adapted for use in other cutting tools such as a turning tool, a milling tool etc.

Using the above disclosed extension member, the drilling tool may be extended by first securing the mounting portion at the proximal end of the extension member to the drilling tool holder, and thereafter mounting said drilling head onto the securing portion at the distal end of said extension member.

It should be appreciated that extension members may be provided in a variety of diameters and lengths so as to allow an operator to conveniently choose a desired extension member for a desired operation. In particular, there may be provided a kit comprising a set of extension member. Said set may include at least one of the following:
  i. a plurality of extension members having a similar diameter but of different lengths; and
  ii. a plurality of extension members having a similar length but of different diameters.

According to another design embodiment, said cutting insert may have a circular form defining a rotation axis, i.e. a cylindrical side face extending between the top and bottom face thereof, such that a cutting edge is defined between the top face and the cylindrical side face. Said cutting insert may be adapted for rotation about said rotation axis during a cutting operation.

In operation, when the cutting insert comes in contact with a workpiece to be cut thereby, the loads applied to the cutting insert prevent rotation of the cutting insert, in particular due to increased static friction forces between the bottom face of the cutting insert and the bottom surface of said seat. However, upon disengagement of the cutting insert from the workpiece, i.e. at the instance the cutting insert disconnects from the workpiece, the load on the cutting insert is drastically reduced. At that particular instance, there exists a minute time interval in which the cutting insert, is not longer in contact with the workpiece compared to the tool holder and the securing pin. At that particular time interval, there is a slight reduction in the pressure applied by the securing pin on the inner surface of the insert bore, allowing the cutting insert to perform a slight rotary motion about its rotation axis.

The above time interval is extremely short, and allows the cutting insert to perform an extremely minute angular rotation about the rotation axis. For example, while a cutting too may perform about 3000 rounds per minute (RPM), the cutting insert may take up to fifteen minutes to complete a full turn, i.e. performing one turn for every 45,000 turns of the cutting tool.

Such an arrangement may provide constant dynamic change of the cutting edge without the intervention of an operator. Constantly changing the cutting edge may help prolong the effective operation time of the cutting tool.

The circular cutting insert may further be formed with ribs disposed on the top surface thereof (serving as rake), arranged such that during a cutting operation, the cutting insert is urged to rotate in only one direction.

It should be noted in this respect that the rotation of the circular cutting insert is facilitated by the specific mounting arrangement according to the preset invention. In other words, in conventional mounting using a screw fastener, the cutting insert is much more restricted in its movement and is less likely to perform a constant dynamic rotation about the axis thereof.

According to another aspect of the present invention there is provided a cutting insert configured for used with the cutting tool holder of the previous aspect of the present invention.

In particular, said cutting insert may be configured to operate in conjunction with the securing mechanism of the cutting tool holder of the previous aspect of the present invention.

According to yet another aspect of the present invention there is provided cutting insert adapted to be mounted onto a seat of a cutting tool holder having a bottom surface and at least two adjacent side walls extending therefrom, said cutting insert having a top face and a bottom face defining therebetween a central axis, and at least two adjacent side faces extending between said top face and said bottom face, such that when mounted onto said seat said bottom face is aligned with said bottom surface; each of said two adjacent side faces being formed with an insert locking portion which is adapted, when said cutting insert is mounted onto said seat, to securely engage a corresponding seat locking portion formed in each of said two adjacent side walls to thereby prevent displacement of said bottom face with respect to said bottom surface in an axial direction; said cutting insert further being formed with an arresting portion adapted, when said cutting insert is mounted onto said seat, to engage a corresponding arresting member of said cutting tool holder, so as to prevent sliding displacement of said bottom face with respect to said bottom surface, thereby ensuring secure engagement between said insert locking portion and said seat locking portion.

According to still another aspect of the present invention there is provided a cutting tool comprising a cutting tool holder and a cutting insert according to the previous aspects of the present invention.

According to yet another aspect of the present invention there is provided a method for mounting a cutting insert according to one aspect of the present invention onto a seat of a cutting tool holder according to another aspect of the present invention, said method including:

displacing a securing pin of said tool holder into a first, mounting position in which the distal end thereof protrudes from within the seat bore through said bottom surface into said seat to a first extent;

placing said cutting insert onto said seat such that the bottom face thereof is aligned with the bottom surface of said seat; and displacing said securing pin into a second, securing position in which said distal end protrudes from within the seat bore through said bottom surface into said seat to a second extent, greater than said first extent, so as to engage the inner surface of said insert bore, thereby securing said insert in place;

According to another aspect of the present invention there is provided a reversible cutting insert comprising top face, a bottom face, at least one side wall extending therebetween, and a central bore having a central axis X, said central bore extending between said top face and said bottom face and being formed with at least a first inner surface and a second inner surface, each extending between said top face and said bottom face and having a respective first and second top rim at said top face and a respective first and second bottom rim at said bottom face, wherein the maximal distance $R_1$ between said first bottom rim and said central axis X is greater than the maximal distance $r_1$ between said first top rim and said central axis X, and the maximal distance $R_2$ from said central axis X of said second top rim is greater than the maximal distance $r_2$ between said second bottom rim and said central axis X.

According to one example, each of said first inner surface and said second inner surface may be a planar surface, in which case the first and second top and bottom rims are essentially in the form of straight lines. When each of these surfaces is disposed symmetrically relative to the central axis, their distances from the central axis vary between a maximal distances at the ends of these lines to a minimal distance at the center thereof. In this case also the minimal distance $R_1'$ between said first bottom rim and said central axis is greater than the minimal distance $r_1'$ between said first top rim and said central axis X, and the minimal distance $R_2'$ between said second top rim and said central axis X is greater than the minimal distance $r_2'$ between said second bottom rim and said central axis X.

According to another example, each of said first inner surface and said second inner surface may be a curved surface, for example a conical surface, in which case said first and second top and bottom rims are each in the form of a sector of circle. When each of the first and second inner surfaces is disposed symmetrically relative to the central axis, all points on each of the first and second top and bottom rims are equidistant from the central axis.

The second surface may be identical to the first surface if turned over, in which case the distance $R_1$ equals to the distance $R_2$, and the distance $r_1$ equals to the distance $r_2$ Due to such design of the inner surfaces of the bore in the cutting insert described above, the reversible use of the insert is allowed.

The bore of said cutting insert may be formed with a number of inner surfaces. Specifically, said bore may be formed with an even number of inner surfaces greater than two (i.e. four, six, eight etc.), depending on the number of top and bottom cutting edges in the insert In this case, the inner surfaces may be arranged in an alternating order and each inner surface having a top rim with a distance from said central axis greater than that of its corresponding bottom rim, will have adjacent thereto an inner surface having a top rim with a distance from said central axis smaller than that of its corresponding bottom rim.

The circumferential angular extension of the rim of each inner surface about the central axis of the bore is dependent on the number of the inner surfaces. In particular, for n surfaces, the circumferential extension of each rim would be 360°/n. In particular, for a reversible indexible cutting insert having at least two top and at least two bottom cutting edges and accordingly four inner surfaces, the circumferential extension of each rim would be 90°.

The formation of the inner surfaces described above allows the use of the cutting insert according to the current aspect of the present invention with a cutting tool holder of the first aspect of the present invention, in any working position of the insert.

According to yet a further aspect of the present invention there is provided a mold for the manufacture of the cutting insert of the previous aspect of the present invention.

The mold comprises a first mold member and a second mold member, each member comprising a body having a front surface, and formed with a mold cavity in said front surface defined by at least one cavity side wall and a cavity base surface and having a central axis perpendicular to said base surface, each mold member further comprising a molding element projecting from said cavity base surface and generally perpendicular thereto, said molding element being formed with an elevated surface elevated from the base surface, and an external surface extending therebetween such that it forms a cavity base rim defined by the intersection of the external surface with the cavity base surface and an elevated rim defined by the intersection between said external surface and said elevated surface, wherein the distance of said base edge from said central axis is greater than the distance of said elevated edge from said central axis In manufacture of the reversible cutting insert, the mold members are brought into contact with one another such that the mold cavities thereof form together one mold cavity defining the shape of the cutting insert to be manufactured. In the molding position, the mold members may be oriented such that the respective front surfaces thereof are flush against one another, and that the respective elevated surface of each of the mold members is flush against the respective base surface of the opposite mold member.

The external surface of each of said mold members may be a planar surface. Alternatively, it may be a curved surface, e.g. conical.

In particular, in the previously described example of a reversible cutting insert having four inner surfaces, the mold cavity of each of the mold members may be a square mold cavity defined by four cavity side walls extending perpendicular to the base surface. The central axis may extend from the center of the square.

For the purpose of clarity, two additional transverse axes, X and Y may be defined, both intersecting the central axis at the cavity base surface, and extending between two pair of opposite cavity side walls.

The molding element of each of the mold members may be formed with two conical portions disposed along the X axis and symmetric about the Y axis, and such that there extend two gaps between the portions along the Y axis. Thus, each of the conical portions may have a base rim arc disposed on the base surface and an elevated rim arc elevated above the base surface. The design may be such that the base rim arc has a radius R with respect to the central axis and the elevated rim arc has a radius r with respect to the central axis. It should also be noted that the measures R and r may correspond to the distances R and r of the inner surfaces of the reversible cutting insert. In addition, each of the conical portions may correspond in shape and dimensions to the inner surface of the reversible cutting insert.

In manufacture, in the molding position previously disclosed, the second mold member oriented at 90° with respect to the first mold member such that the conical portions thereof now extend along the Y axis. Thus, in the molding position, the conical portions of the second mold member are received in the gaps between the conical portions of the first mold member.

After the pressing process, once the reversible cutting insert compact has been pressed under desired conditions, the second mold member may be removed so as to allow extraction of the reversible cutting insert compact from the first mold member. It should be noted that the design suggested above allows, among other things, the manufacture of a reversible cutting insert having at least two tapering surfaces, each extending between a top and a bottom face of said reversible cutting insert, one having a positive angle and the other a negative angle, without the need for an undercut.

According to still a further aspect of the present invention there is provided a cutting tool holder according to the previous aspect of the present invention comprising a securing pin formed at a distal end thereof with a faceted portion.

The cutting tool holder may be adapted for the mounting onto a seat thereof of a cutting insert comprising a body formed with a faceted insert bore, wherein, the facets formed on the faceted portion of the securing pin are designed such that when the cutting insert is mounted onto the cutting tool holder, the orientation of the securing pin with respect to the cutting insert is such that at least one facet of said securing pin comes into surface-to-surface contact with at least one corresponding facet of said cutting insert.

According to one example, said cutting tool holder may be designed such that when said cutting insert is mounted onto said cutting tool holder, at least two adjacent facets of the securing pin come in surface-to-surface contact with at least two adjacent facets of said cutting insert. According to another example, said cutting tool may be designed such that when said cutting insert is mounted onto said cutting tool holder, only one facet of the securing pin comes in surface-to-surface contact with only one facet of said cutting insert.

According to still a further aspect of the present invention there is provided a cutting insert comprising a body having a faceted insert bore.

According to yet another aspect of the present invention there is provided a securing pin having a faceted portion.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 28B to 28D are schematic side, top and perspective views, respectively, of the securing pin used in the cutting tool shown in FIG. 28a;

FIGS. 28E to 28G are schematic top, cross-sectional and broken-perspective views respectively of the cutting insert shown in FIG. 28a;

FIGS. 29A to 29C are schematic perspective, side and top views of another embodiment of the securing pin used in the cutting tool shown in FIG. 28a;

FIG. 30A is a schematic cross-sectional view of a cutting tool according to yet a further embodiment of the present invention;

FIG. 30B is a schematic top view of the cutting tool shown in FIG. 30a;

FIG. 30C is a schematic perspective view of the securing pin shown in FIG. 30a;

FIG. 31B is a schematic top plan view of the cutting tool shown in FIG. 31a;

FIG. 31C is a perspective view of a securing pin used in the cutting tool shown in FIG. 31a;

FIG. 32B is a schematic top plan view of FIG. 32a;

FIG. 32C is a schematic perspective view of the securing pin used in the cutting tool shown in FIG. 32a;

FIG. 32D is a schematic cross-sectional view of the cutting insert used in the cutting tool shown in FIG. 32a;

FIG. 32E is a schematic cross-sectional view of a spring disc used in the cutting tool shown in FIG. 32a;

FIG. 45A is an isometric view of a drilling tool comprising a drill holder and a drilling head according to another embodiment of the present invention;

FIG. 45B is an isometric view of an enlarged detail A shown in FIG. 45A;

FIG. 45C is an isometric view of detail A shown in FIG. 45B with the drilling head removed;

DETAILED DESCRIPTION OF EMBODIMENTS

Figure 1:
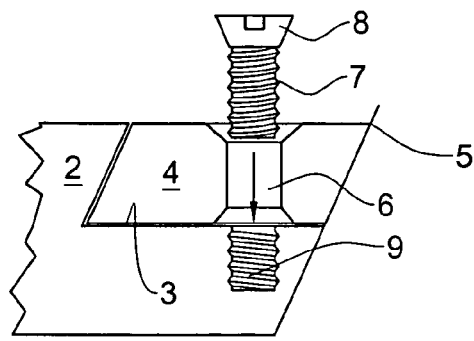
FIG. 1 is a schematic cross-sectional view of a typical cutting tool comprising a cutting tool holder and a cutting insert according to the prior art.

With reference to FIG. 1, a typical cutting tool according to the prior art is shown comprising a cutting tool holder and cutting insert. It is observed that the construction therein illustrated includes a cutting tool holder 2 formed with a seat 3 for receiving the cutting insert 4 having a plurality of cutting edges, one of which is shown at 5. The cutting insert 4 is further formed with a central bore 6 for receiving a threaded fastener 7 having an enlarged conical head 8. The fastener 7 is essentially a bolt inserted into and passed through bore 6 from its top side and threaded into a threaded socket 9 formed in the bottom surface of the seat 3.

It is observed that in such a prior art construction, each time the cutting insert 4 is to be mounted, dismounted, reversed or rotated to orient a fresh cutting edge 5 for a cutting operation, it is necessary to remove the fastener 7, remove the cutting insert 4, rotate it a partial rotation (e.g., 90° in a square cutting insert having four cutting edges on its top face, and four cutting edges on its bottom face), and reapply fastener 7 through bore 6 into socket 9 of the cutting tool. The term 'remove' is referred to herein as defining that the fastener 7 is completely disengaged from, and does not contact the tool holder 2. This series of operations requires significant labor and time for each cutting insert to be indexed, which is multiplied by the number of such cutting inserts used in a cutting tool. In addition, once the fastener 7 is removed, it may be displaced or lost, which may further consume valuable time.

Figure 2A:
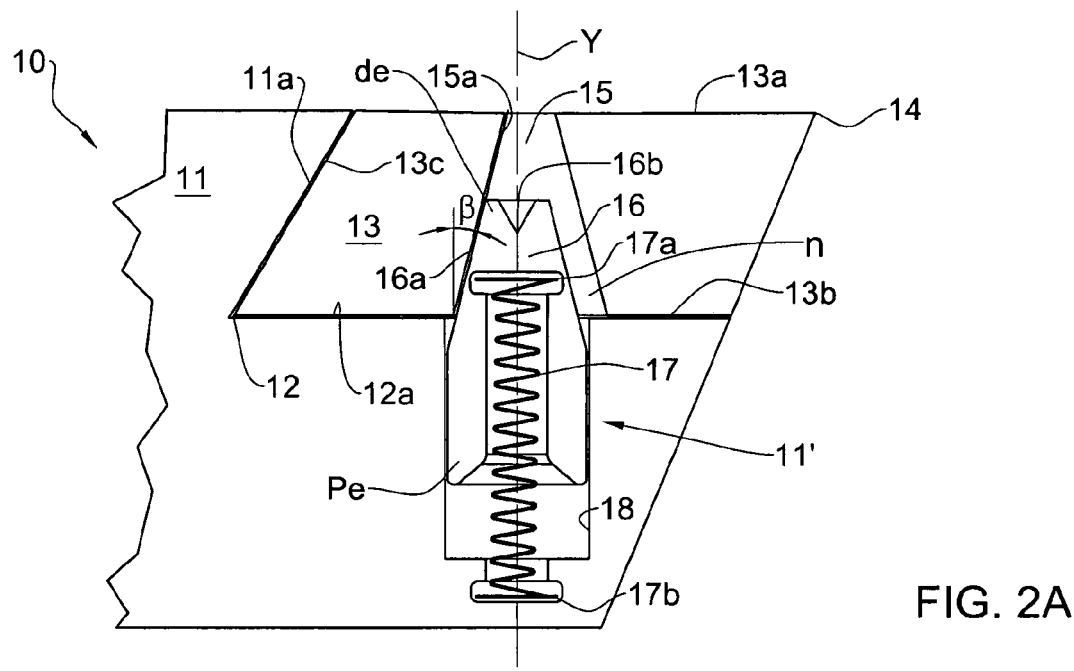
FIG. 2A is a schematic cross-sectional view of a cutting tool comprising a cutting tool holder and a cutting insert according to one embodiment of the present invention.

With reference to FIG. 2A, a cutting tool, generally designated 10 is shown comprising a cutting tool holder 11 and a cutting insert 13 securely received therein by a securing mechanism 11'.

The cutting tool holder 11 is formed with a seat 12 defined by a bottom surface 12a and a side wall 11a angled to the bottom surface 12a at an acute angle. The seat 12 is in turn formed with a seat bore 18 defining an axis Y, and adapted to receive therein the securing mechanism 11'.

The securing mechanism 11' comprises a hollow securing pin 16 and a biasing spring 17 received therein to engaging therewith. The securing pin 16 has an open proximal end pe received within the seat bore 18 and a closed distal end de axially protruding from the bore 18 through the bottom surface 12a into the seat 12. The arrangement is such that the biasing spring biases the distal end de of the securing pin 18 to protrude from the bottom surface 12a.

The securing pin 18 is further has a securing portion adjacent the distal end de thereof, having a tapering shape defining a conical securing surface 16a. The distal end de is also formed with an indent 16b, the purpose of which will be discussed with respect to FIGS. 4A to 4C.

The cutting insert 13 has a top and bottom faces 13a, 13b respectively, and four side faces 13c extending therebetween. The cutting insert 13 is formed with a plurality of cutting edges 14 defined at the intersection between the side faces 13c and the top and bottom faces 13a, 13b respectively. The cutting insert 13 is further formed with a conical insert bore 15 adapted for receiving the securing portion of the securing mechanism 11', and having an inner surface 15a adapted to engage the securing portion of the securing mechanism 11'.

In assembly, when the cutting insert 13 is mounted onto the seat 12 of the tool holder 11, the bottom face 13b thereof is flush against the bottom surface 12a of the seat 12, and a side face 13c thereof is flush against the side wall 11a of the seat 12. In this position, the force of the biasing spring 17 urges the securing pin 16 upwards whereby the conical surface 16a of the securing portion 16 engages the conical surface 15a of the insert bore 15. Due to the conical shape of the insert bore 15 and the conical surface 16a, the cutting insert 13 is pressed against the side wall 13 to be firmly held in place. It is also noted that there exists a gap n between the securing pin 16 and the side of the inner surface 15a opposite the side wall 13.

It should also be noted, that while axial displacement of the securing pin 16 upwards entails lateral displacement of the cutting insert 13 towards the side wall 11a, an attempt for displacement of the cutting insert 13 in the opposite lateral direction, i.e. away from the side wall 11a will not entail downward axial displacement of the securing pin 16 back into the seat bore 18. This is due to the tapering angle of the insert bore 15, being close to 0°. In this particular case, the angle β is about 10°. Such an arrangement provides an extremely solid securing of the cutting insert 13 within the seat 12.

Figure 2B:
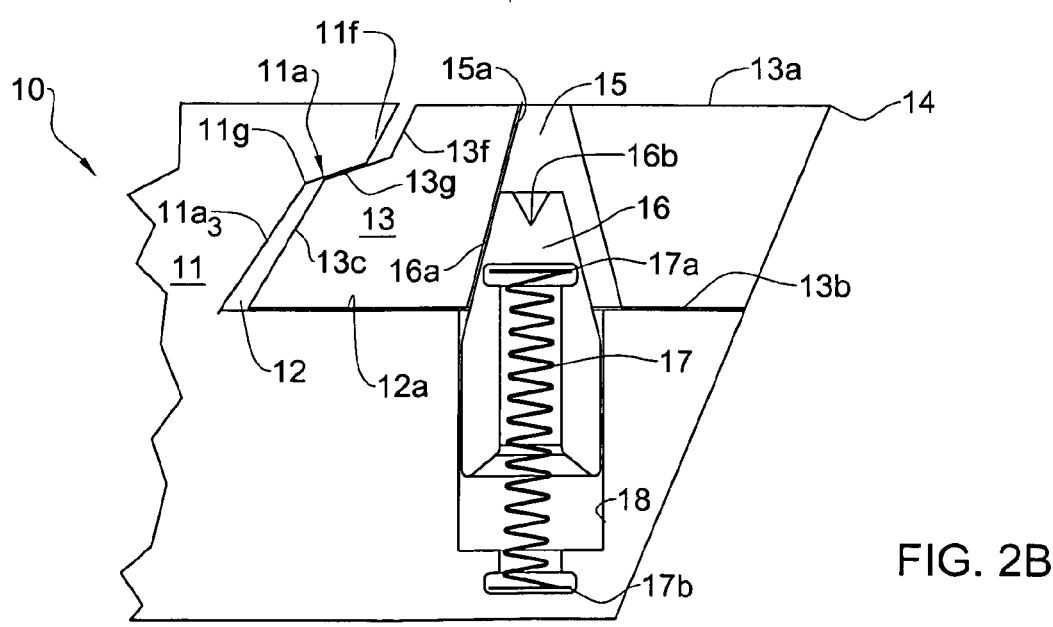
FIG. 2B is a schematic cross-sectional view of a cutting tool according to another aspect of the present invention.
Figure 3:
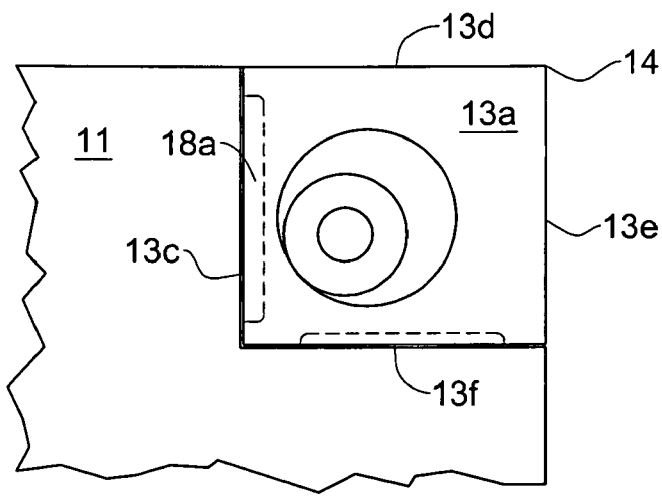
FIG. 3 is a schematic top view of the cutting tool shown in FIG. 2B.

As seen in particularly in FIG. 2B, a different design of the cutting insert 13 is shown in which the side face 13c is formed with a cut-out defining an additional surface 13g angled thereto, and the seat 12 of the tool holder is formed with a side wall 11a having a corresponding shape. In this particular design, the cutting insert 13 is laterally pressed to the side wall 11a by the securing pin 16 such that the bottom face 13b is flush against the bottom surface 12a, while the surface 13g is flush against a matching surface 11g. This, the surface 13c of the side face does not come in contact with the side wall 11a, and may be used to relief pressure as known per se.

Figure 4A:
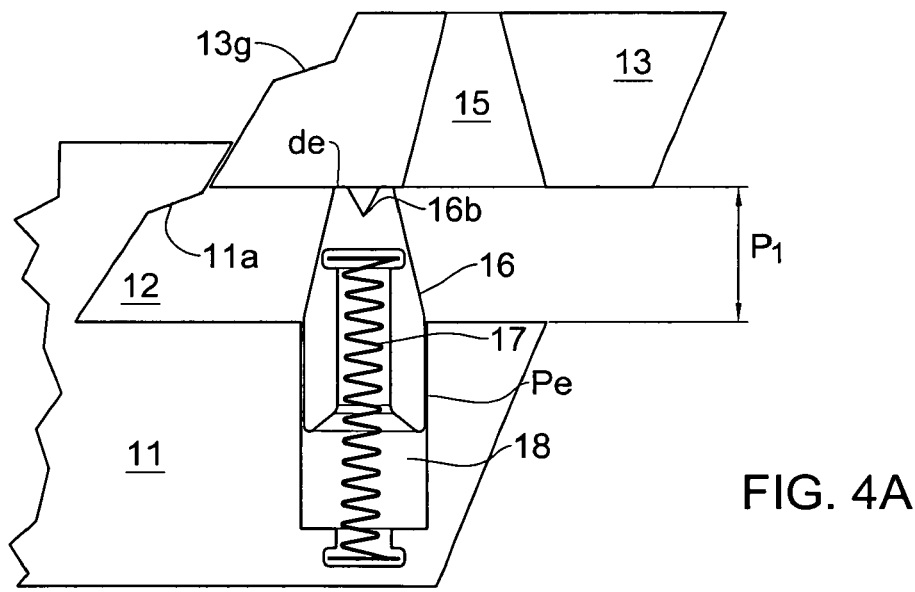
FIGS. 4A to 4C are schematic cross-sectional views of three stages involved in mounting the cutting insert as shown in FIGS. 2B and 3 into the seat of the cutting tool holder shown in the same Figs.
Figure 4B:
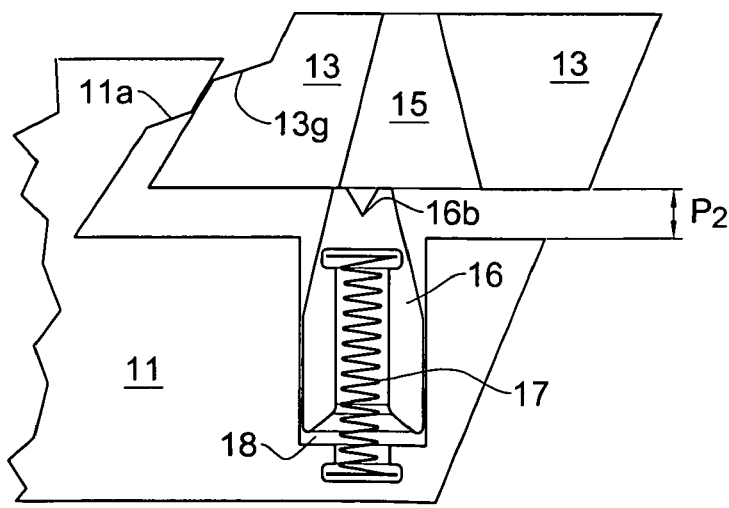
Figure 4C:
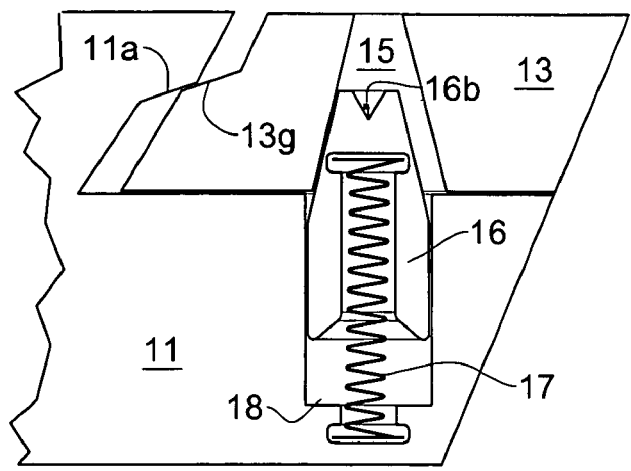

FIGS. 4A to 4C illustrate how such a construction enables the cutting insert 13 to be applied to the cutting tool holder 11 and secured therein without the need for applying and removing separate fastening elements.

In the initial position shown in FIG. 4A, the securing pin 16 is in a securing position, its distal end de protruding from the bottom surface 12a to an extent $P_1$ under the biasing force of the spring 17. Also in this position, the proximal end pe of the securing pin 16 is located within the seat bore 18.

In order to mount the cutting insert 13 into the seat 12, the securing pin 16 must first be displaced into a mounting position in which the distal end de thereof protrude from the bottom surface 12a to an extent $P_2<P_1$, allowing the cutting insert 13 to be positioned within the seat 12 as previously described. Displacing the securing pin 16 into the mounting position required depressing the biasing spring 17 to allow the securing pin 16 to axially displace into the seat bore 18. Although such depression may be done using an instrument (not shown), it may also be achieved by using the bottom face 13b of the cutting insert 13 to press down on the securing pin 16 as shown in FIG. 4B. Once the securing pin 16 is depressed to a sufficient extent, i.e. the distal end de thereof protrudes to an extend $P_2$ or less, the cutting insert 13 may be slid into place.

Once the cutting insert 13 is slid into the seat 12, the securing pin 16 is free to displace axially upwards under the force of the biasing spring 17, such that it is received into the insert bore 15. The securing pin 16 displaces upwards until the securing portion 16a thereof engages the inner surface 15a of the insert bore 15. Upon engagement, the securing pin's 16 upward axial displacement entails lateral displacement of the cutting insert 13 towards the side wall 11a until the cutting insert 13 reaches the position shown in FIG. 4C. In this position, as previously disclosed, the cutting insert 13 is firmly pressed against the bottom surface 12a and side wall 11a of the seat 12.

In order to release the cutting insert 13 from the seat 12, it is necessary to displace the securing pin 16 back to the mounting position, i.e. depressing the securing pin 16 such that the distal end de thereof protrudes from the bottom surface 12a to a small enough extent so as to allow the cutting insert 13 to be removed. This may be achieved, for example, by inserting a tool into the insert bore 15 to engage the V-shaped recess 16b of the securing pin 16 and applying pressure thereto. Such pressure will cause the securing surface 16a of the securing pin 16 to disengage from the respective surface 15a of the cutting insert, thereby enabling the cutting insert 13 to be removed from the cutting tool holder 11. The actual removal may be done by hand, by a magnet, or by a tweezers-type implement.

With respect to the above, the following should be noted:
the term 'mounting position' should be understood in the broadest sense and refers to a position allowing mounting and dismounting of the cutting insert 13, as well as rotation of the cutting insert 13 for the purpose of switching a cutting edge 14; and In both the mounting position and the securing position, the proximal end pe of the securing pin 16 is received within the seat bore 12.

The above disclosed cutting tool 10 and stages of mounting/dismounting operations of the cutting insert 13 onto the cutting tool holder 11 are simple, and allow saving a considerable amount of time in performing such operations. Furthermore, since the securing pin 16 remains within the seat bore 18 at all times, there is less risk of losing or misplacing it, as may happen with a screw, as known from the prior art.

Figure 5:
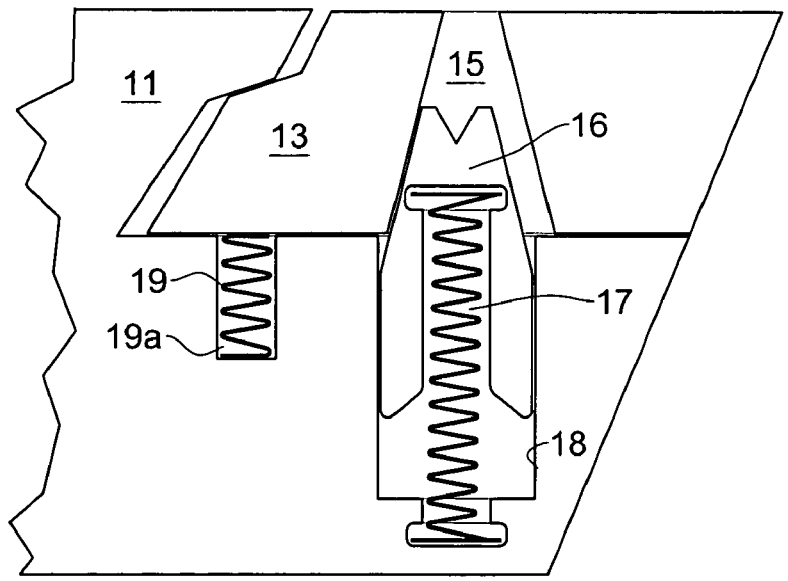
FIG. 5 is a schematic cross-sectional view of one modification of the cutting tool shown in FIGS. 2B and 3.
Figure 6:
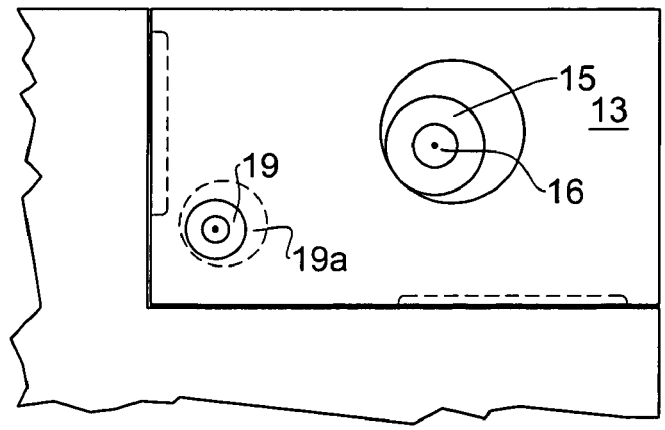
FIG. 6 is a schematic top view of the cutting tool and cutting insert of FIG. 5.

FIGS. 5 and 6 illustrate a modification wherein the removal of the cutting insert 13, when released by depression of the securing pin 16, is effected by an ejector spring 19 interposed between the cutting insert 13 and the bottom of a second bore 19a formed in the cutting tool holder 11. As shown in FIG. 6, ejector spring 19 in bore 19a is located at the juncture of the two sides of the cutting insert formed with the shoulders interlocking with corresponding shoulders in the cutting tool holder 11.

Figure 7:
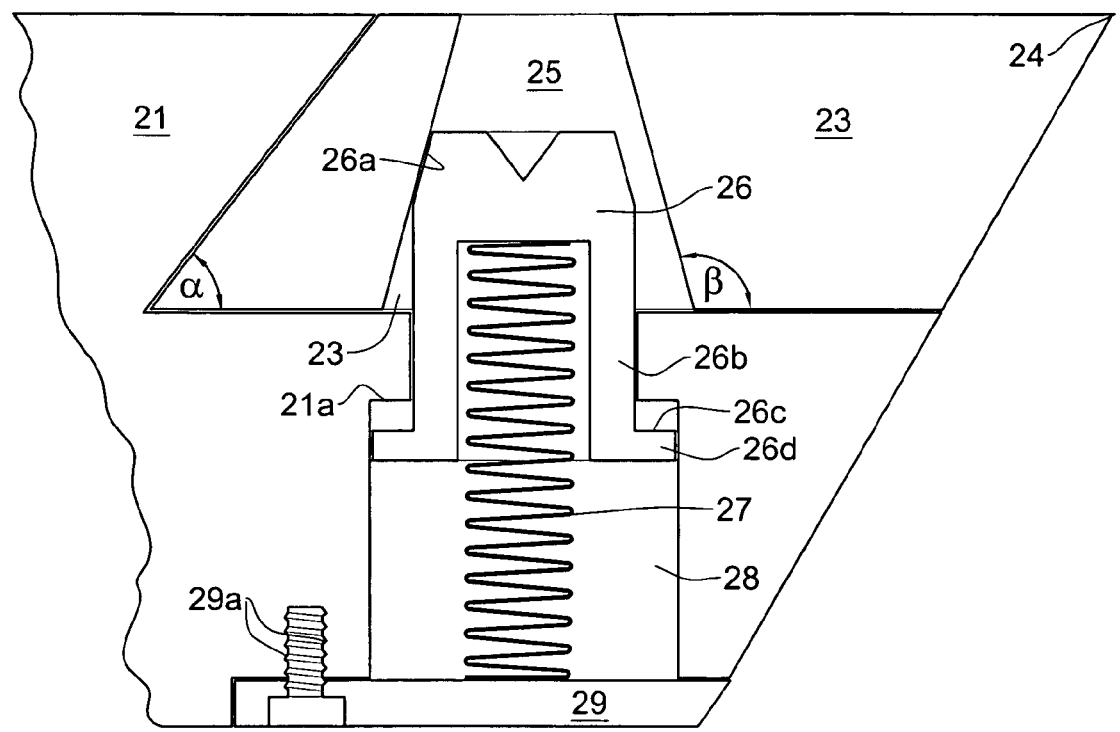
FIG. 7 is a schematic cross-sectional view of another modification of the cutting tool shown in FIGS. 2B and 3.

FIG. 7 illustrates another embodiment of the cutting tool generally designated 21, wherein the cutting insert 23 is formed with cutting edges 24 and central bore 25, and the securing pin 26 is receivable within the bore 25. In this case, only a portion of the distal end de of the securing pin 26 is formed with the tapered surface, as shown at 26a, conforming to the taper of bore 25 formed in the cutting insert 23. The remainder of securing pin 26 is of cylinder configuration, as shown at 26b. The proximal end of the securing pin is formed with an annular step 26c, and with an outwardly-extending flange 26d engageable with an annular shoulder 21a formed in the cutting tool 21 defining the seat 23. FIG. 7 illustrates the operative position of the cutting insert 23, corresponding to that of FIG. 4C.

As further shown in FIG. 7, the bottom of bore 28, housing securing pin 26 and its spring 27, is closed by a closure plate 29 secured to the cutting tool 21 by fastener 29a. Fastener 29a is provided merely to facilitate assembly of the cutting tool and its spring-urged securing pin 26 and, of course, need not be removed when removing the cutting insert or when indexing it to enable a fresh cutting edge to be used.

In FIG. 7, the angle defined by the bottom face and side wall of the cutting insert 23 is indicated as "a", and the angle of the inner surface of the cutting insert 23 defining the bore 25 with the bottom surface of the cutting insert is indicated as "β". Angle α may be equal to, but is preferably less than angle β. For example, angle α may be 75°; angle β may be 82.5°; each of the opposite faces of the cutting insert may be 15 mm×15 mm; and the thickness of the cutting insert may be 7.5 mm.

Figure 8:
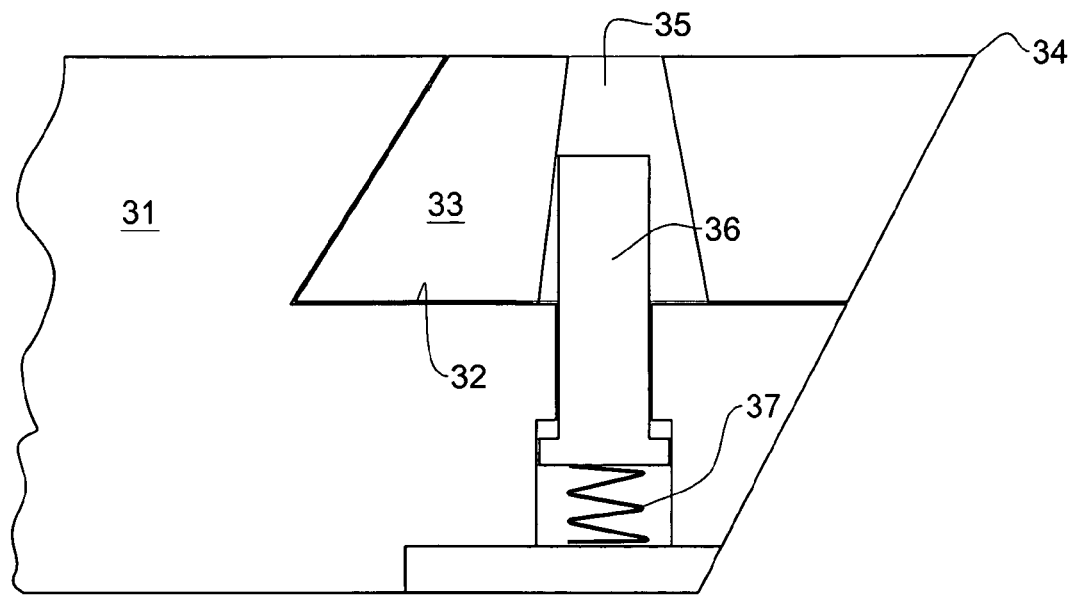
FIGS. 8 to 11 are schematic cross-sectional views of the cutting tool according to various embodiments of the present invention.

FIG. 8 illustrates a variation wherein a cutting tool 31 is formed with a seat 32 for receiving cutting insert 33 having a plurality of cutting edges 34 and formed with a bore 35 receiving a securing pin 36 urged by spring 37 in the outward direction to its securing position. In the modification illustrated in FIG. 8, bore 35 formed in the cutting insert 33 is of a tapered configuration, whereas the securing pin 36 is of a uniform-diameter or cylindrical configuration.

In this case, engagement between the securing pin 16 and the insert bore 35 takes place between the top rim of the securing pin 16 and the inner surface of the insert bore 35.

Figure 9:
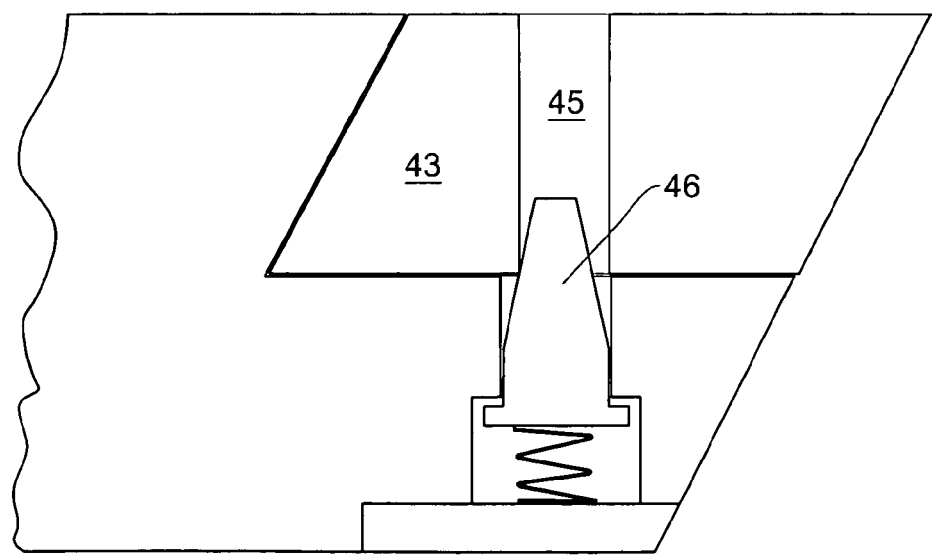

FIG. 9 illustrates a further modification, wherein the bore 45 in the cutting insert 43 is of a cylindrical configuration, whereas the distal of securing pin 46 is of a tapered configuration.

Figure 10:
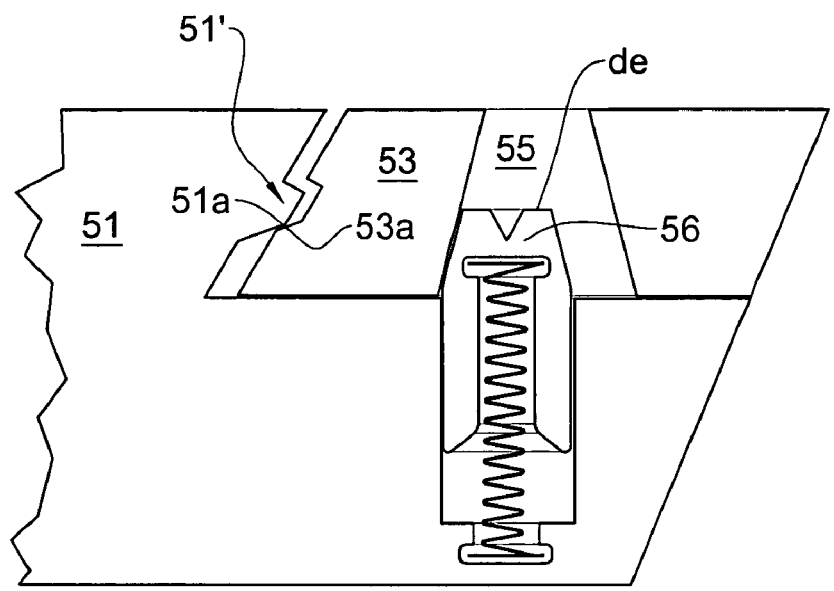

FIG. 10 illustrates a further modification wherein both the bore 55 in the cutting insert 53 and the distal end de of the securing pin 56 are of a tapered configuration, but the interlocking surfaces between the cutting insert 53 and the cutting tool holder 51 are in the form of a rib 51a formed in the side wall 51' of the cutting tool holder 51, and a recess 53a is formed in the cutting insert 53.

Figure 11:
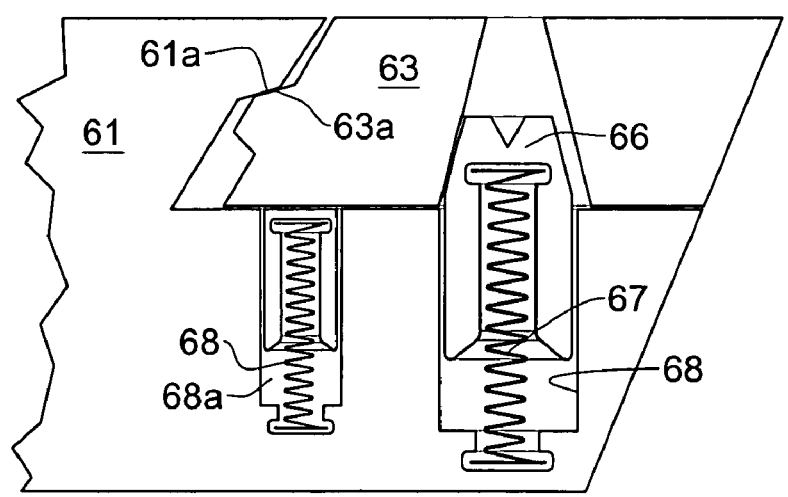

FIG. 11 illustrates a further modification wherein the cutting tool holder 61 is formed with a shoulder 61a adapted for engaging a shoulder 63a formed in the cutting insert 63 in the secured position of the cutting insert. Another modification in FIG. 11 is that, in addition to spring 67 received within bore 68 for urging the securing pin 66 in the outward direction, there is also provided a second spring 69 within a bore 69a for urging the cutting insert 63 out of the seat in the cutting tool 61 upon the depression of the securing pin 66, similar to that disclosed in FIG. 5.

Turning now to FIGS. 12 to 16, in the embodiments of the invention described the securing pin is not spring biased in the outward direction, but rather is fixed to the bottom of the seat.

Figure 12:
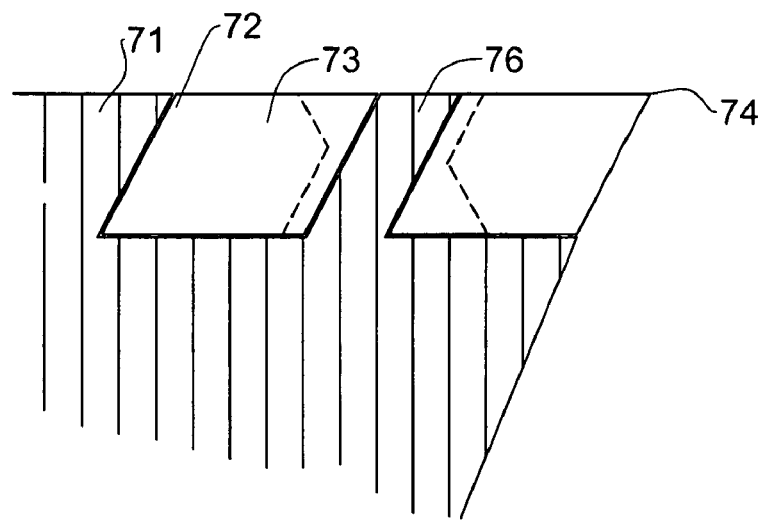
FIG. 12 is a schematic cross-sectional view of the cutting tool in accordance with another embodiment of the present invention.
Figure 13:
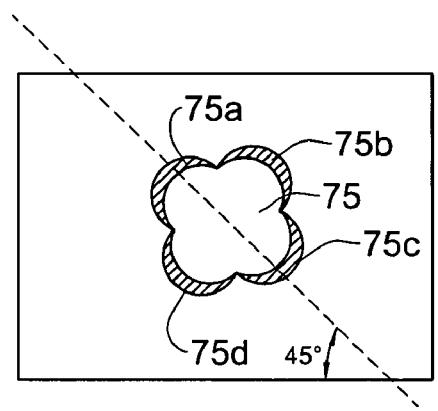
FIG. 13 is a schematic top view of the upper surface of the cutting insert used in the cutting tool shown in FIG. 12, with the securing pin removed to show the configuration of the bore therein.
Figure 14:
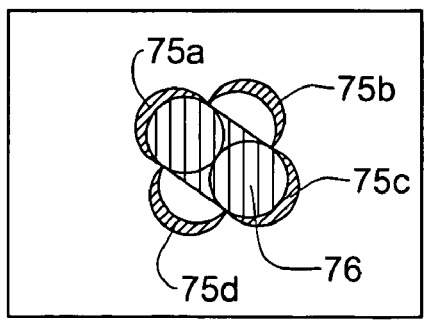
FIG. 14 is a schematic top view similar to that of FIG. 13, showing the securing pin.

With respect to the embodiment illustrated in FIGS. 12 to 14, it will be seen that the cutting tool 71 is formed with a seat 72 for receiving the cutting insert 73 formed with a plurality of cutting edges 74. The cutting insert 73 is further formed with a bore 75 therethrough which, as described above with respect to FIG. 1, is normally used for receiving a fastener (7, FIG. 1) for attaching the cutting insert to the cuter tool. In the previously-described embodiments, bore 75 is used for receiving a securing pin (e.g., 16, FIG. 2) which is spring-urged in the outward direction. In the embodiment of FIGS. 12 to 14, however, the securing pin, therein designated 76, is fixed to, by being integrally formed with, the bottom of seat 72 at an oblique angle with respect to the bottom surface of the seat.

To accommodate the obliqueness of securing pin 76, bore 75 in the cutting insert 73 is formed with extensions or enlargements on the outer surface of the cutting insert. FIGS. 12 to 14 illustrate a construction wherein the cutting insert may be indexed to four positions to enable four cutting edges 74 on each of the two sides to be used for cutting operations. Thus, as shown in FIG. 13, bore 75 in the cutting insert includes four such extensions or enlargements, each having an axis displaced 90° with respect to the axis of the next extension or enlargement. FIG. 14 illustrates the cutting insert 73 after receiving the obliquely-extending securing pin 76.

As also seen in FIG. 12, the cutting insert 73 is of a similar construction as described above, e.g., with respect to FIG. 2, namely it includes flat upper and lower faces of square configuration, and four side walls of rhombic configuration, such as to present four cutting edges 74 on each side of the insert, or a total of eight cutting edge for cutting operations.

In FIG. 12, the angle "α" and "β" may be the same as angles α and β, respectively, in FIG. 7. That is, α is preferable equal to or less than β. For example, a could be 75°, β could be 82.5°, and the cutting insert 73 could be 15 mm×15 mm×7.5 mm.

Figure 15:
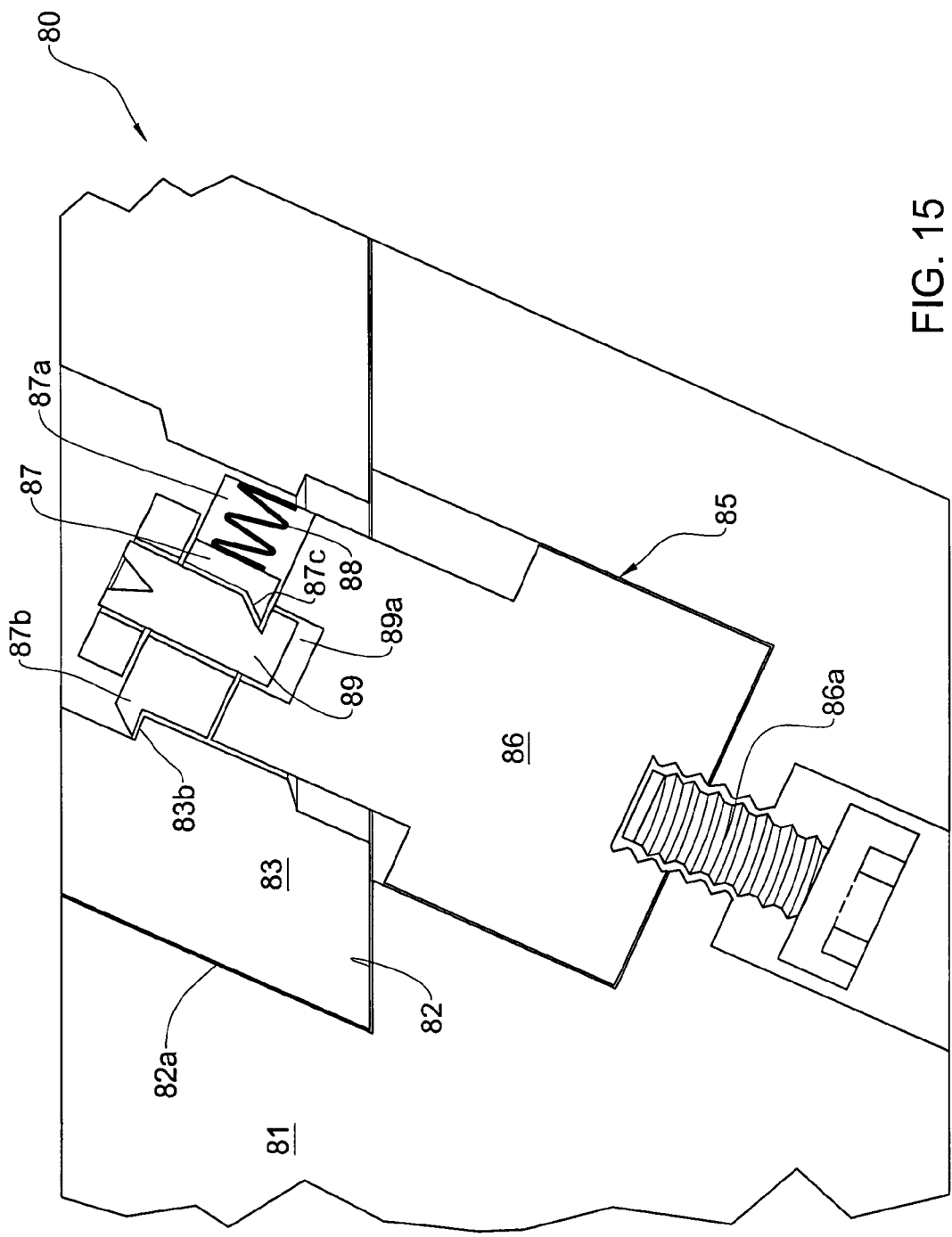
FIG. 15 is a schematic cross-sectional view of yet another construction of the cutting tool according to still another embodiment of the present invention.

Turning now to FIG. 15, another embodiment of the cutting too according to the present invention is illustrates, generally designated 80. In this embodiment, the seat bore receives a securing construction 85 comprising a support 86, formed at a distal end thereof with a pin bore 89a adapted to receive the securing pin 89. The securing construction further comprises a fixation element 87 transversally disposed about the securing pin 89, and biased by a spring 88.

The entire securing construction is fixed in place by the support 86 being fixed to the cutting tool 81 by a threaded fastener 86a, similar to the construction illustrated in FIG. 7.

As clearly seen in FIG. 15, the support 86 is coaxial with bore 85, and both axes are at an oblique angle to the bottom surface of the seat 82.

The securing pin 89 is formed with a cam surface 89b engageable with a cam surface 87c of the fixation element 87, and the fixation element is formed with a fixating shoulder 87b adapted to engage a corresponding shoulder 83b of the cutting insert. The arrangement is such that, when the securing pin 89 is depressed, the two cam surfaces cause the fixation element 87 to be displaced laterally away from the side wall 81a of the seat 82. This lateral displacement allows releasing the securing protrusion 89b from the securing shoulder 83b of the insert, and thereby to permit to the cutting insert to be withdrawn from the seat 82.

It therefore follows, that when the securing pin 89 is in the securing position, the distal end de thereof protrudes to a first extent from the pin bore 89a, and when the securing pin 89 is in a second position, it protrudes from the pin bore 89a to a second, lesser extent, allowing a cutting insert to be mounted into the tool holder 81.

Figure 16:
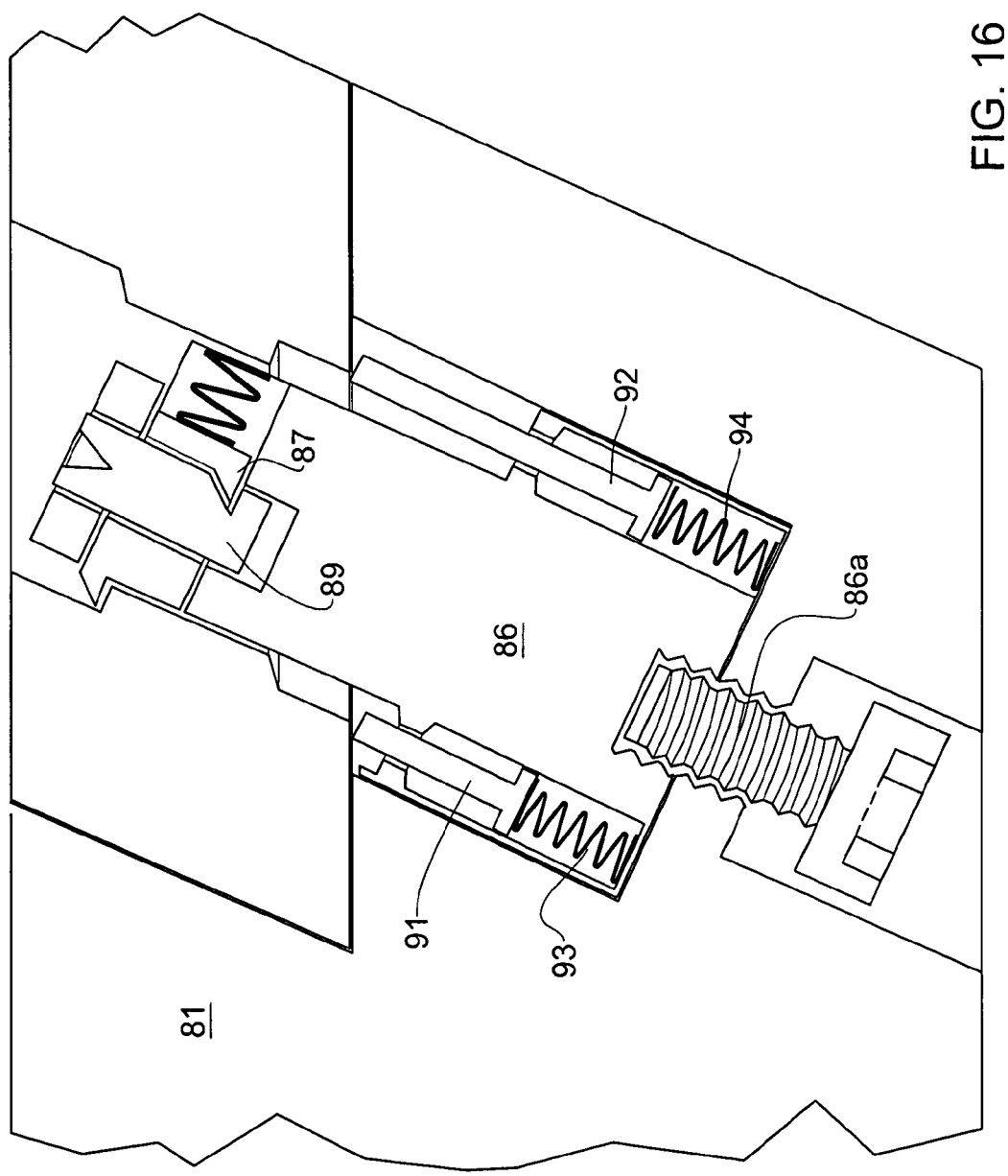
FIG. 16 is a schematic cross-sectional view of a cutting tool according to yet a further embodiment of the present invention.

FIG. 16 illustrates a construction similar to that of FIG. 15, and therefore to facilitate understanding, the corresponding parts have been identified by the same reference numerals. In the construction illustrated in FIG. 16, the cutting tool is provided with a spring ejector, in the form of two pins 91, 92, each urged by a spring 93, 94, into engagement with the lower surface of the cutting insert 83, such that when the securing pin 89 is depressed to release the cutting insert for removal from seat 82 of the cutting tool 81, by disengagement of fixating shoulder 87b from shoulder 83b, the spring ejector forces the cutting insert out of the seat 82 for convenient removal therefrom.

Attention is now drawn to FIGS. 17 to 21 illustrating several embodiments of the cutting tool according to the present invention in which the securing pin is manually movable within the bore of the cutting insert to a securing position or to a mounting position.

Figure 17:
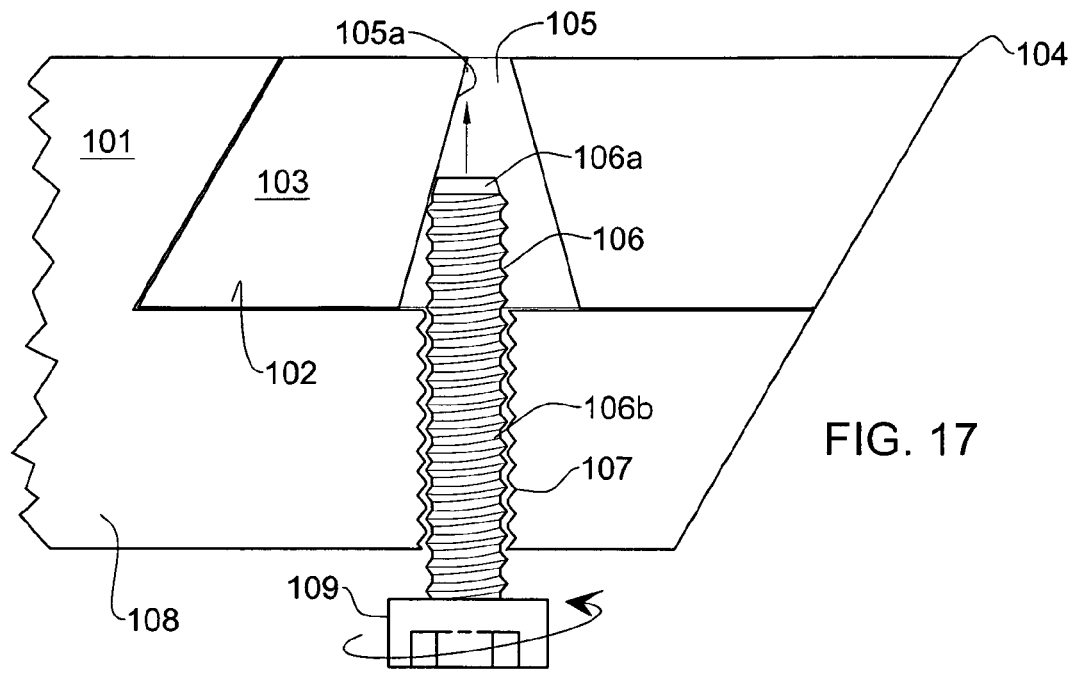
FIGS. 17 to 20 are schematic cross-sectional views of illustrate a cutting tool according to still further embodiments of the present invention.

Thus, as shown in FIG. 17, the cutting tool 101 is formed with a seat 102 for receiving the cutting insert 103 such as to define one or more cutting edges 104 for cutting operations. The cutting insert 103 is formed with a bore 105 which receives a securing pin 106 when the cutting insert is inserted into seat 102.

In the construction illustrated in FIG. 17, the securing pin 106 is formed with a tapered head 106a at its distal end, and with an externally-threaded shank 106b threaded in an internally-threaded bore 107 extending through the cutting tool 101. The proximal end of securing pin 106 projecting outwardly of bore 107 carries a knob 109 which may be manually rotated in either direction. The axis of the securing pin 106 is substantially parallel to the axis of bore 105 in the cutting insert 103.

It will thus be seen that, when the securing pin 106 is rotated in one direction by knob 109, it is moved axially upwardly to bring its tapered head 106a into firm contact with the inner surface 105a of the cutting insert 103 defining its bore 105, thereby displacing the cutting insert laterally to firmly secure it within seat 102 of the cutting tool 101. On the other hand, when knob 109 is rotated in the opposite direction, securing pin 106 is moved downwardly within bore 105, thereby causing the tapered head 106a of the securing pin to disengage from the inner surface 105b of the insert 103 defining bore 105, to release the cutting insert for removal, or for mounting a new cutting insert into the seat.

Figure 18:
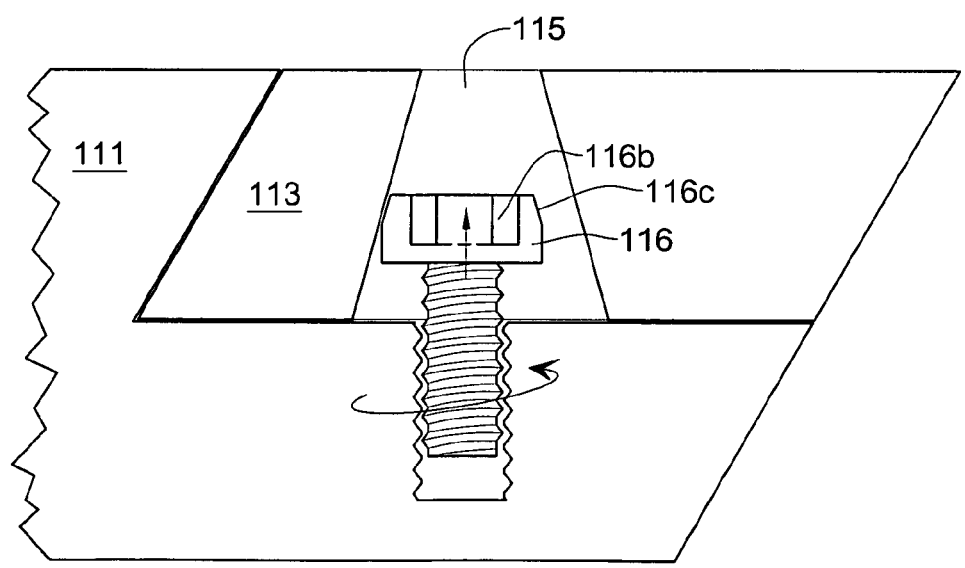

FIG. 18 illustrates a modification of FIG. 17, wherein the securing pin 116 is formed with an enlarged head 116a at its distal formed with a notch 116b accessible via the open end of bore 115 by a tool, in order to rotate the securing pin 116 to its respective securing and mounting positions.

However it should be noted than in both cases, the in order to secure the cutting insert in place, the distal end of the securing pin should be displaced axially upwards, i.e. away from the bottom surface and into the seat.

Figure 19:
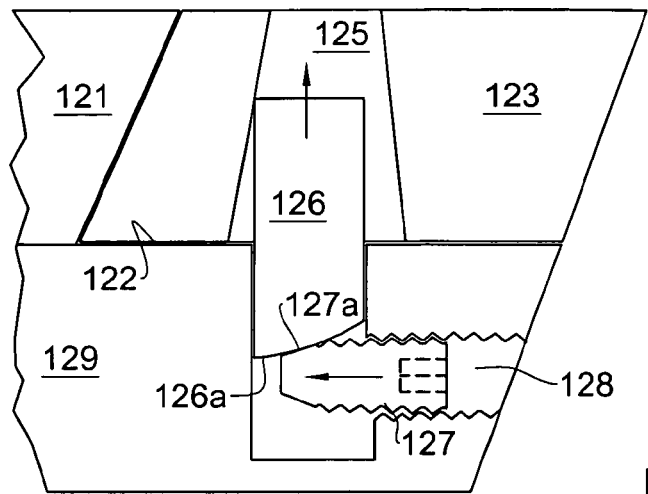

FIG. 19 illustrates another construction, wherein the securing pin 126 is not externally threaded, but rather is moved axially within bore 125 by a moving pin 127 threaded in bore 128 formed in a wall 129 of cutting tool 121 defining the seat 122. As shown in FIG. 19, the inner end of the moving pin 127 is tapered, as shown at 127a, and the lower surface of securing pin 126 is tapered, as shown at 126a, such that threading pin 127 inwardly will raise securing pin 126 to firmly bear against the inner surface of the cutting insert 123, and thereby to secure it in position, whereas rotating pin 127 in the opposite direction, will release the distal of securing pin 126 from its securing position with respect to the cutting insert 123.

Figure 20:
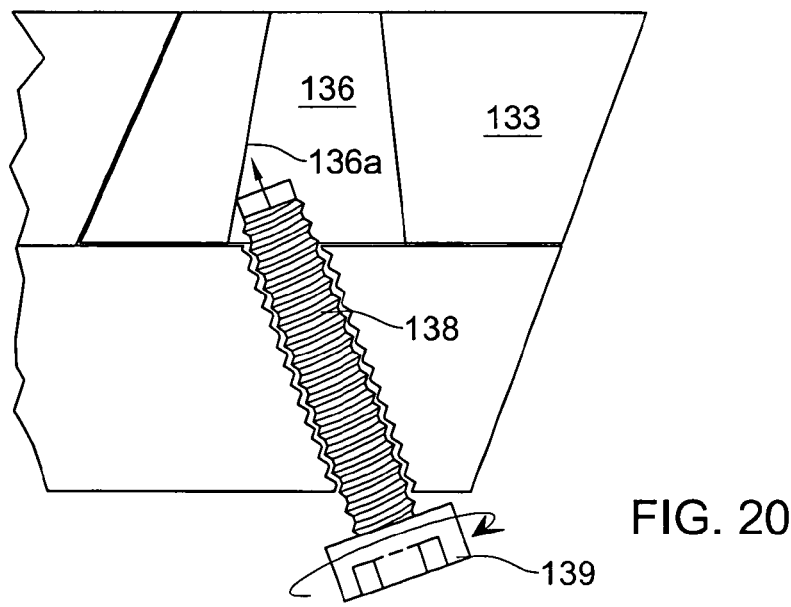

FIG. 20 illustrates a still further construction in which the axis of the securing pin 136 is oblique to the axis of bore 135 in the cutting insert 133. In this case, the distal 136a of the securing pin 136 is not necessarily tapered, or may be tapered for only a short portion, since the rotation of knob 139 will also secure and release the securing pin 136 in the same manner as described above with respect to FIG. 17.

Figure 21:
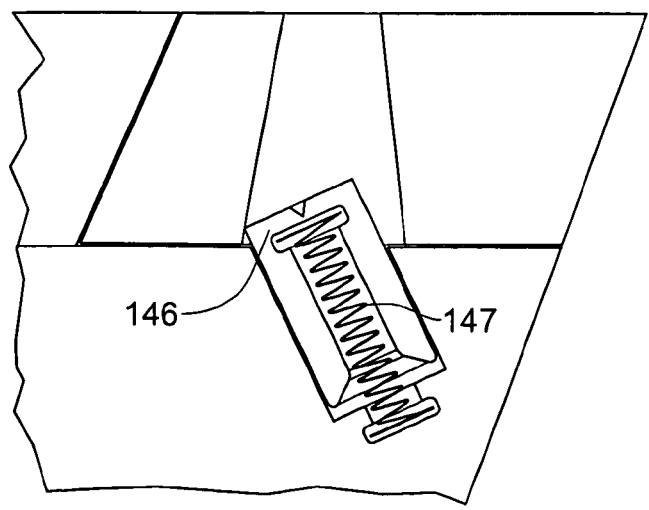
FIG. 21 is a schematic cross-sectional view of cutting tool according to another embodiment of the present invention.

FIG. 21 illustrates a construction similar to that of FIG. 20, except that, instead of moving the securing pin to its securing and releasing positions by a manual knob, the securing pin, therein designated 146, is spring-urged by spring 147 to its securing position, and is depressible by a tool engaging the upper surface of the securing pin to the releasing position.

It will be appreciated that the embodiments of FIGS. 17 to 19 could also be modified by including a spring to press the securing pin to its securing position, and by engaging its upper surface with a tool for moving the securing pin to its releasing position.

Figure 22:
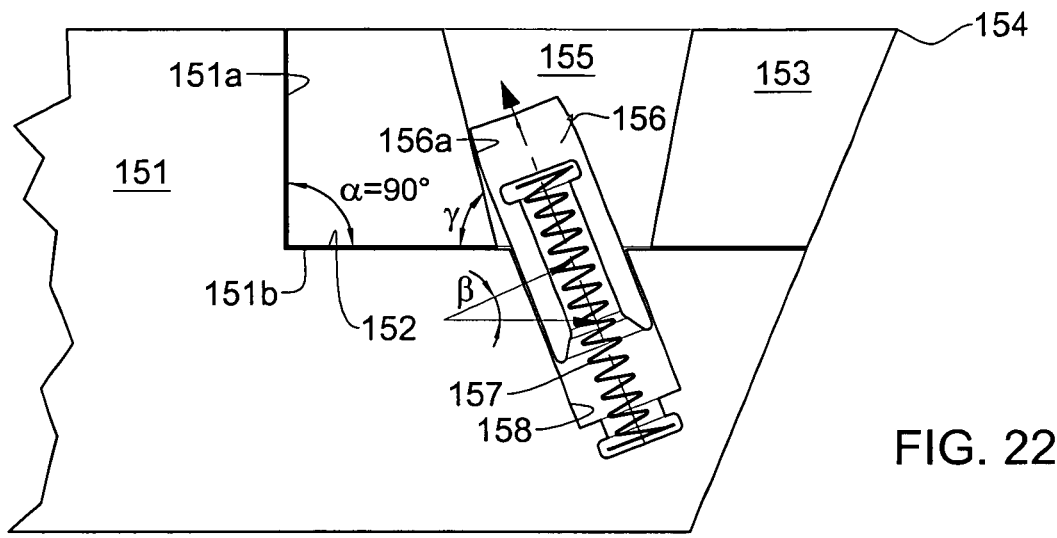
FIGS. 22 to 24 are schematic cross-sectional views of cutting tools employing various cutting inserts according to different embodiments of the present invention.

Turning now to FIG. 22, there is illustrates a cutting tool 151 formed with a seat 152 for receiving a cutting insert 153 having a plurality of cutting edges 154 and formed with a central bore 155. The cutting tool 151 further includes a securing pin 156 located within bore 155 and having an axis oblique to that of the axis of the bore and of the seat 152. Pin 156 is urged in the direction of the arrow by a spring 157 within a bore 158 in the cutting tool, and includes a tapered outer surface 156a at its distal end engageable with the wall of the bore 155 of the cutting insert 153.

It will be seen that bore 155 is tapered in the opposite direction from the constructions previously described; that is, it increases in diameter in the outward direction; also that side wall 151a and bottom wall 151b of the cutting tool 151, defining the seat 152 for receiving the cutting insert 153 at the side thereof opposite to the cutting edge 154, are perpendicular to each other; that is, $\alpha=90°$.

It will be further seen that the axis of the securing pin 156 ($\beta$) to the bottom wall of seat 152 is at a smaller angle than the angle ($\gamma$) of the inner surface of bore 153 to the bottom wall of the seat; also that pin 156 is urged by spring 157 outwardly to a securing position with respect to the cutting insert 153, but may be manually depressed outwardly to release the cutting insert for indexing a fresh cutting edge 154 for a cutting operation.

Figure 23:
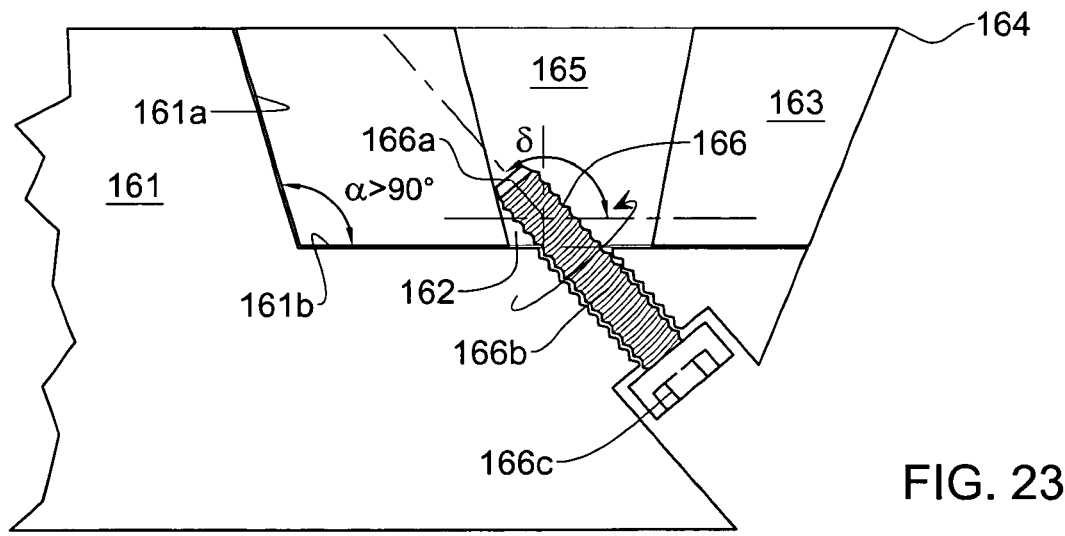

FIG. 23 illustrates a similar construction wherein the cutting tool 161 is also formed with a seat 162 for receiving a cutting insert 163 formed with a cutting edge 164 and a central bore 165 for receiving a securing pin 166 having an upper tapered surface 166a engageable with the inner surface of cutting insert 163 defining its bore 165. In FIG. 23, however, securing pin 166 is not spring-urged to its securing position, but rather includes threads 166b and a knob 166c which is rotatable in one direction to secure the cutting insert within seat 162, or in the opposite direction to release the cutting insert for removal from that seat.

Another difference in the construction of FIG. 23 is that the side wall 161a and bottom wall 161b, defining the seat 162 opposite to the cutting edge 164, is at an obtuse angle; that is, angle α is greater than 90°. However, the cutting insert still remains securely positioned in the mounting position since the inclination angle δ of the axis of the securing pin 166 is greater than α.

Figure 24:
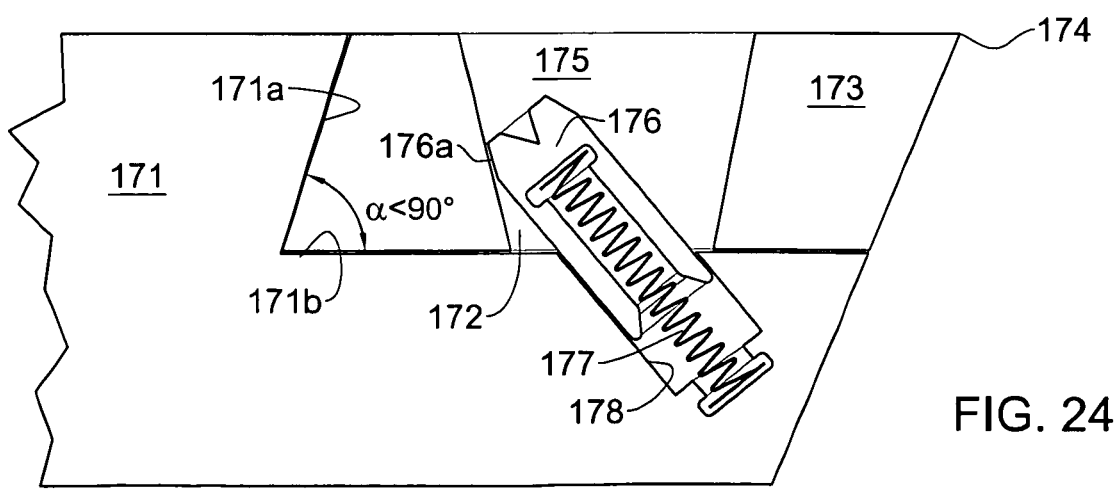

With reference to FIG. 24, there is illustrated a construction also similar to that of FIG. 22, with the difference being that the side wall 171a and bottom wall 171b of cutting tool 171, defining the seat 172 for receiving the cutting insert 173, is at an acute angle to each other; that is angle α is less than 90°.

Figure 25:
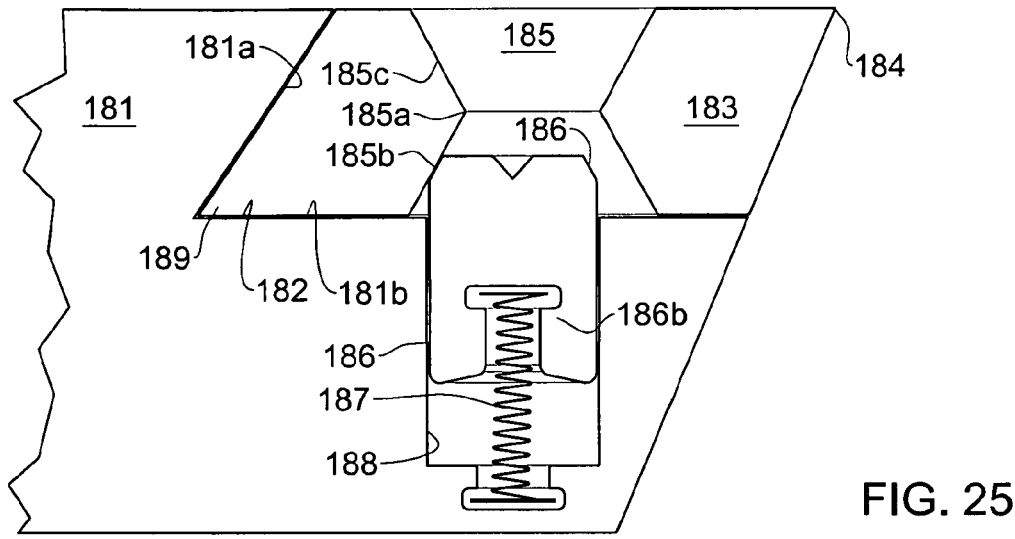
FIG. 25 is a schematic cross-sectional view of a cutting tool according to still a further embodiment of the present invention employing a reversible cutting insert.

Turning now to FIG. 25 a further construction of the cutting tool is shown wherein the cutting tool holder 181 is formed with a seat 182 for receiving the cutting insert 183 having a cutting edge 184 and a central bore 185. In this case, however, the cutting insert 183 is reversible, and the bore 185 is formed with two tapered sections from its mid portion 185a. Thus, one section 185b tapers from the mid section 185a outwardly to one face (the inner face) of the cutting insert, whereas the other section 185c tapers from mid portion 185a outwardly in the direction of its opposite face (the outer face) of the cutting insert.

Securing pin 186 in FIG. 25 has a longitudinal axis parallel to the longitudinal axis of bore 185 and includes an upper tapered surface 186a which is urged by spring 187 in bore 188 into contact with the inner surface of bore 185.

It will thus be seen that the construction illustrated in FIG. 25 enables the cutting insert 183 to be inserted into seat 182 with either face of the cutting insert facing the bottom of the seat 182, thereby enabling all the cutting edges 184 on each of the two opposite faces of the cutting insert to be oriented for use during a cutting operation. For example, if cutting insert 183 includes four edges 184 on each face, this arrangement enables eight cutting edges to be used for cutting operations.

Figure 26A:
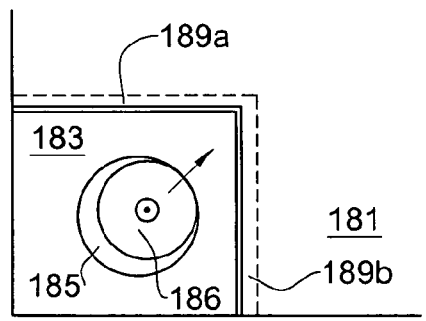
FIGS. 26A to 26C are schematic top views of three variations of the embodiment of the cutting tool shown FIG. 25.
Figure 26B:
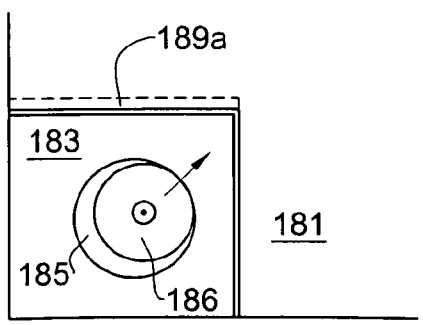
Figure 26C:
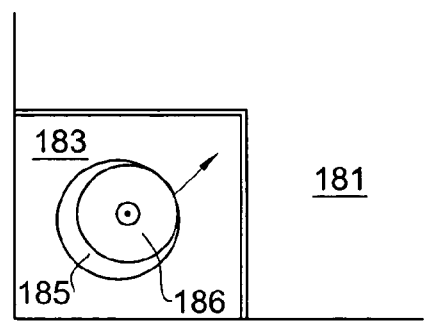

FIG. 26A is a top view of the construction illustrated in FIG. 25, wherein side wall 181a and bottom wall 181b of the cutting tool holder, defining the seat 182 for receiving the cutting insert 183, are at an acute angle to each other on two contiguous sides, thereby defining two projections 189a, 189b for securing the cutting insert 183 within seat 182 of the cutting tool. FIG. 26B illustrates a variation wherein the two walls 181a and 181b of the cutter defining seat 182 are at an acute angle at only one side of the cutting insert, thereby defining a single projection 189a in the securing position of the cutting insert. FIG. 26C illustrates a variation wherein the two walls 181a and 181b are perpendicular to each other such that no projection is formed in the securing position of the cutting insert, but the cutting insert is secured in position within the cutting tool by the lateral force applied by pin 186 to the cutting insert.

Figure 27A:
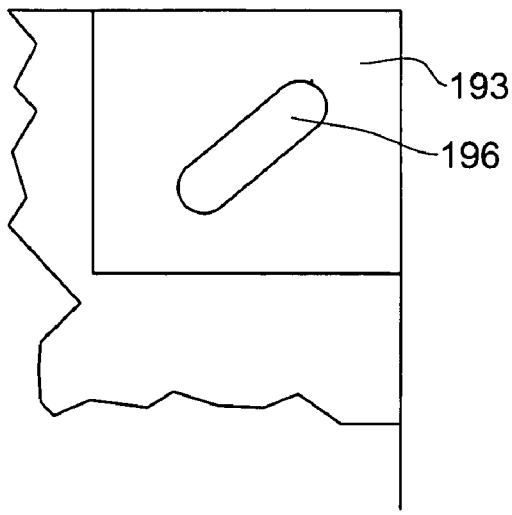
FIGS. 27A to 27C are schematic top views of three additional variations of the above embodiments of the cutting tool according to the present invention.
Figure 27B:
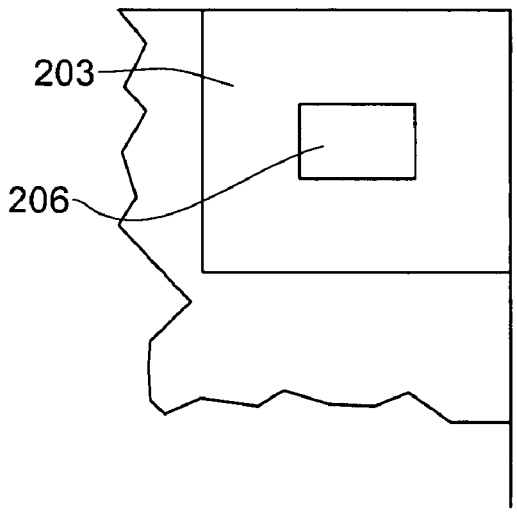
Figure 27C:
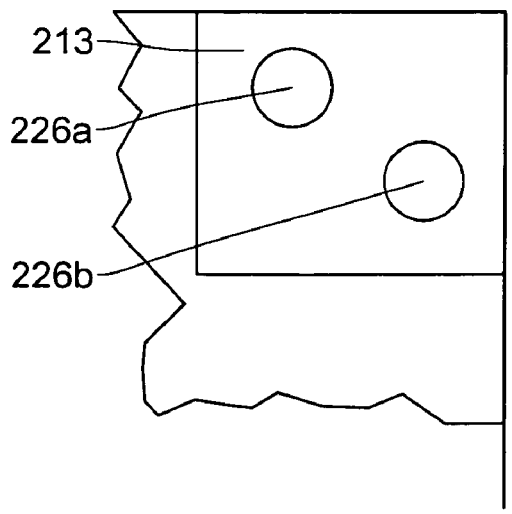

In most of the above-described embodiments, the securing pin is of circular cross-section. FIGS. 27A to 27C illustrate several further variations that may be made.

FIG. 27A illustrates a cutting insert 193 receiving a securing pin 196 of oblong cross-section; FIG. 27B illustrates a cutting insert 203 for receiving a securing pin 206 of square cross-section; and FIG. 27C illustrates a cutting insert 213 for receiving two securing pins 216a, 216b.

FIGS. 28A to 28G illustrate a cutting tool similar to that of FIGS. 25 and 26A to 26C, but including a bore 225 in the cutting insert 223, and a securing pin 226 of a polygonal configuration, more particularly of a rectangular configuration (FIG. 28C), rather than the cylindrical configuration of bore 185 and securing pin 186 in the construction of FIGS. 25 and 26A to 26C.

Figure 28A:
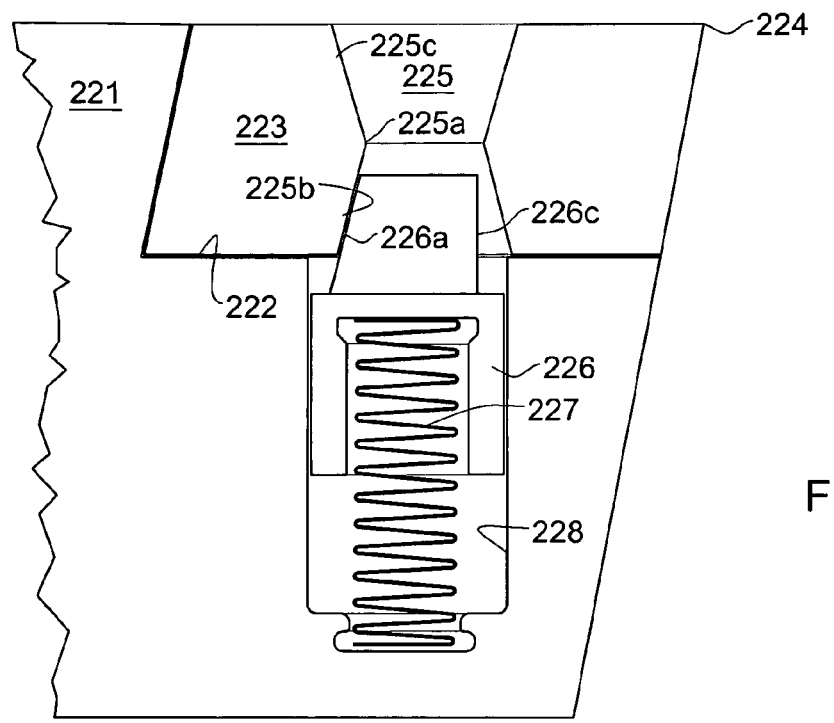
FIG. 28A is a schematic cross-sectional view of a further embodiment of the cutting tool, similar to that shown in FIG. 25.
Figure 28B:
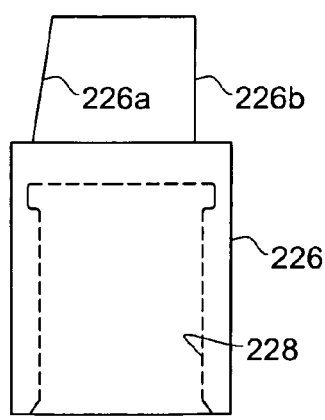
Figure 28C:
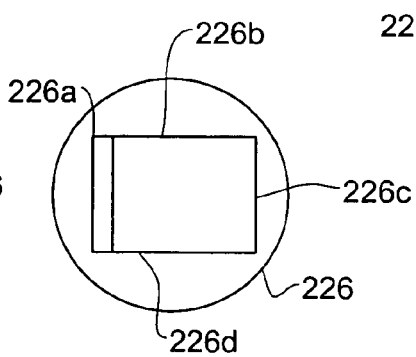
Figure 28D:
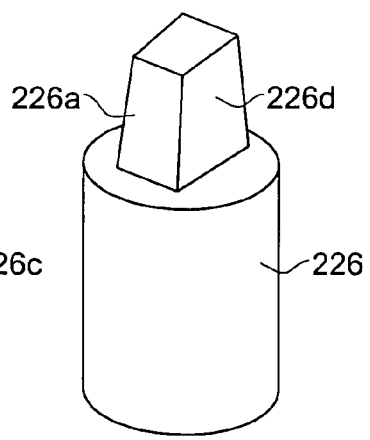

Thus, as shown in FIG. 28A, the cutting tool holder 221 is formed with a seat 222 for receiving the cutting insert 223 of a square configuration as cutting insert 183 in FIGS. 25 and 26A to 26C. Cutting insert 223 is also formed with a plurality of cutting edges 224, and a central bore 225 of a polygonal configuration, in this case of a square configuration (FIG. 28C), rather than of a circular configuration as indicated above.

Figure 28E:
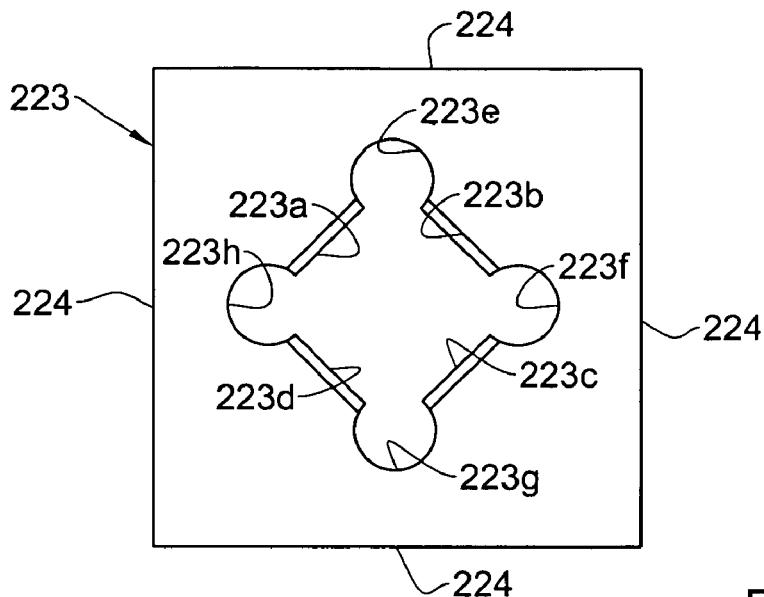
Figure 28F:
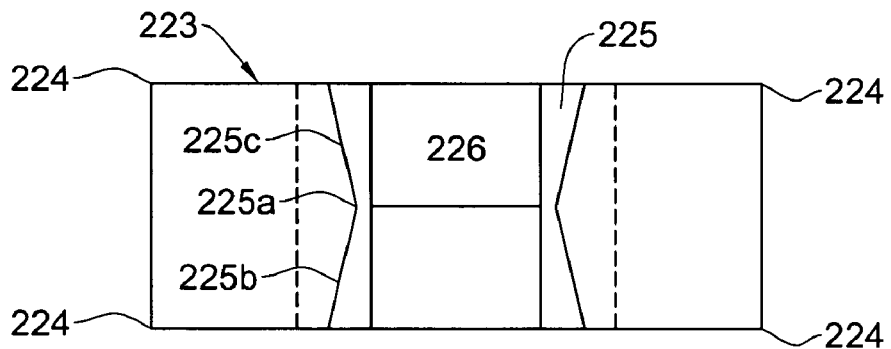
Figure 28G:
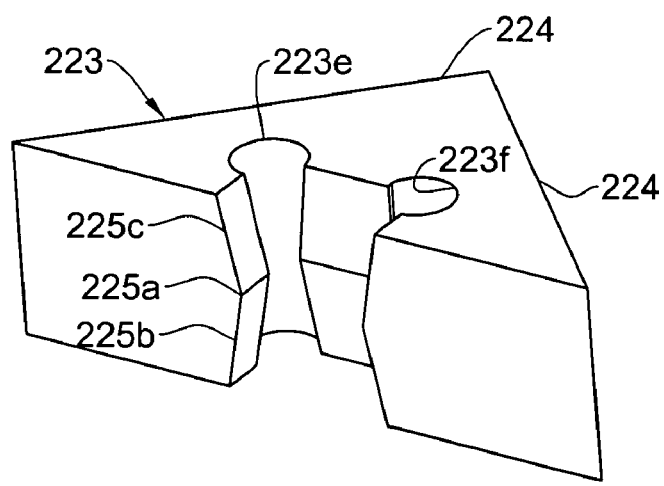

Thus, as shown more particularly in FIGS. 28E to 28G, cutting insert 223 is formed with a square bore defined by four flat sides 223a-223d. Cutting insert 223 defining square bore 225 is further formed with four small-diameter circular bores 223c-223h, one at each of the junctures of two of its flat sides. The smaller bores 223c-223h facilitate the manufacture of the square bore 225, and also distribute and relieve the stresses at the junctures of the flat sides.

In addition, and as shown in FIG. 28A, bore 225 is further formed with two tapered sections from its mid portion 225a, as in FIG. 25, wherein one portion 225b tapers from the mid portion 225a outwardly to one face (the inner face) of the cutting insert, and the other section 225c tapers from mid portion 225a outwardly in the direction of its opposite face (the outer face) of the cutting insert.

Securing pin 226 has a longitudinal axis parallel to the longitudinal axis of bore 225, and includes an upper tapered surface 226a (on one of its flat sides, which side is urged by spring 227 in bore 228 into contact with the inner surface of bore 225 in the cutting insert 221.

It will thus be seen that the construction illustrated in FIGS. 28A to 28G similarly enables the cutting insert 223 to be inserted into seat 222 with either face of the cutting insert facing the bottom of the seat 222, thereby enabling all the cutting edges 224 on each of the two opposite faces of the cutting insert to be oriented for use during a cutting operation. Whereas, in FIGS. 25 and 26A to 26C bore 185 in cutting insert 183, and the upper part of the securing pin cooperable with the sides of the bore, are both of a circular configuration, in the construction illustrated in FIGS. 28A to 28G both are of a polygonal configuration, more particularly a square configuration. It will also be observed as clearly seen in FIGS. 28A to 28D that the flat side 226a of securing pin 226 cooperable with the cutting insert 223 is of a tapered configuration, decreasing in length towards its outer face, whereas the remaining three sides 226b-226d are of a non-tapered configuration.

Figure 29A:
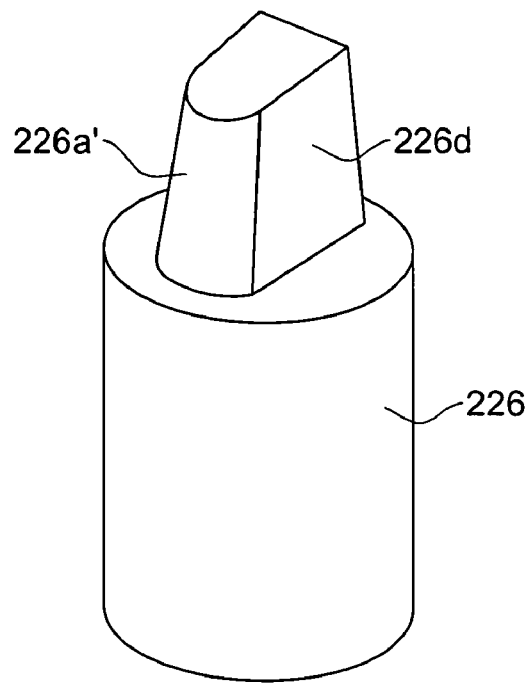
Figure 29B:
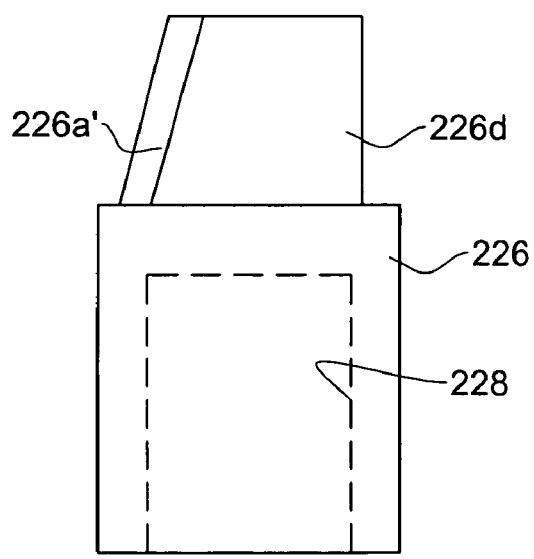
Figure 29C:
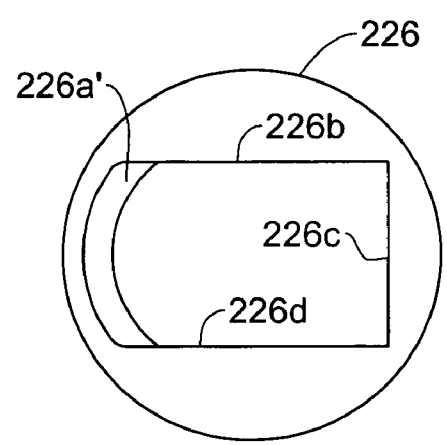

With reference to FIGS. 29A to 29C there is illustrated a securing pin 226 of a construction similar to that of the securing pin of FIGS. 28A to 28G, and therefore to facilitate understanding, corresponding parts have been identified by the same reference numerals. The main difference in the construction of FIGS. 29A to 29C is that the tapered face at the distal end of the securing pin 226 is rounded, as shown at 226a' (FIG. 29A), rather than flat. Such a construction thus provides line contact between tapered side 226a' of the securing pin with the corresponding surface of the cutting insert, rather than surface contact, thereby reducing friction.

FIGS. 30A to 30C illustrate a further construction of the cutting tool 231 according to the present invention formed with a seat 232 for receiving the cutting insert 233 having cutting edges 234 and a central bore 235 receiving a securing pin 236. As in the previous constructions, the distal 236a of securing pin 234 cooperates with the cutting insert 233, whereas the proximal end 236b of the securing pin includes a spring 237 which urges the distal end into securing position with respect to the cutting insert.

In this case, however, the inner portion 236b of securing pin 236 received within bore 238 is eccentric with respect to the upper portion 236a of the securing pin cooperable with cutting insert 233. In addition, the inner end 236b of securing pin 236 terminates in a disc 236c, seatable against the bottom of the seat 238 and of the same diameter as the seat. Further, securing pin 236 also includes an intermediate cylindrical section 236d coaxial with the inner section 236b and the bottom disc 236c, and therefore also eccentric with respect to the upper portion 236a of the securing pin. The intermediate portion 236d cooperates with the distal end of bore 238 and is of the same diameter as that bore.

Spring 237 is a coiled spring enclosing the inner section 236b of securing pin 236. One end 237a of the coil spring is fixed to the inner portion 236b of the securing pin 236, and the opposite end 237b is adapted to be received within an opening (not shown) in the cutting tool 23a adjacent to its bore 238.

It will thus be seen that securing pin 236 is rotatable within bore 235 of insert 233 and bore 238 underlying the seat 232 receiving the cutting insert. It will also be noticed that the bottom disc 236c and intermediate portion 236d serve as bearing elements eccentric with respect to the upper portion 236a of securing pin 236, such that rotation of the securing pin in one direction by spring 237 causes the upper portion 236a of securing pin 236 to firmly bear against the inner surface of the bore of the cutting insert 233 to secure the cutting insert firmly within the cutting tool 231 for a cutting operation. It will also be observed that securing pin 236 may be manually rotated in the opposite direction (against the force of spring 237) by a wrench inserted within wrench opening 236e to move the upper portion 236a of the securing pin to a mounting position with respect to the cutting insert, whenever it is desired to re-index the cutting insert for orienting a new cutting edge for a cutting operation.

Figure 31A:
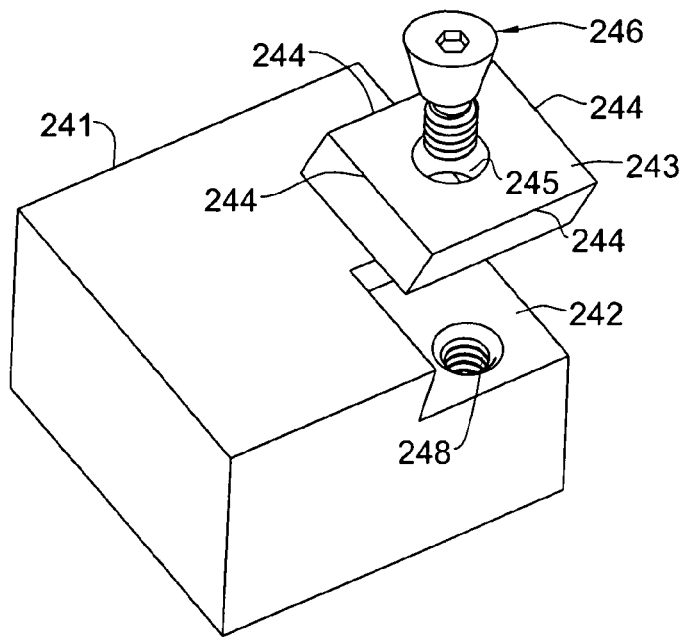
FIG. 31A is a schematic exploded perspective view of a cutting tool according to a still further embodiment of the present invention.
Figure 31B:
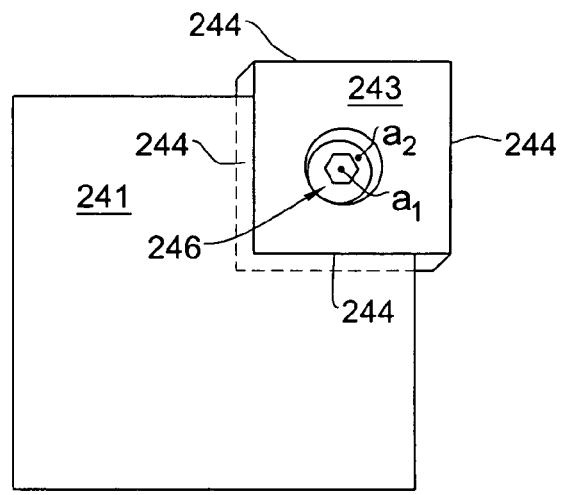
Figure 31C:
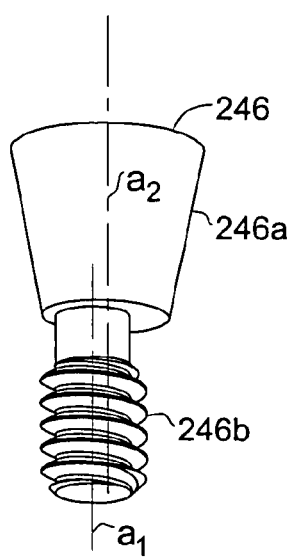

FIGS. 31A to 31C illustrate a still further embodiment of the invention, wherein the cutting tool holder 241 is formed with a seat 242 for receiving the cutting insert 243 having a plurality of cutting edges 244. Cutting insert 243 is formed with a bore 245 receiving a securing pin 246, such as to firmly secure the cutting insert 243 to cutting tool holder 241 for orienting a selected cutting edge 244 for a cutting operation.

As shown particularly in FIG. 31C, securing pin 246 includes an outer end 246a engageable with the sides of bore 245 in the cutting insert 243, and an inner end 246b which is externally threaded and receivable within an internally threaded bore 248 underlying seat 242 in the cutting tool.

The construction illustrated in FIGS. 31A to 31C is thus of somewhat similar construction to that of the prior art illustrated in FIG. 1, with the following important differences: In the prior art construction, the bore (6) in the cutting insert (4) is of the same diameter as the threaded fastener 7, and the head 8 of the threaded fastener is coaxial with the shank of the threaded fastener 7, and with the threaded bore 9 receiving the fastener. In the novel construction, however, as illustrated in FIGS. 31A-31C, the bore 245 within the cutting insert 243 is of larger diameter than the upper portion 246a of the securing pin 246, and the upper portion 246a of the securing pin is eccentric with respect to the threaded portion 246 of the securing pin. The latter is more particularly illustrated in FIGS. 31B and 31C, wherein the axis of the lower threaded portion 246b of the securing pin is indicated by $a_1$, and the axis of the upper portion 246 of the securing is indicated by axis $a_2$.

Thus, it should be understood that whereas in the conventional construction the rotation of the fastening member into the cutting tool holder entails application of downward pressure to the cutting insert in the direction of the bottom surface of the seat, in the present construction, rotation of the securing pin 246 entails lateral pressure in the direction of the side wall of the cutting tool holder 241.

It will thus be noted that, whereas in the prior art of FIG. 1, the fastening pin must be removed in order to index the cutting insert for a new cutting edge, and then reinserted to refasten the cutting insert, in the construction illustrated in FIGS. 31A-31C, the securing pin 246 need not be removed from the cutting tool 241 in order to re-index the cutting insert 243. Rather, it needs only to be rotated (e.g., one-half turn) in one direction to move the cutting insert 243 into a securing position with respect to the cutting tool 241, or in the opposite direction to move the cutting insert 243 to a releasing position with respect to the cutting tool 241 in order to reorient another cutting edge 244 for a cutting operation. The illustrated construction thus also, as in previously-described constructions, permits the cutting insert 243 to be released for manual indexing another cutting edge, without the need to remove the securing pin and to reinsert it, as required in the prior art construction illustrated in FIG. 1.

The construction illustrated in FIGS. 32A to 32E is similar to that of FIGS. 31A to 31C, except that it includes a conical disc 259 (FIGS. 32A and 32C) interposed between the outer end 256a of the securing pin 256 and seat 252 of the cutting tool 251. Conical disc 259 is formed with an opening 259a to receive securing pin 256, and is compressed when the threaded end 256b of the securing pin is firmly threaded in threaded bore 258 of the cutting tool 251 to apply an outward pressure to the securing pin 256 received within bore 254 of the cutting insert 253. Such a construction thereby provides added protection again the inadvertent rotation of the securing pin 256 from its securing position with respect to cutting insert 253 to its releasing position. Thus, the construction illustrated in FIGS. 32A to 32D first requires that the securing pin 256 be pressed inwardly, and then rotated, in order to release the pin from its securing position to its releasing position with respect to cutting insert 253.

Figure 32A:
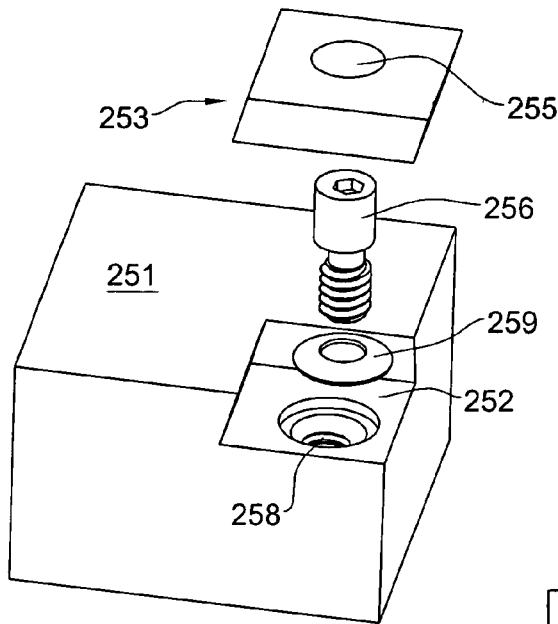
FIG. 32A is a schematic exploded perspective view of a still further embodiment of the invention.
Figure 32B:
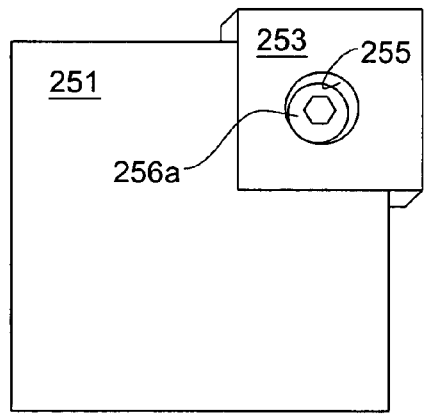
Figure 32C:
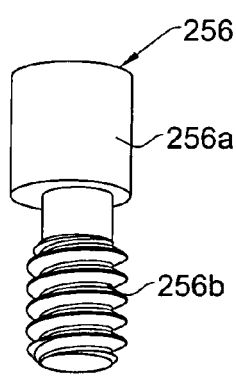
Figure 32D:
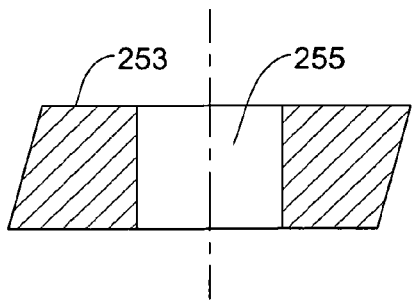
Figure 32E:
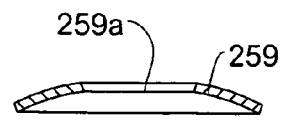

Another difference in the construction illustrated in FIGS. 32A to 32E is that the upper portion 256a of securing pin 256 is of cylindrical configuration, as clearly shown in FIG. 32C, whereas the upper portion 246a of the securing pin 246 is of conical configuration, as seen particularly in FIG. 31C.

In all other respects, the construction, operation and advantages provided by the cutting tool illustrated in FIGS. 32A to 32E are basically the same as described above with respect to FIGS. 31A to 31C.

Turning now to FIGS. 33 to 39, there is illustrated a cutting tool similar to the construction illustrated in FIG. 25, but modified to permit more firmly wedging the cutting insert between the securing pin and the cutting tool after the cutting insert has been indexed, or replaced, to provide a new cutting edge for a cutting operation.

Figure 33:
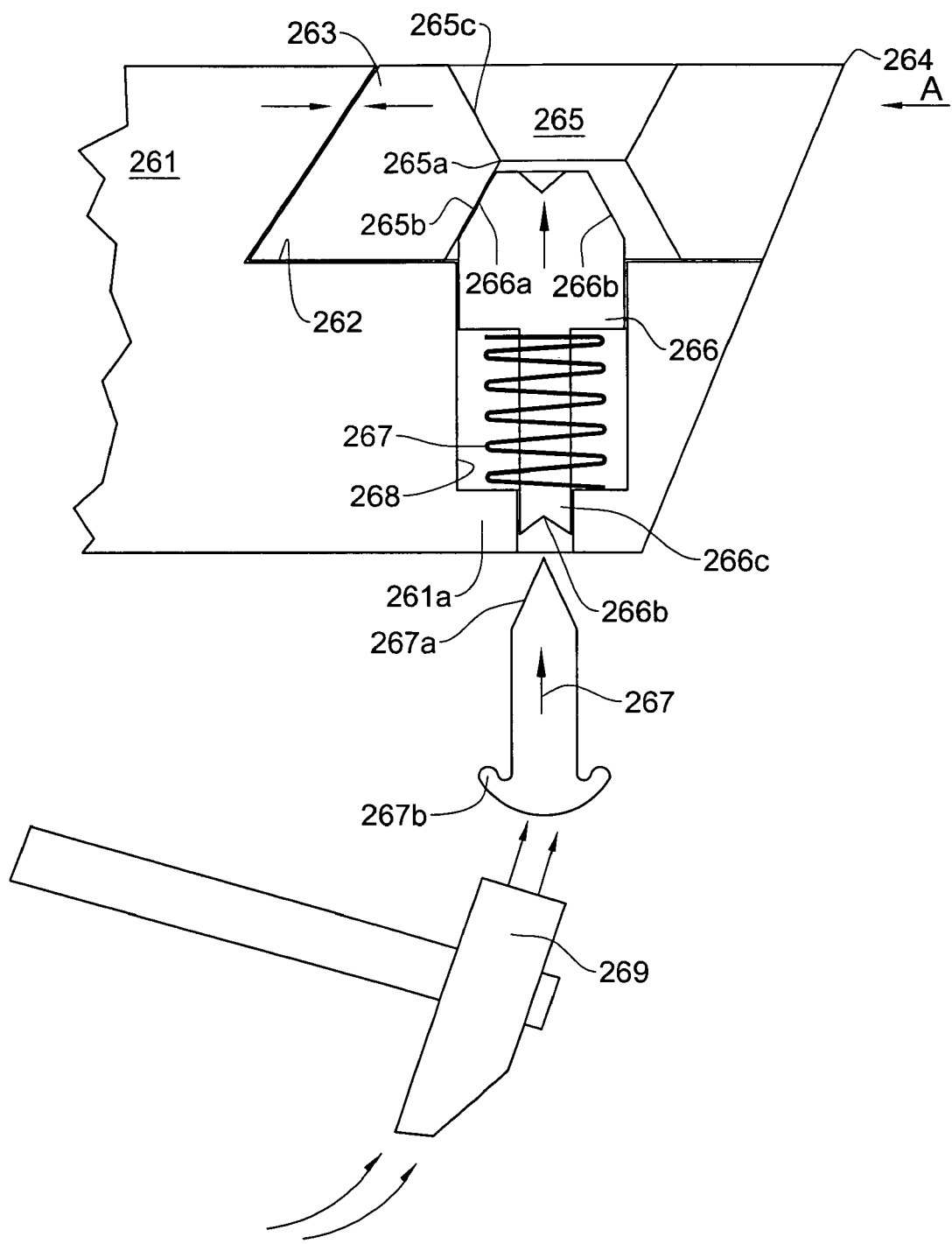
FIG. 33 is a schematic cross-sectional view of a cutting tool according to a further embodiment of the present invention.

Thus, the cutting tool holder illustrated in FIG. 33, and therein generally designated 261, is formed with a seat 262 for receiving the cutting insert 263 having a cutting edge 264 and a central bore 265. As in FIG. 25, bore 265 is formed with two tapered sections from its mid-portion 265a, one portion 265b tapering outwardly to the inner face of the cutting insert, and the other portion 265c tapering outwardly to the outer face of the cutting insert.

Securing pin 266 in FIG. 33 has a longitudinal axis parallel to the longitudinal axis of bore 265, and includes an upper tapered surface to 266a which is urged, by spring 267 in bore 268, into contact with the lower inner surface 265b of bore 265.

In the construction illustrated in FIG. 33, however, the bottom wall 261a of the bore in cutting tool 261 is formed with a central opening adapted to receive a stem 266c integrally formed in the securing pin 266. It will be seen that spring 267 urges securing pin 266 outwardly. Preferably, stem 266c is of a length so as to be substantially flush with the inner surface of cutting insert 261, or slightly recessed therefrom as shown in FIG. 33.

The purpose of stem 266c of securing pin 266 is to permit a sharp impact to be applied to the securing pin in the outward direction, to thereby firmly wedge cutting insert 263 between the securing pin and the cutting tool 261. Preferably, the impact is applied via an impact pin 267 having a tip 267a at one end impactable against the outer tip 266b of stem 266c, and thereby to wedge cutting insert 263 firmly within seat 262 between securing pin 266 and the cutting tool holder 261. For this purpose, the outer tip 226b of stem 266c is formed with a depression, such as a V-shaped notch, and the corresponding end of 267a of impact pin 267 is complementarily formed to seat within depression 226b. Impact pin 267 includes, at its opposite end, an enlarged head 267b for receiving an impact by a hammer 269 or other impact-producing member.

It will thus be seen that after the cutting insert 263 has been indexed, or replaced, to provide a new cutting edge 264 for cutting purposes, spring 267 will normally urge coupling pin 266 outwardly, to thereby firmly bear against the cutting insert 263, as described above particularly with respect to FIG. 25. However, when the construction illustrated in FIG. 33 is used, impact pin 267 may be impacted for applying a sharp impact to securing pin 266 in the outward direction, to more firmly wedge the cutting insert 263 within seat 262 of the cutting tool 261.

The cutting tool holder illustrated in FIG. 33 provides all the advantages described above with respect to the earlier constructions, with the additional advantage of better assuring that the cutting insert will be firmly wedged in the cutting tool. When only the spring 267 is used to firmly hold the cutting insert 263 within the cutting tool, a load applied by the workpiece against cutting insert 264 may set the cutting tool holder 261 in rapid vibration. Such vibrations tend to loosen the cutting insert 263 from the cutting tool holder 261 in the course of time, and to increase the rate of "metal fatigue" undergone by the cutting tool, thereby substantially decreasing its useful life. However, when the cutting insert is firmly wedged against the cutting tool holder, by applying an impact to it as described above with respect to FIG. 33, loosening of the cutting insert, and the onset of metal fatigue, are both substantially reduced, thereby producing better cutting operations and a longer useful life of the cutting insert.

Figure 34A:
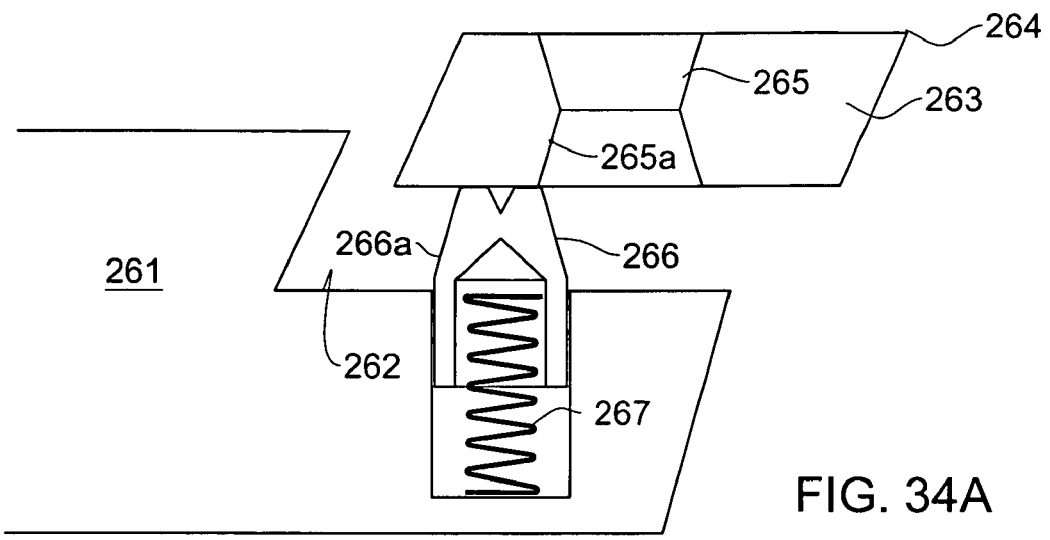
FIGS. 34A to 34C are schematic cross-sectional views illustrating three stages of mounting a cutting insert into a seat of a cutting tool holder according to another embodiment of the present invention.
Figure 34B:
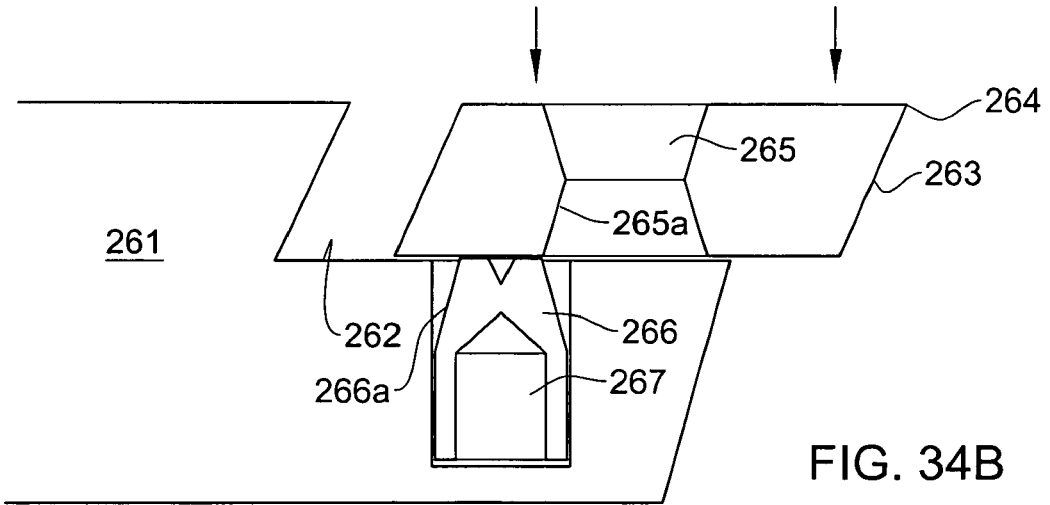
Figure 34C:
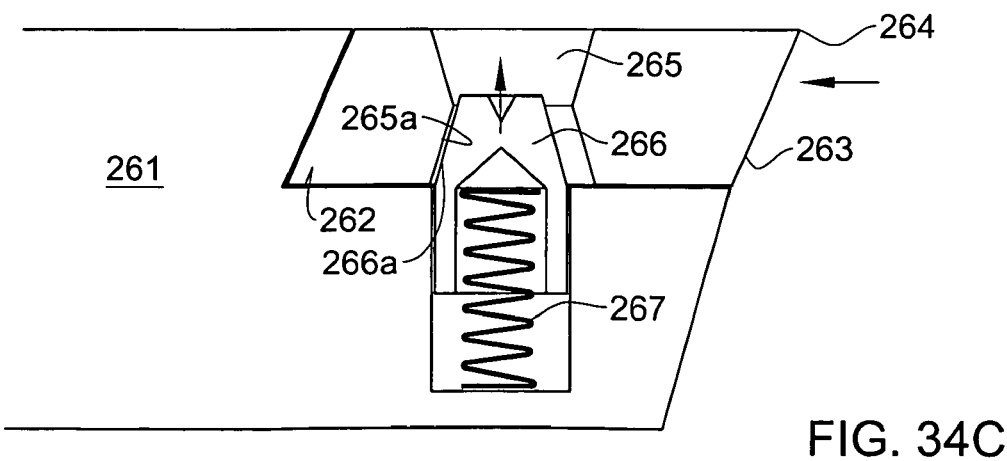

FIGS. 34A to 34C illustrate another cutting tool similar to that of FIG. 33, but constructed to firmly wedge the cutting insert between the cutting tool and the securing pin by a simple manual operation, rather than by a tool-applied impact operation as in FIG. 33. For the sake of brevity the parts in FIGS. 34A to 34C which generally correspond to the parts in FIG. 33 are identified by the same reference numerals.

In the construction illustrated in FIGS. 34A to 34C, the tapered surface 266a of the securing pin 266, and of the engaged surface 265b of the bore 265 in the cutting insert 263, are configured such as to firmly wedge the cutting insert between the securing pin and the tool holder when the cutting insert is applied as shown according to the sequence of steps illustrated in 34a-34c, respectively. Thus, as shown in FIG. 34A, the cutting insert 263 is placed over the securing pin 266 so as to engage the upper surface of securing pin 266 by a portion of the bottom surface of cutting insert 263 (FIG. 34A); then the cutting insert 263 is pressed downwardly to depress securing pin 266 (FIG. 34B); and finally the cutting insert 263 is slid laterally across the top of the securing pin until the securing pin pops outwardly within bore 265 of the cutting insert (FIG. 34C). Tapered surface 266a of the securing pin, engaging tapered surface 265a of the bore 265 within the cutting insert 263, firmly wedges the cutting insert between the securing pin and the side wall of seat 262 of the cutting tool holder 261. For purposes of example, such tapered surface may be about 5-15° preferably about 10°.

All the foregoing operations can be done manually in one continuous movement, therefore obviating the need for impact elements, such as 267, 269 in FIG. 33. To free the cutting insert, an impact tool, such as used in producing dimples in the surface of a metal workpiece, may be used by applying the tip of the tool to the upper surface of securing pin 266 and impacting it downwardly, thereby moving tapered surface 266a downwardly with respect to tapered surface 265b, to release the cutting insert for rotation, replacement, etc. when it is desired to provide a fresh cutting edge for a cutting operation.

Figure 35:
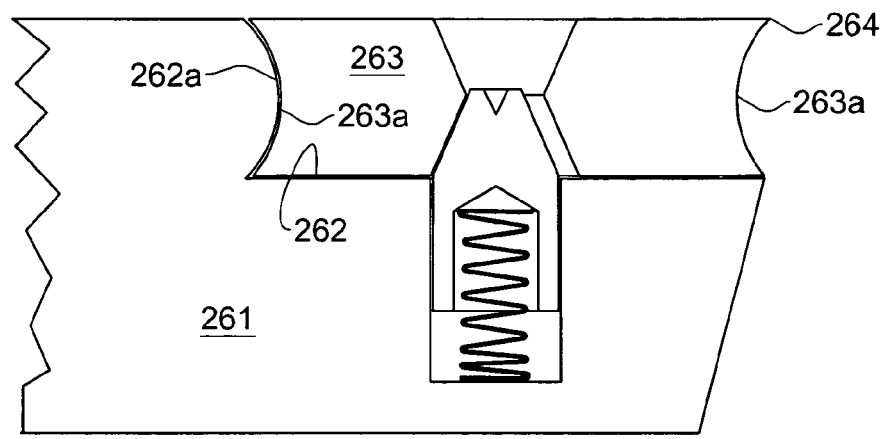
FIG. 35 is a schematic cross-sectional view of a cutting tool according to still a further embodiment of the present invention.
Figure 36:
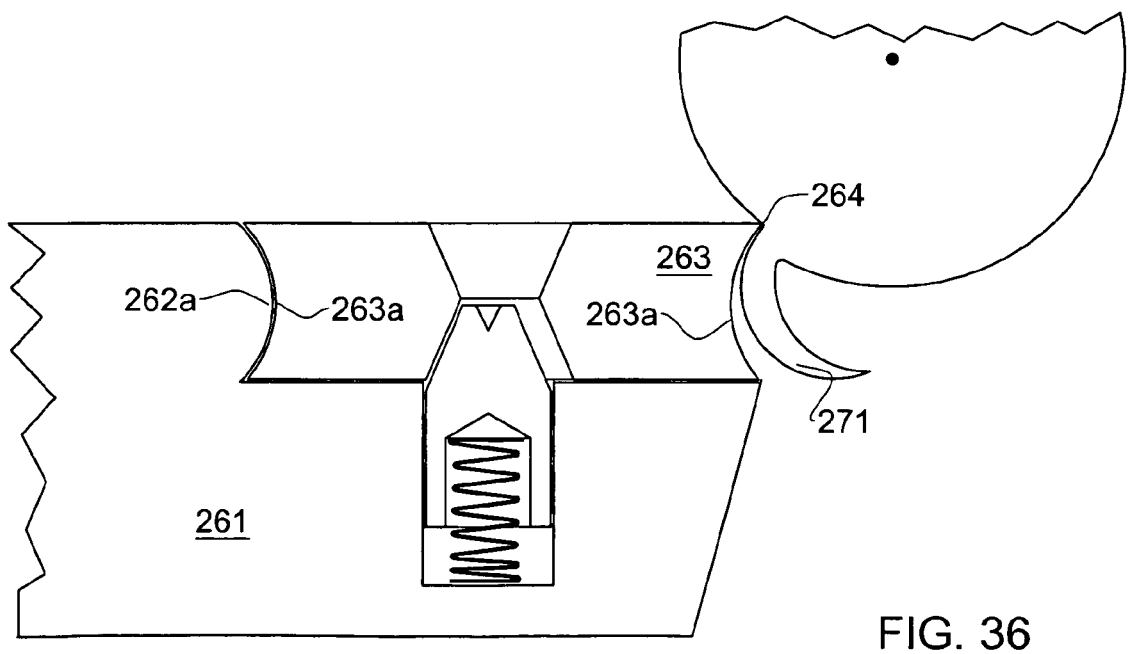
FIG. 36 is a schematic cross-sectional view illustrating the operation of the cutting tool shown in FIG. 35.

FIG. 35 illustrates another construction, also similar to that of FIGS. 33 and 34A to 34C, and therefore for purposes of brevity, the same reference numerals are used to identify corresponding parts. The construction illustrated in FIG. 35 differs from the preceding constructions in that the side wall 262a of the seat 262 formed in the cutting tool holder 261 is of a convex configuration, and the outer surface 263a of the cutting insert 263 is of complementary concave configuration. Such a construction not only produces an interlock formation between the cutting insert and the tool holder, as in the previously described embodiments, but also facilitates the handling of the shavings by the cutting insert due to the concave rake surface. Thus, as shown in FIG. 36, during a cutting operation with respect to a workpiece 270, convex surface 263a of the cutting insert 263 is effective to deflect the shavings 271 produced by the cutting edge 264 outwardly of the cutting insert thereby decreasing the possibility that such shavings will interfere with the cutting operation.

Figure 37:
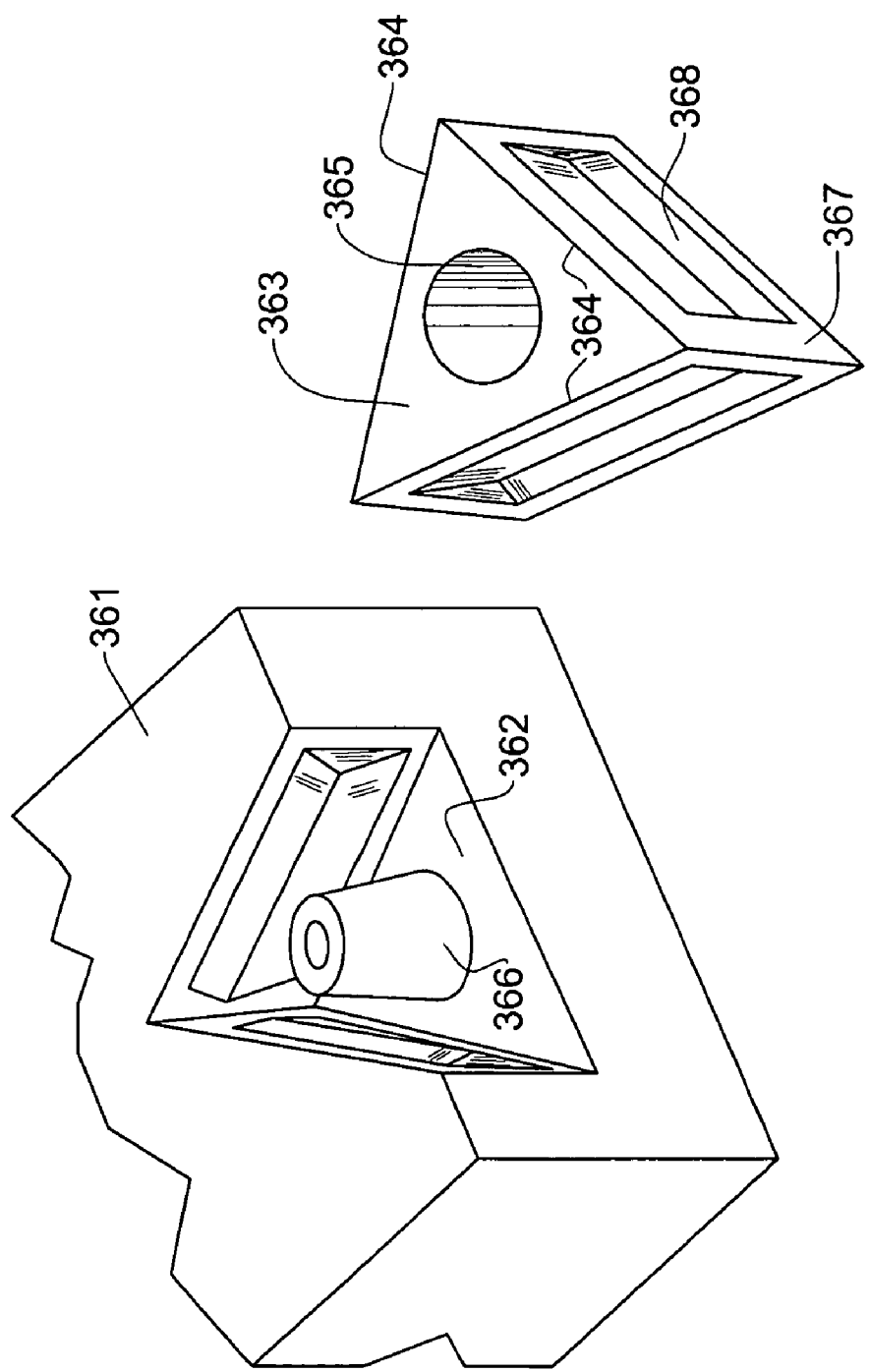
FIG. 37 is a schematic exploded perspective view of a cutting tool holder and a triangular cutting insert according to yet a further embodiment of the present invention.

As indicated earlier, the cutting insert may be of any polygonal configuration, such as triangular, quadrilateral, hexagonal, octagonal, etc. FIG. 37 illustrates an example wherein the cutting tool 361 is provided with a triangularly-shaped seat 362, and a cutting insert 363 is of similarly triangular shape. The cutting insert includes three cutting edges 364 which may be selectively indexed for a cutting operation. Cutting insert 363 is also formed with a bore 365 adapted for receiving therein a securing pin 366, which may be of any of the above-described constructions to lock the cutting insert in position during the cutting operation, and release it for removal or rotation in order to present a new cutting edge for a cutting operation.

In addition, each side face 367 is formed with a securing portion in the form of a v-shaped groove 368, adapted to engage a corresponding to v-shaped rib formed in the side wall of the cutting tool holder 361. The purpose of the v-shaped groove will no be further discussed with respect to FIG. 38.

Figure 38:
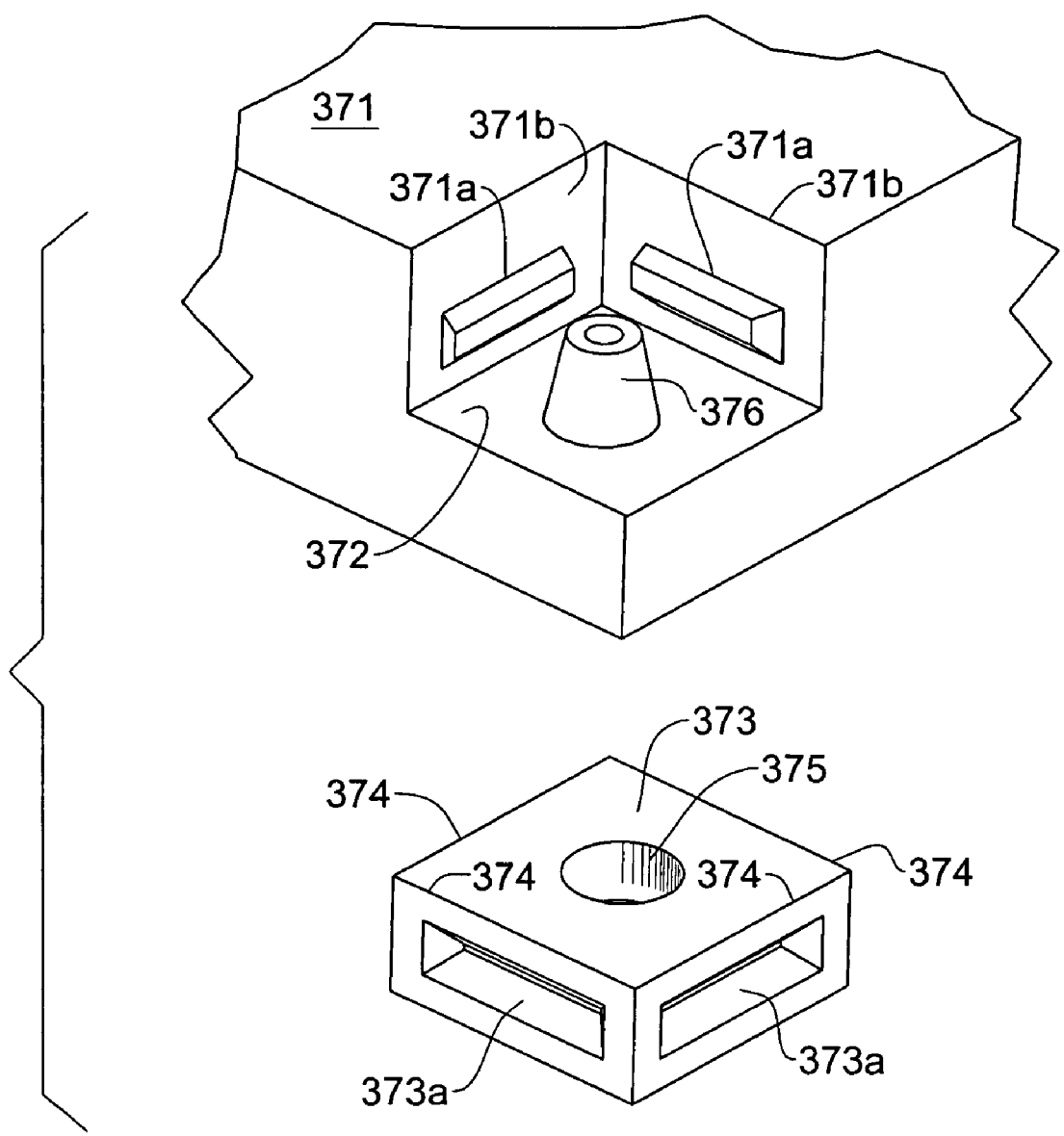
FIG. 38 is a schematic exploded perspective view of cutting tool holder and a rectangular cutting insert according to still a further embodiment of the present invention.

FIG. 38 illustrates a construction similar to that of FIG. 10, including a cutting tool 371 formed with a square seat 372 receives a cutting insert 373 of square configuration, including four cutting edges 374 on its upper side, as well as an additional four cutting edges on its lower side. The cutting insert is further formed with a central bore 375 adapted to receive a pin 376 centrally of the seat 372 of the cutting tool. As in the FIG. 10 construction, the construction illustrated in FIG. 38 also includes a rib 371a in the two side walls defining the seat 372, and the four outer sides of the cutting insert 373 include four grooves 373a for receiving the ribs 371a when the cutting insert is firmly secured within the seat 372 by securing pin 376.

As distinguished from the FIG. 10 construction, however, the two sides 371b of the cutting tool seat 372 receiving the cutting insert 373 extend perpendicularly to the bottom wall of the seat, rather than at an angle thereto as illustrated in FIG. 10. Similarly, the four outer sides 373e of the cutting insert 373 are similarly formed perpendicularly to the bottom wall of the cutting insert. In all other respects, the construction illustrated in FIG. 38, and the operation of such a construction, are substantially the same as described above with respect to FIG. 10.

It should be noted here that the interlocking engagement between the v-shaped grooves 373a and the v-shaped ribs 371a, provides the cutting insert with resistance to axial loads applied thereto during a cutting operation, so as to prevent disengagement of the bottom face of the cutting insert from the bottom surface of the seat 372. It should also be noted that this resistance to axial loads is provided so long as the cutting insert is prevented from lateral sliding displacement between the bottom face thereof and the bottom surface of the seat, in other words, so long as it is secured such that the side face thereof is aligned with the side wall of the seat, and the v-shaped grooves 373a interlock with the v-shaped rib 371a.

In the present example, the securing pin 376 also constitutes an arresting member preventing disengagement of the groove 373a from the rib 371a. However, it should be understood that the cutting tool holder may be formed with an arresting member preventing such disengagement.

Figure 39A:
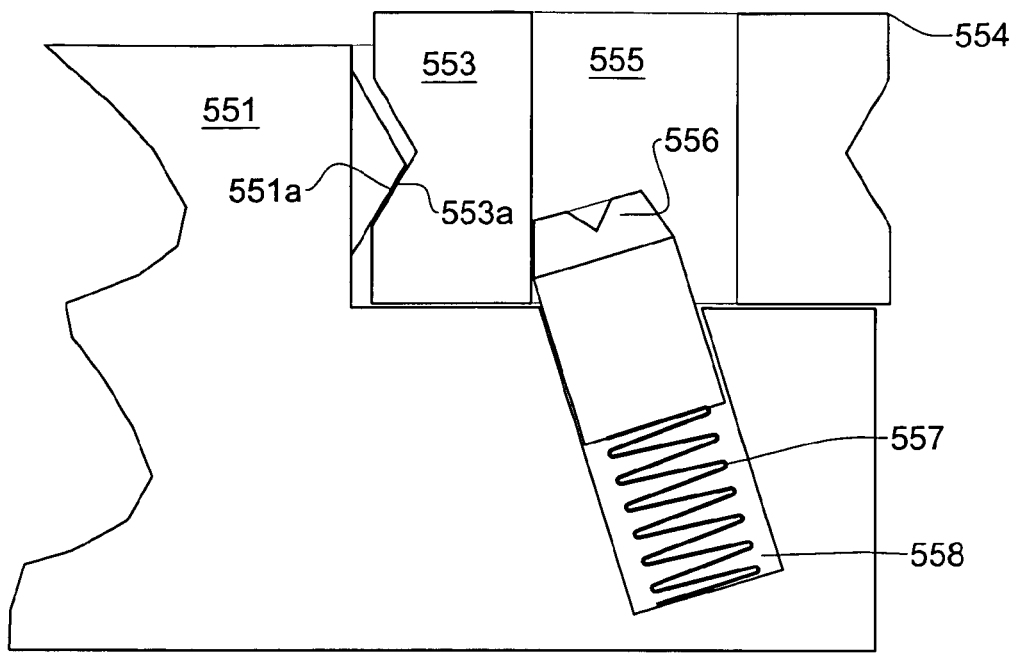
FIG. 39A is a schematic cross-sectional view of the cutting insert shown in FIG. 38.
Figure 39B:
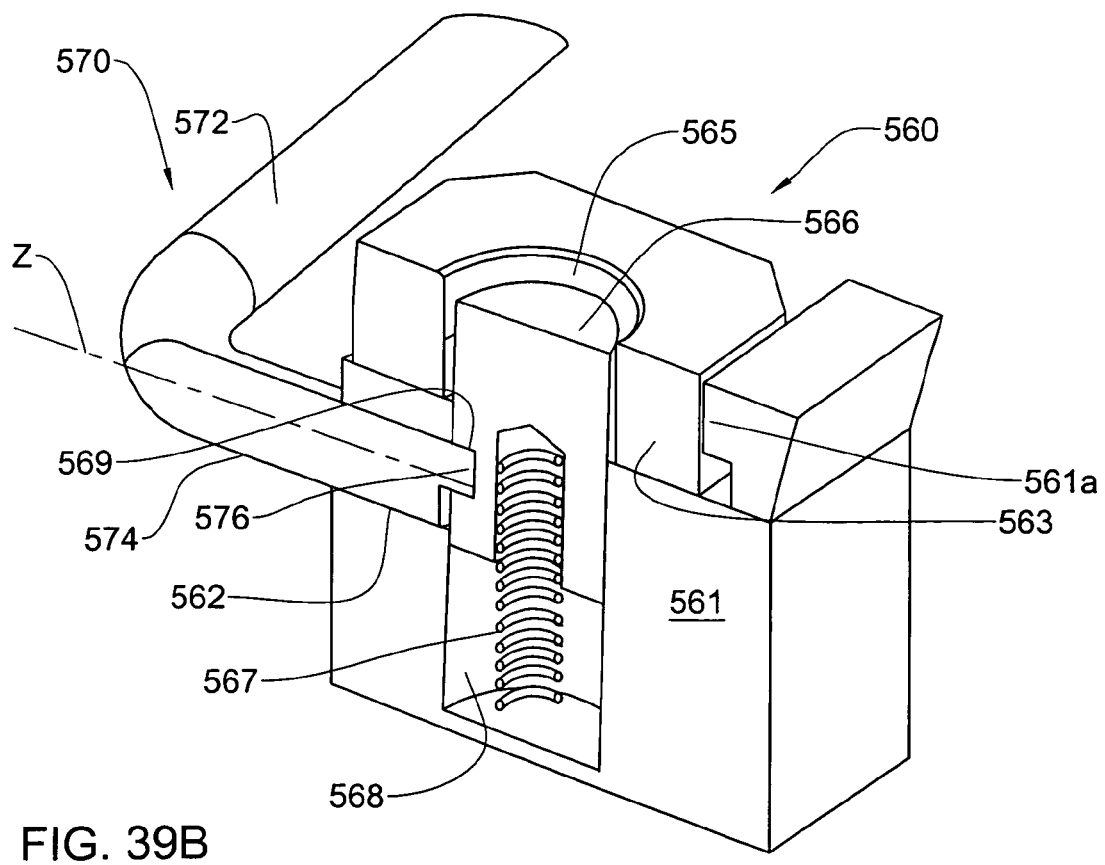
FIG. 39B is an isometric section view of a cutting tool according to yet another embodiment of the present invention.

Turning now to FIGS. 39A and 39B, there is illustrated a cutting tool and cutting insert also similar to that of FIG. 10, but obviating the need for producing a tapered bore, which is difficult to produce using standard manufacturing procedures. To facilitate understanding FIG. 39A, corresponding parts in that figure are identified by reference numerals corresponding to those used in FIG. 10, but increased by "500".

Thus, the bore 555 formed centrally in insert 553 is of a cylindrical, non-tapered configuration, rather than of a tapered configuration as illustrated (at 55) in FIG. 10. In addition, rib 551a in the cutting tool 551, and the complementary groove 553a in the cutting insert 553, are of a triangular configuration, rather than of a trapezoidal configuration in FIG. 10, and are formed via two respective walls of cutting tool 551 and cutting insert 553 extending perpendicularly to the bottom wall of seat 552 in the cutting tool.

As further seen in FIG. 39A, bore 558 formed in the bottom wall of seat 552 for securing pin 556 and biasing spring 557 is at an oblique angle to the bottom wall of seat 552, rather than perpendicularly thereto as in FIG. 10.

The cutting insert illustrated in FIG. 39A is attachable and detachable with respect to the cutting tool 551 in the same manner as described above with respect to FIGS. 34A to 34c, and provides the same advantages of firmly wedging the cutting insert 553 in seat 552 of the cutting tool 551 in a simple manual operation as described in FIGS. 34A to 34C. The FIG. 39A construction, however, has the significant advantage over that of FIG. 10, and that of FIGS. 34A to 34C, in that the bore 55, and interengageable walls of cutting tool 551 and cutting insert 553, respectively, obviate the need and expense of forming these walls in a tapered configuration.

With reference now made to FIG. 39B, an additional modification to the cutting tool of the present invention is shown in which in order to depress the securing pin 566, it is not required to apply pressure from to the distal end de thereof. In particular, the cutting tool holder 561 is formed with a side bore 562 adapted to receive an end 574 of a lever 570, to be received within a corresponding recess 569 formed in the securing pin 566 adjacent the proximal end pe thereof.

The end portion of the lever 370 is formed with an eccentric protrusion 576, wherein, when the protrusion 576 is received within the recess 569, rotation of the lever 370 entails axial displacement of the securing pin 566.

Figure 40:
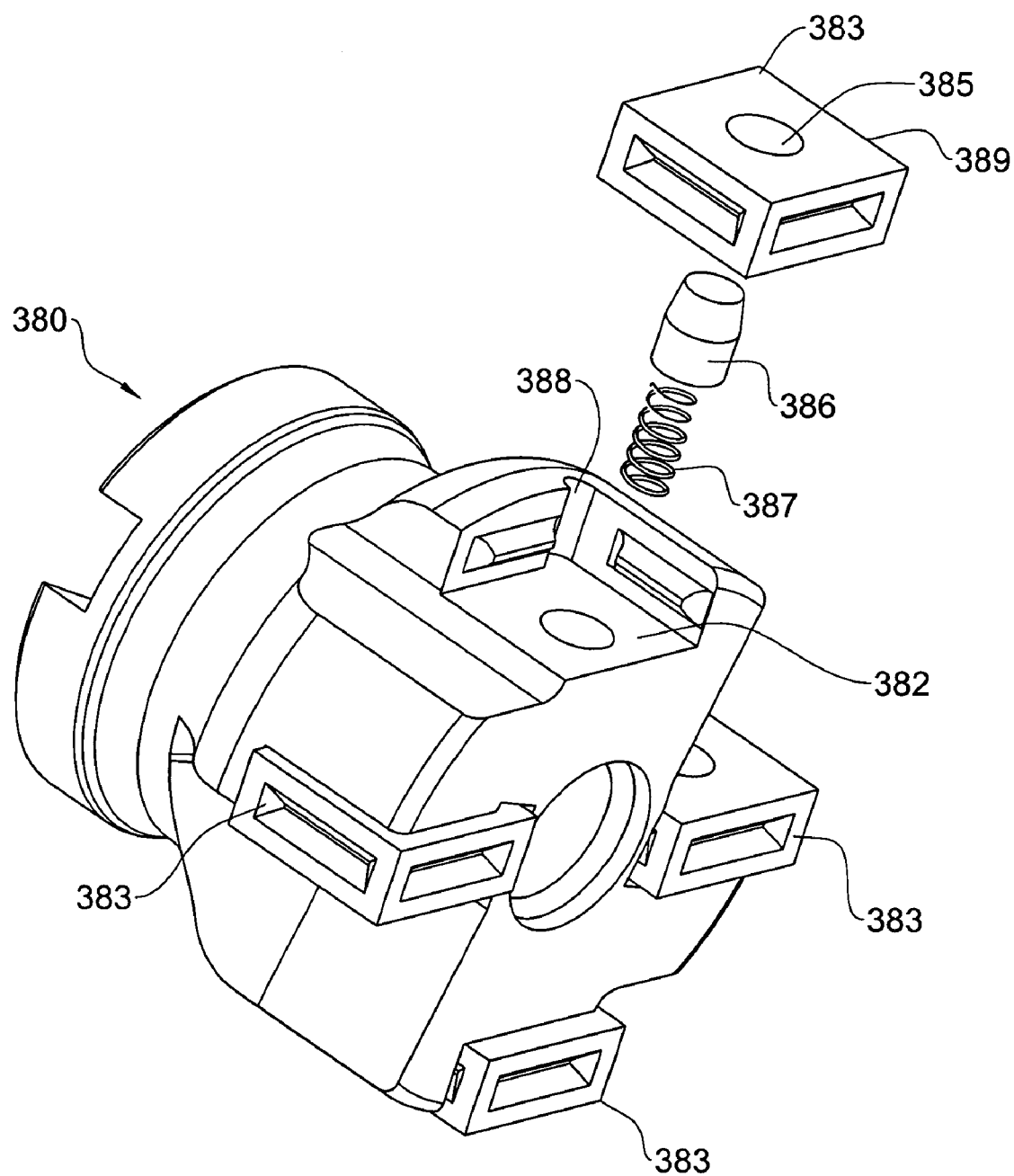
FIG. 40 is a partially exploded perspective view of a milling tool and a plurality of cutting inserts according to another embodiment of the present invention.

FIG. 40 illustrates a cutter head, generally designated 380, formed with four rectangular seats 382 for releasably receiving four cutting inserts 383, each of the construction illustrated in FIG. 38. Thus, as shown in FIG. 39, each cutting insert 383 is formed with four cutting edges 384 on each side, and with a bore 385 in its center for receiving a securing pin 386 spring-urged outwardly by a coil spring 387 located centrally of each seat 382 of the cutter head 380. In the construction illustration in FIG. 39A, the corner at two contiguous sides of the seat is formed with a rounded cut-out 388, similar to the construction illustrated in FIG. 28E, in order to relieve stresses.

It will be appreciated that the constructions illustrated in FIGS. 38, 39A and 39B may include a rib 381b only on one side wall of seat 382, rather than on each of the two contiguous side walls as illustrated in these figures.

Turning now to FIGS. 41 to 44, in all the above-described constructions, the cutting inserts are of polygonal configuration, with a cutting edge on each of its sides. FIGS. 41 to 44 illustrate a construction including a cutter head 460 designed to carry cutting inserts 453 of circular configuration, rather than of polygonal configuration, to provide, in effect, an infinite number of sides of the cutting edge. The construction illustrated in FIGS. 41 to 44 is also such that the cutting insert 453 rotates slowly and automatically during a cutting operation, so that it is not necessary to be continuously re-index the cutting insert with respect to the cutting edge oriented for the cutting operation.

Figure 41:
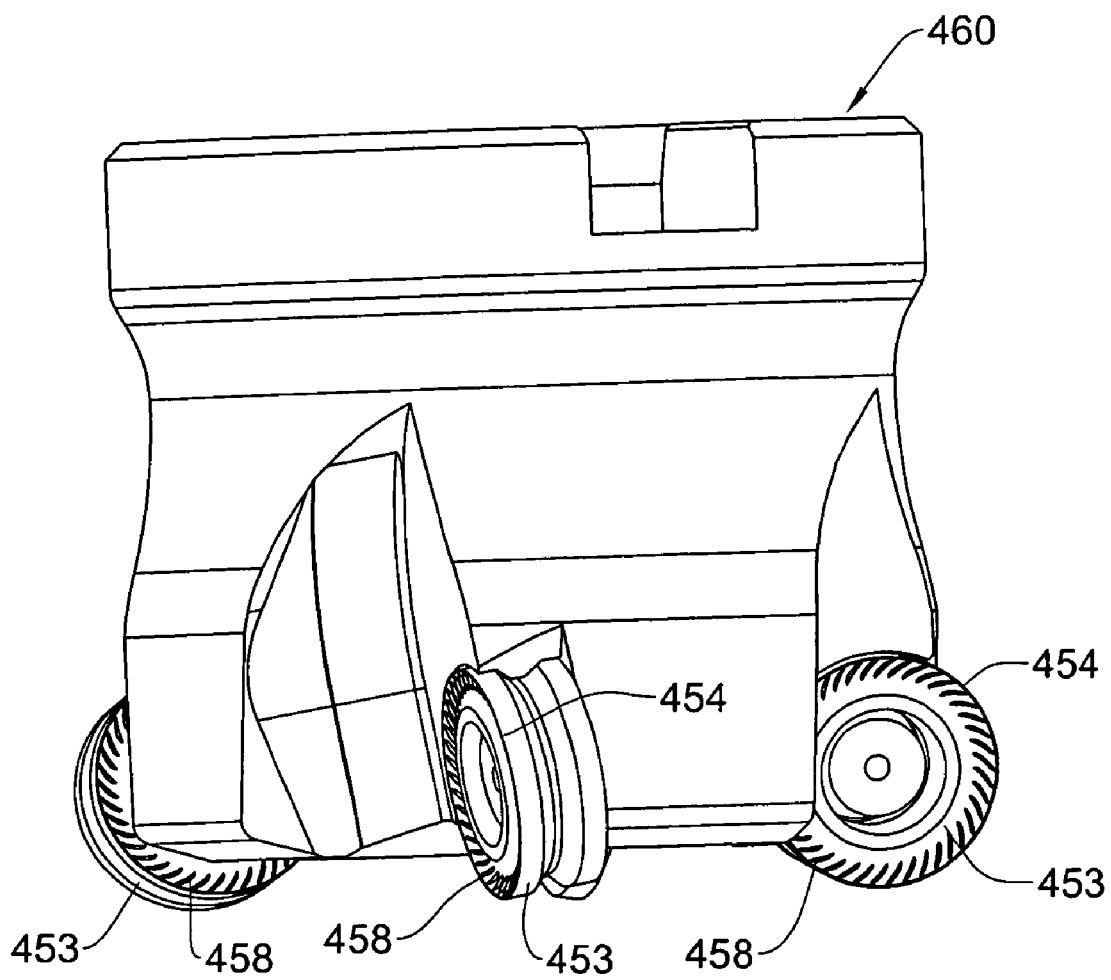
FIG. 41 is a perspective view of a milling tool comprising a plurality of circular cutting inserts in accordance with another embodiment of the present invention.

Thus, as seen particularly in FIG. 41, each cutting insert 453 is of circular configuration and is received within a seat 451 of a complementary circular configuration. Each cutting insert 453 is formed with a continuous circular cutting edge 454 around its outer periphery, and with a central bore 455 for receiving a securing pin 456 spring-urged by spring 457 in the outward direction with respect to bore 455.

Figure 42:
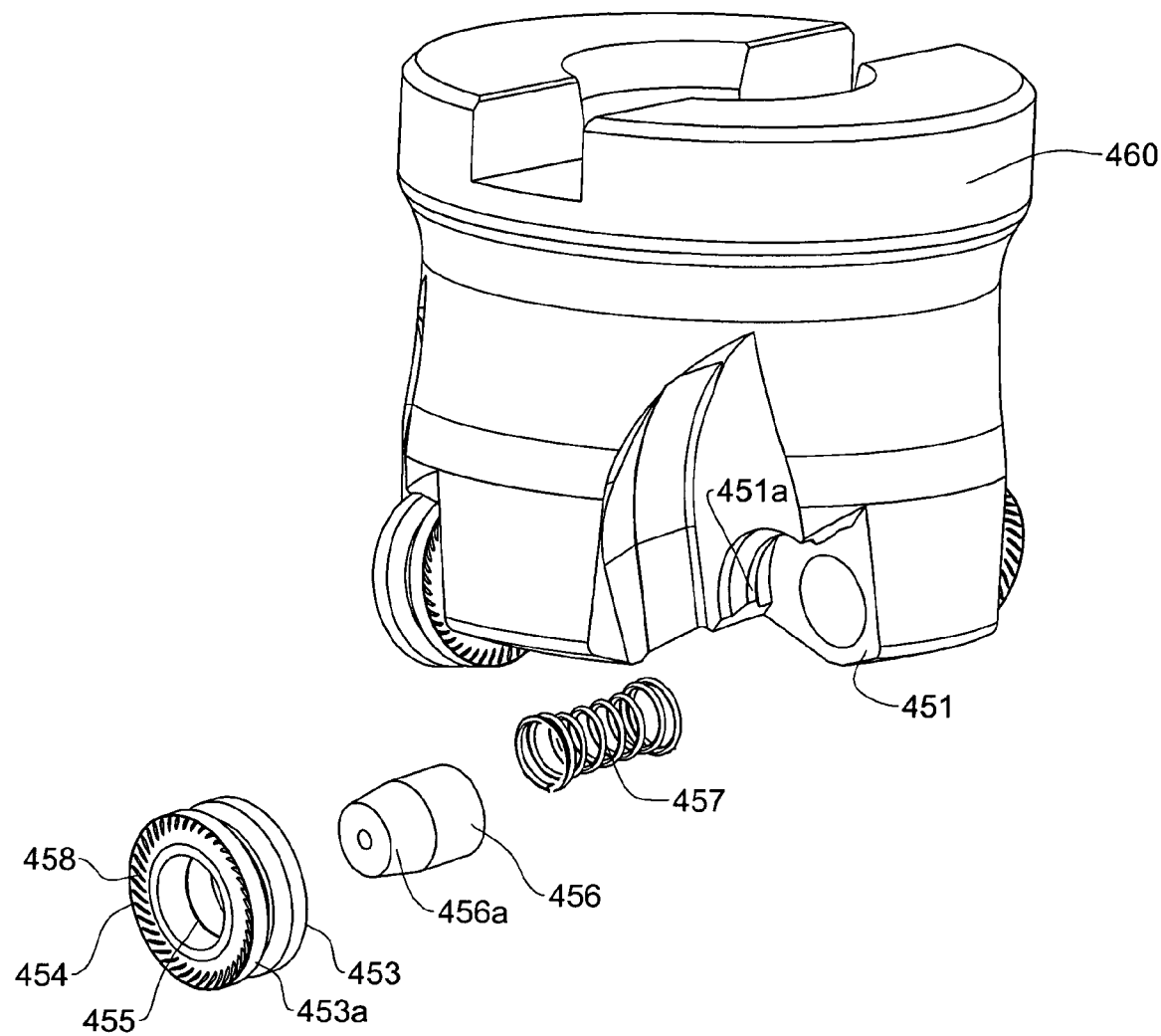
FIG. 42 is a partially exploded view of the milling tool shown in FIG. 41.
Figure 43:
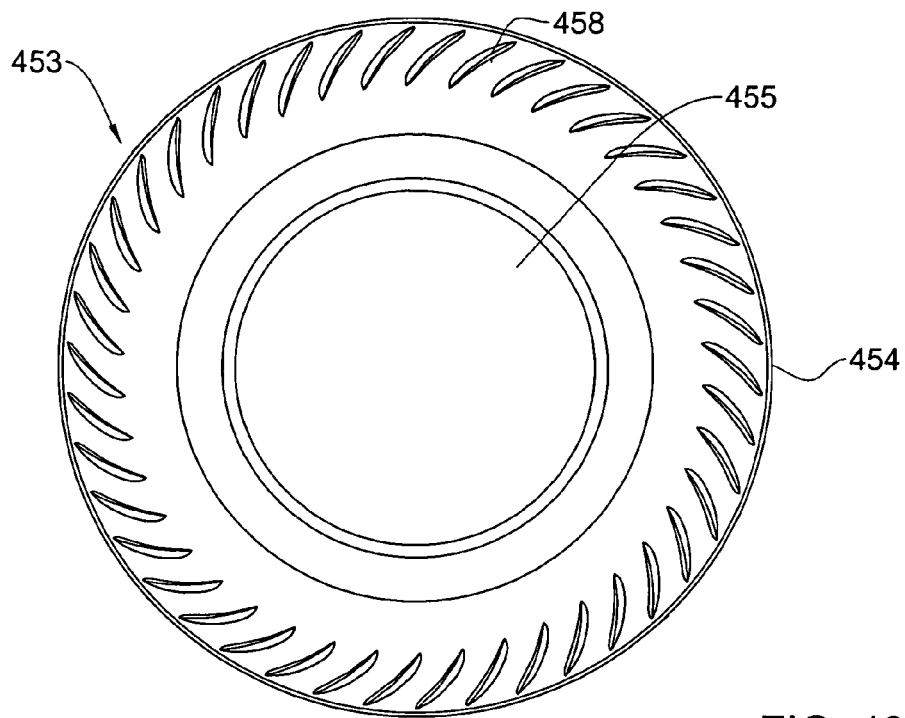
FIG. 43 is an enlarged top view of one of the cutting inserts used in the milling tool shown in FIGS. 41 and 42.
Figure 44:
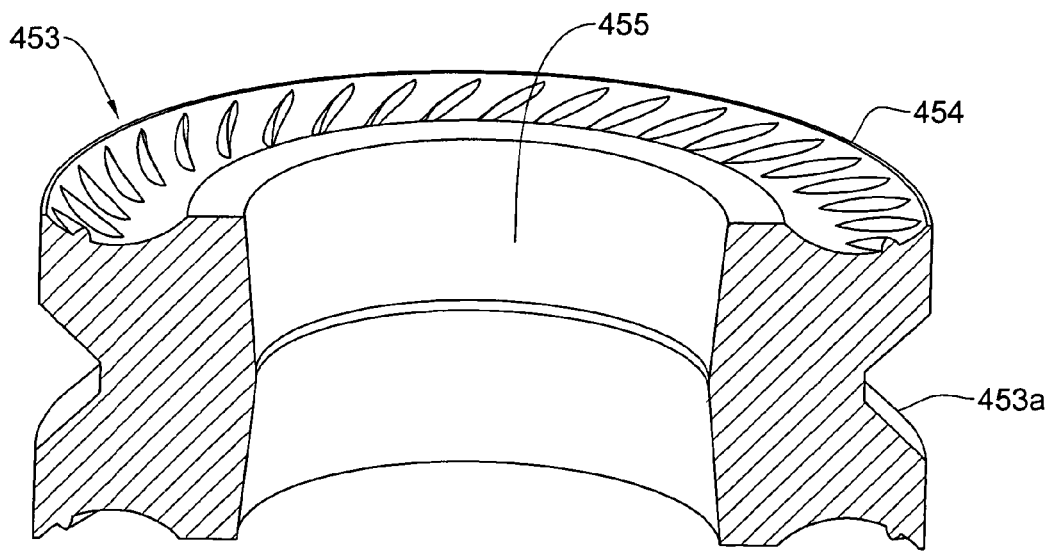
FIG. 44 is an enlarged perspective section view of the cutting insert shown in FIG. 43.
Figure 45D:
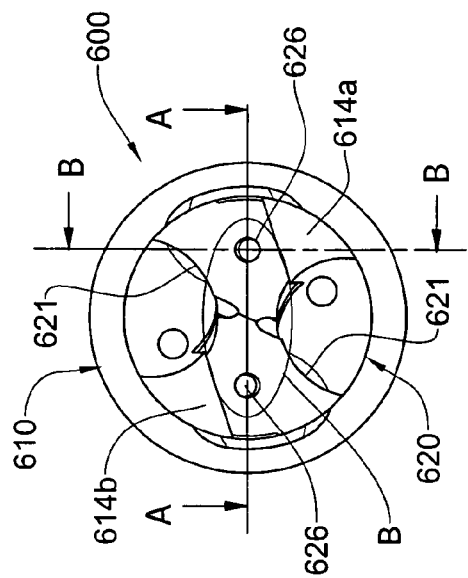
FIG. 45D is a top view of the drilling tool shown in FIG. 45A.
Figure 45F:
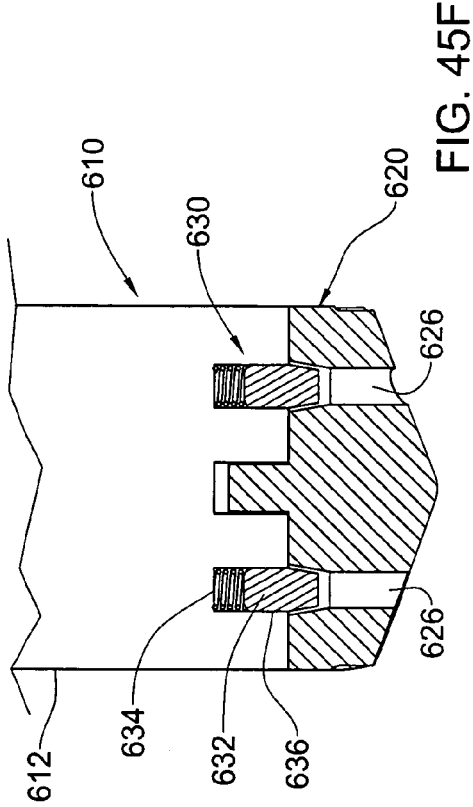
FIG. 45F is a cross-sectional view of a portion of the drilling tool taken along line B-B shown in FIG. 45D.
Figure 45E:
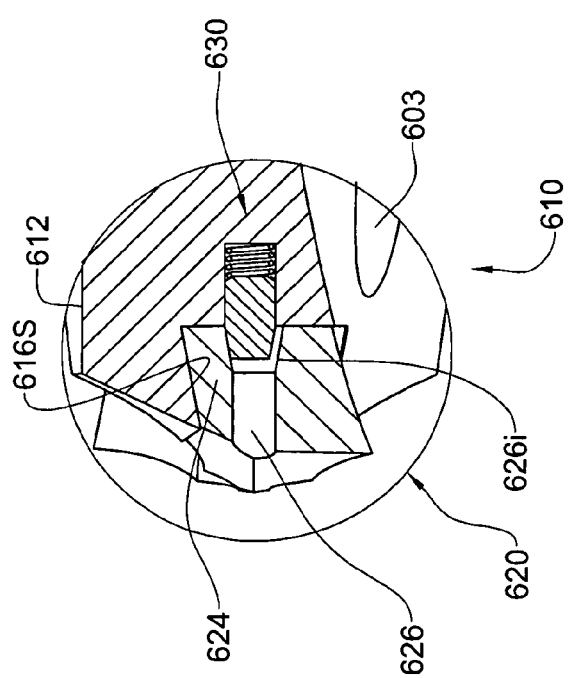
FIG. 45E is a cross-sectional view of a portion of the drilling tool taken along line A-A shown in FIG. 45D.
Figure 45G:
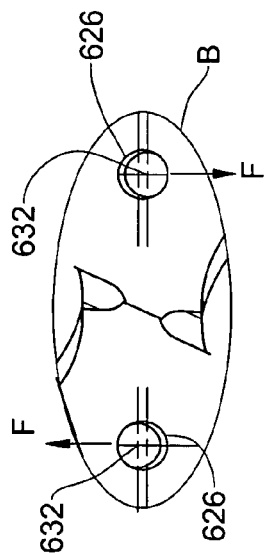
FIG. 45G is an enlarged view of a detail B shown in FIG. 45D.
Figure 45H:
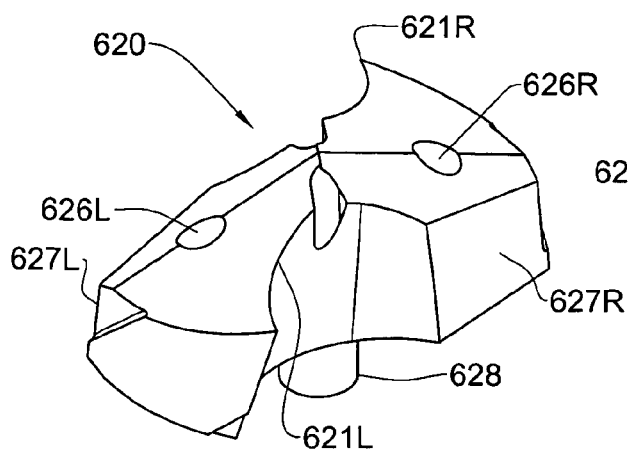
FIGS. 45H to 45L are respective isometric, side, top, front and bottom views of a drilling head used in the drilling tool of FIGS. 45A to 45F.
Figure 45I:
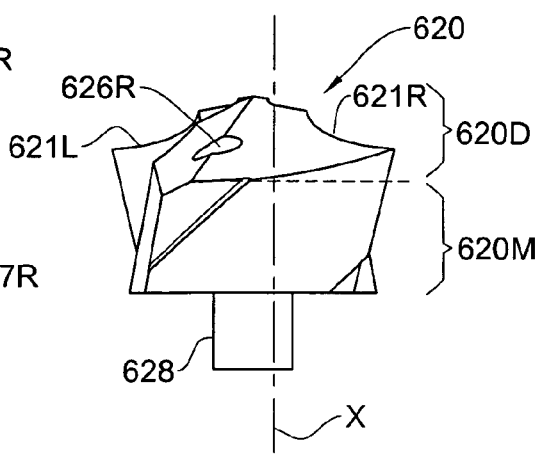
Figure 45J:
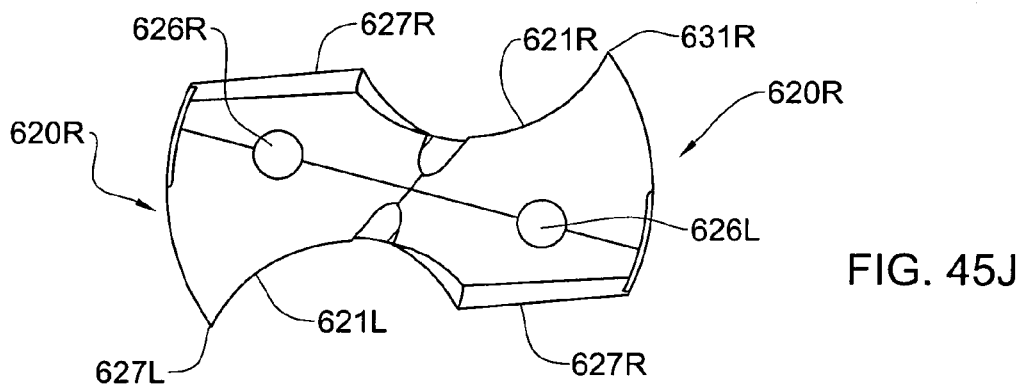
Figure 45K:
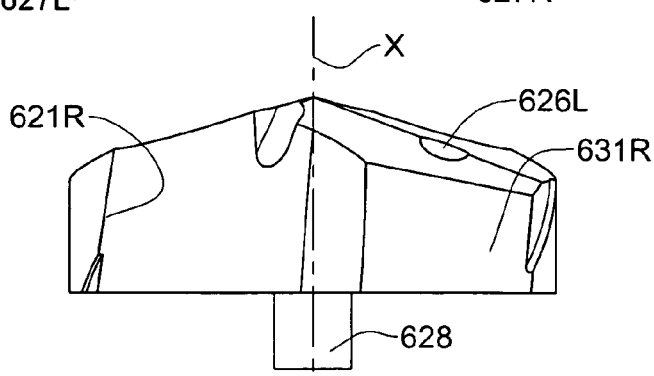
Figure 45L:
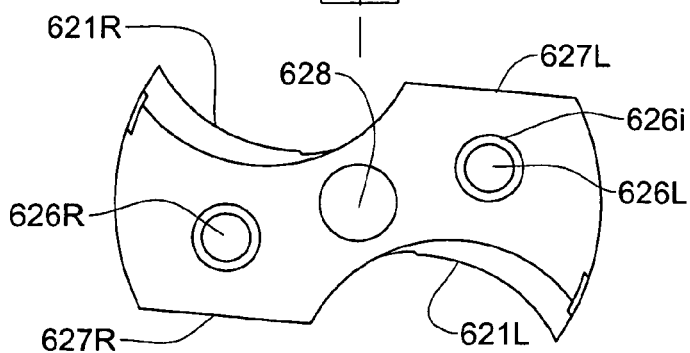

As seen particularly in FIG. 44, the outer surface of each cutting insert 453 thus defines a cylindrical side wall, which is formed with a tapered recess or groove 453a around its circumference between the two end walls of the insert. As shown in FIG. 42, the side wall of the cutter head defining each of its seats 451 for receiving a cutting insert 453 is formed with a circular rib 451a of complementary tapered configuration to be received within each of the recessed grooves 453a of the cutting insert.

As also seen particularly in FIG. 44, the outer surface of each cutting insert 453 is formed with a plurality of ribs 458 engageable with the shavings (e.g., 271, FIG. 36) cut from the workpiece during a cutting operation by the cutting edge 454 of the cutting insert, to deflect the shavings outwardly of the cutting insert. Ribs 458 are formed obliquely to the radial lines of the circular cutting insert. This enables these ribs to perform another function, namely to produce a slow rotation of the cutting insert during a cutting operation. Thus, the oblique ribs 458 continuously change the cutting edge engageable with the workpiece during a cutting operation.

Tapered surface 456a of the securing pin 456, and the corresponding surface of bore 455 formed in the cutting insert 453, would be designed to only lightly secure the cutting insert between the cutting tool and the securing pin, and to thereby permit the slow rotation of the cutting insert during a cutting operation by the engagement of the shavings with the oblique ribs 458.

In addition, it should be noted that during the cutting operation, when the cutting edge of the cutting insert 453 is within the workpiece, the loads and pressure on the cutting insert 453 are such that cause a high static friction, preventing the cutting insert 453 from rotating about its axis. However, at the instance of disengagement of the cutting insert from the workpiece, the pressure is relieved for a brief interval, in which the cutting insert 453 may perform rotary motion. The rotary motion performed by the cutting insert 453 is minute, for example, for a milling head rotating at a speed of 3000 RPM about the central axis thereof, the cutting insert may perform 1 turn every 15 minutes, i.e. 1 turn every 45,000 turns of the milling head.

A construction, such as that illustrated in FIGS. 41 to 44 thus produces a continuous change in the cutting edge during a cutting operation, thereby not only obviating the need to re-index the cutting edge of the cutting insert between cutting operations, but also preventing undue heating of the cutting edge, which is continuously changing, thereby substantially increasing the useful life of the cutting insert.

Turning now to FIGS. 45A to 45G, a drilling tool generally designated 600 is shown comprising a drill body 610 and a drilling head 620 mounted thereon. The drill body 610 is formed at one end thereof with a holder portion 611 adapted for receiving the drilling head 620 in a secure manner.

The holder portion 611 is formed with a bottom surface 616B, and two shoulders 614a, 614b axially extending from the bottom surface 616B and located at two diametrically opposed location with respect to the central axis X. Each shoulder 614 is formed with a side wall 616S which is angled to the bottom surface 616B, similar to the majority of embodiments previously disclosed.

The holder portion 611 is further formed with a positioning bore 618 the center of which coincides with the central axis, and has an open end at the bottom surface 616B. The holder portion 611 is also formed with two seat bores 636 (shown FIG. 45F), each being adapted to receive a securing mechanism 630 therein.

The securing mechanism 630 comprises a securing pin 632 and a biasing spring 634, similar to the disclosed in several of the previous embodiments.

Referring to FIGS. 45H to 45L, the drilling head adapted to be mounted into the seat of the holder portion 611 is formed with a right side 620R and a left side 620L which are diametrically opposed to one another, each side being formed with a drilling portion 620D, and a mounting portion 620M. Each drilling portion 620D comprises a cutting edge 621. Each mounting portion 620M is formed with a tapering insert bore 626 and a side face 627. In addition, the drilling head 620 is formed with a central positioning stub 628, adapted to be received within the positioning bore 618.

Reverting to FIGS. 45A to 45G, it is observed that when the drilling head 620 is mounted onto the holder portion 611, the securing pin 632 bears against the inner surface 626i of the insert bore 626, in a manner similar to that described with respect to previous embodiments. However, in the present embodiment, since the diametrically opposed portions 620L, 620R of the drilling head 620 are secured against the shoulders 614L, 614R, the pressure of the securing pins 632 is applied in opposite direction, or alternatively, in a direction tangent to a CW direction. This proves an advantage when drilling is concerned since the drilling tool 600 may be rotated in a CCW direction, thereby only tightening the engagement between the securing mechanism 630 and the drilling head 620.

In assembly, the drilling head 620 is placed onto the seat of the holder portion 611 such that the positioning stub 628 is located above the positioning bore 618, and the bottom face of each of the portions of the drilling head 620 rests on a respective securing pin 632. From this position, the drilling head may be pressed downwards to apply pressure to the securing pins 632, thereby depressing them into a mounting position, in which the distal end thereof protrudes from the bottom surface 616B to an extent allowing insertion of the drilling head 620 into the seat. Once in the mounting position, the drilling head 620 may be rotated so as to bring the respective left and right side faces 627 to engage the side walls 616S, thereby securing the drilling head in place.

Figure 46:
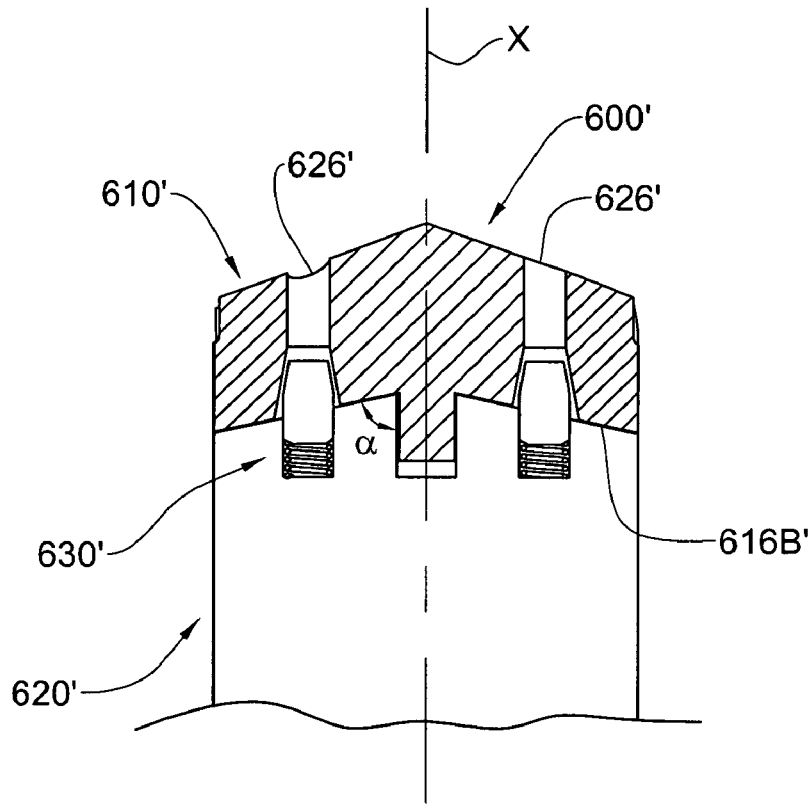
FIG. 46 is a cross-sectional view of a portion of a drilling tool according to another embodiment of the present invention.

With particular reference to FIG. 46, a similar embodiment of the drilling head is shown, however, in this embodiment, the bottom surface 616B' is of conical shape tapering downwards, thereby facilitating easy and accurate centralization of the drilling had within the holder portion 611.

Figure 46A:
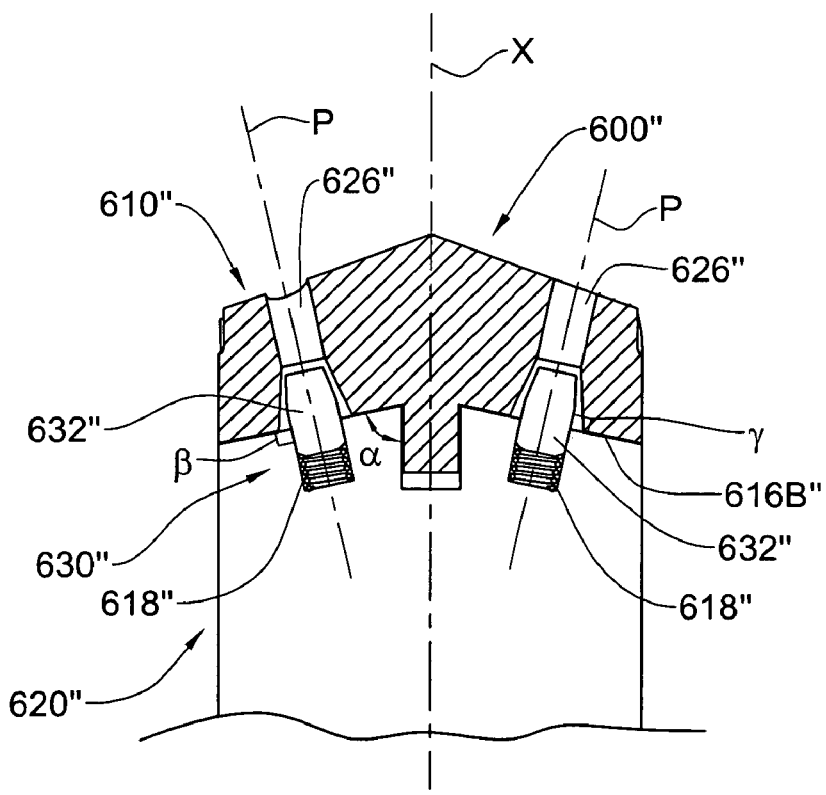
FIG. 46A is a schematic cross-sectional view of a portion of a drilling tool according to yet another embodiment of the present invention.

Further attention is drawn to FIG. 46A, in which a drilling tool generally designated as 600" is shown to have a similar design to the drilling tool 600' shown in FIG. 46, and comprising a drilling tool head 610" and a drilling tool holder 620". However, in the present case, the securing pins 632", securing pin bores 618" and insert bores 626" are arranged such that the central axis thereof P is perpendicular to the seat surfaces 616B", and thus angled to the central axis X.

Turning now to FIGS. 47A to 48C, another embodiment of the present invention is shown depicting a variable diameter cutting tool generally designated 700, and comprising a holder body 710, three cutting inserts 720 mounted thereon using a plurality of securing mechanism 730, and a diameter regulating arrangement 740.

Each cutting insert 720 is mounted onto the holder body 710 in a manner similar to that disclosed with respect to previous embodiments, with the difference being that the holder body 710 is not formed with a supporting side wall against which the securing pin 732 may apply pressure. Instead, the holder body 710 is formed with a central bore 746 adapted to receive therein a regulator member 742 the head of which is of conical shape, constituting the side wall to define, together with the bottom surface 716B the insert seat.

Figure 47A:
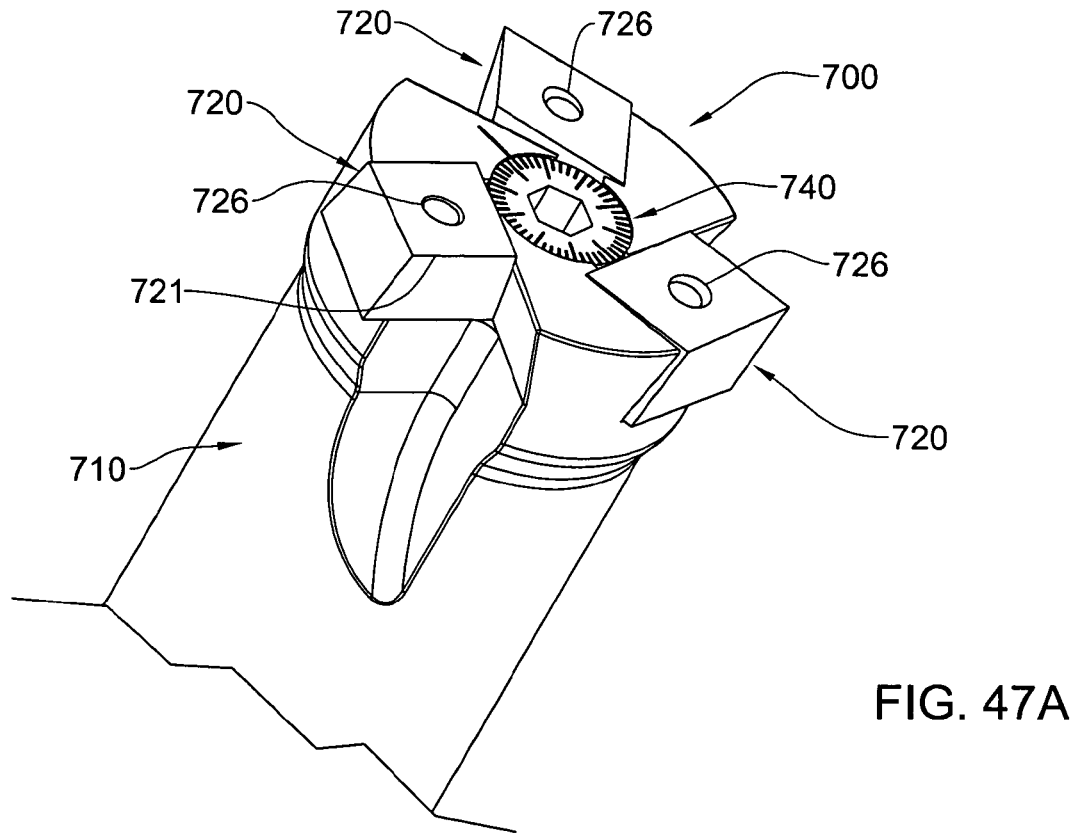
FIGS. 47A and 47B are isometric and top views of a variable diameter cutting tool according to an embodiment of the present invention.
Figure 47B:
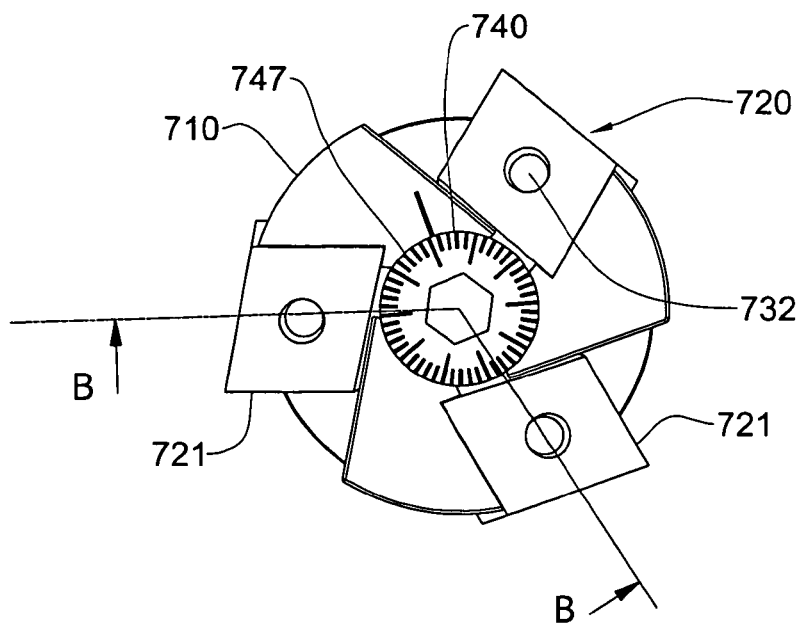
Figure 47D:
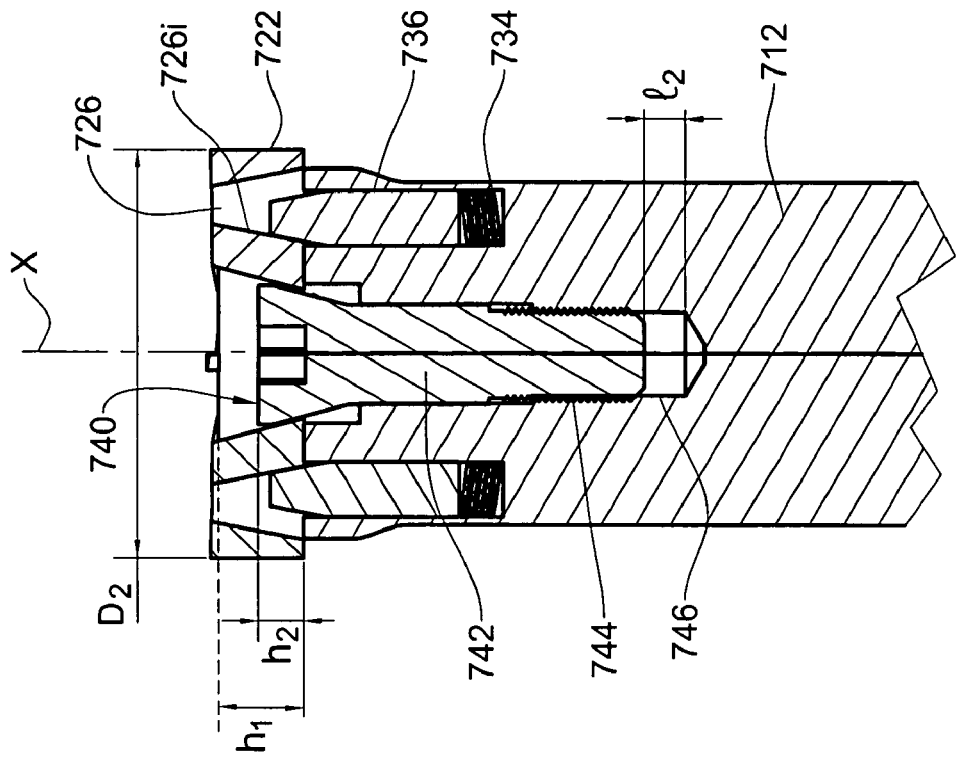
FIG. 47D is a cross-sectional view of a portion of the cutting tool shown in FIGS. 47A to 47C, in an additional operational position.
Figure 47C:
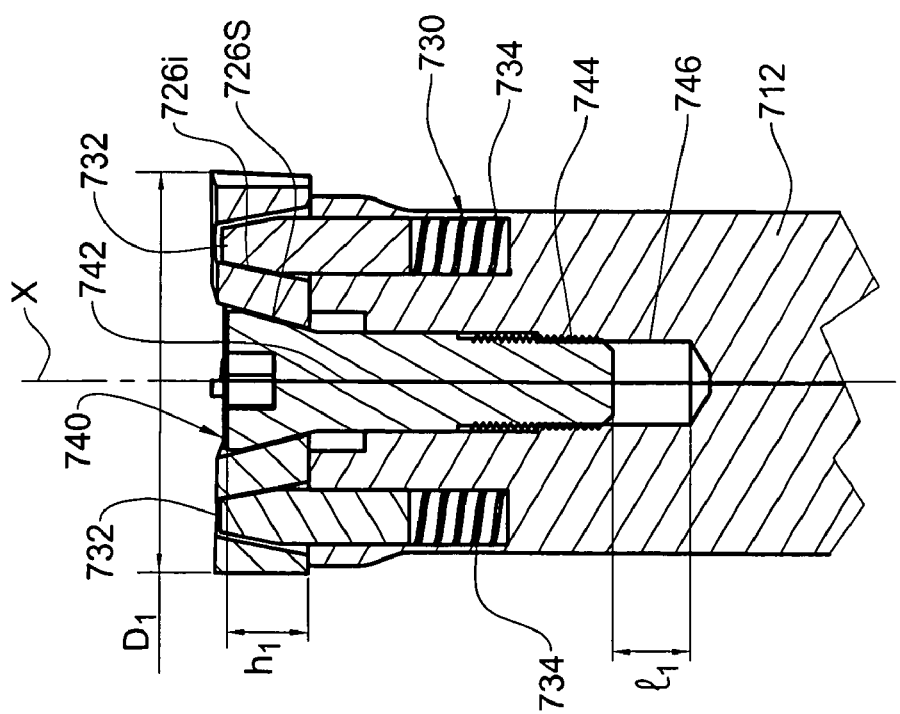
FIG. 47C is a cross-sectional view taken along line B-B shown in FIG. 47B.

With particular attention being drawn to FIG. 47C, the securing pin 732 engages the inner surface 726i of the insert bore 126 to secure the cutting insert 720 between the distal end de of the securing pin 732 and the head of the regulator member 742 being used as a side wall. In the position shown in FIG. 47C, the regulator member extends to a distance h1 above the bottom surface 716B, and the cutting tool has an operative diameter of D1.

The regulator member 742 is received within the bore 746 using a thread, allowing the regulator member 742 to be displaced axially along the bore, and being positioned at a variety of desired distances above the bottom surface 716B. It is also evident that due to the engagement between the head of the regulator member 742 and the side face 726S, the lower the extension of the regulator member 742 above the bottom surface 716B, the farther the inserts 720 are from each other, and greater the operative diameter of the cutting tool 700. The regulator member 742 may also be indexed as shown by 747 in order to indicate the desired increase in diameter.

However, as previously explained with respect to FIG. 2A, whereas displacement of the securing pin entails lateral displacement of the cutting insert towards the side wall of the seat, the opposite does not take place (axial displacement of the securing pin as a result of lateral displacement of the cutting insert). Therefore, axially displacing the regulator member 742 will not entail lateral displacement of the cutting inserts and increase in diameter.

Figures 48A, 48B, 48C:
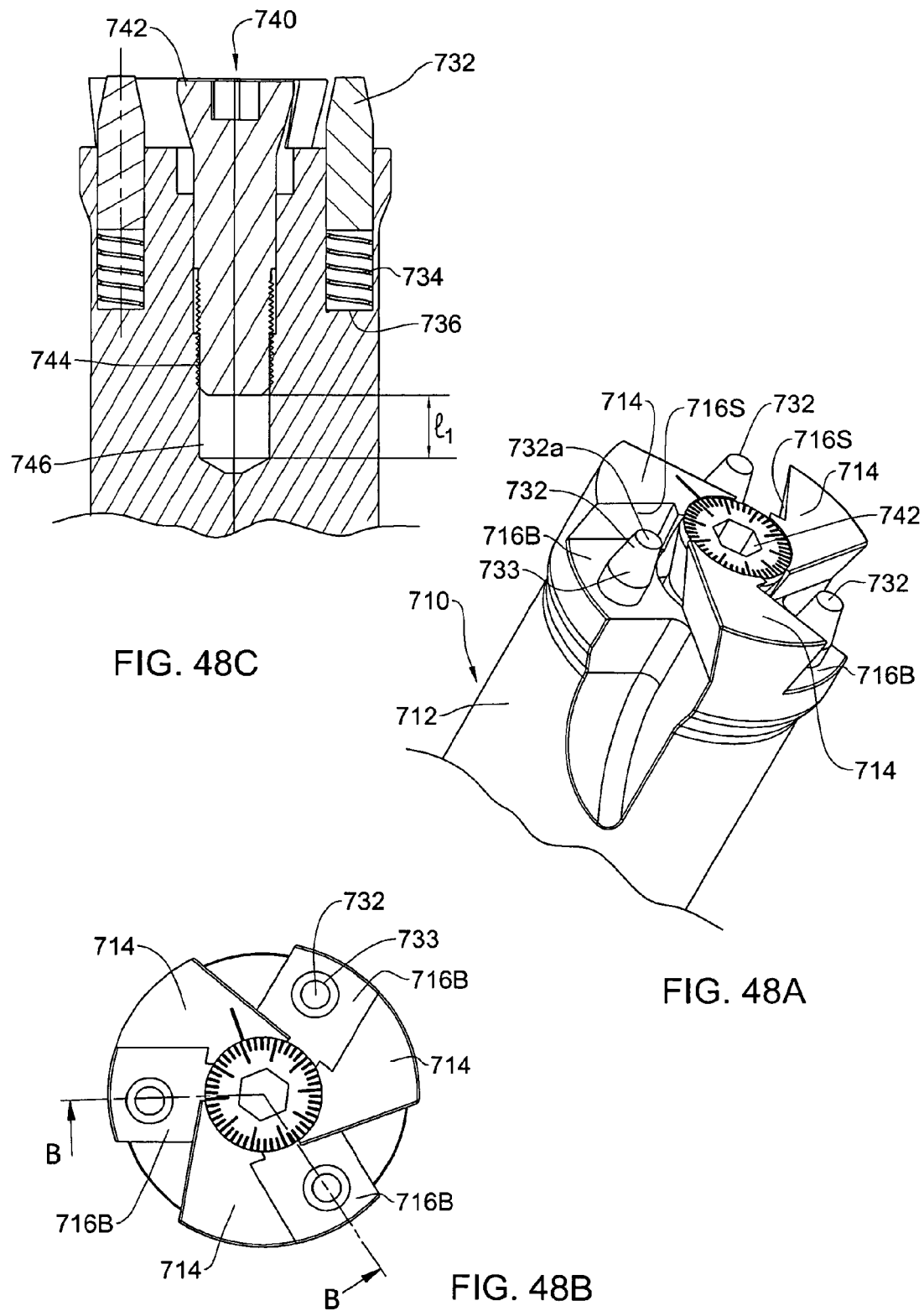
FIGS. 48A and 48B are isometric and top views of the variable diameter cutting tool shown in FIGS. 47A to 47D, with the cutting inserts removed.
FIG. 48C is a cross-sectional view taken along line B-B shown in FIG. 48B.

Thus, in operation, when desiring to increase the operative diameter, either of the following may take place:

a. in case no cutting inserts 720 are mounted onto the cutting tool holder 710 as shown in FIGS. 48A to 48C, the regulator member 742 may be freely axially displaced to a desired amount, and only then are the cutting inserts 720 mounted onto the tool holder 710 in a manner similar to that described with respect to previous embodiments; or b. in case cutting inserts 720 are mounted onto the tool holder 710, the securing pin 732 must first be depressed so as to provide the cutting inserts 720 with a certain degree of freedom in the lateral direction, and only them may the regulator member be axially displaced. Once displaced, the securing pins 732 may be un-depressed and assume a securing position to securely fasten the cutting inserts 720 in place.

Depression of the securing pins 732 may be achieved using a triple-pin member (not shown) adapted to be inserted into the insert bores 726 from the top side thereof and apply pressure to the securing pins 732.

Figure 49A:
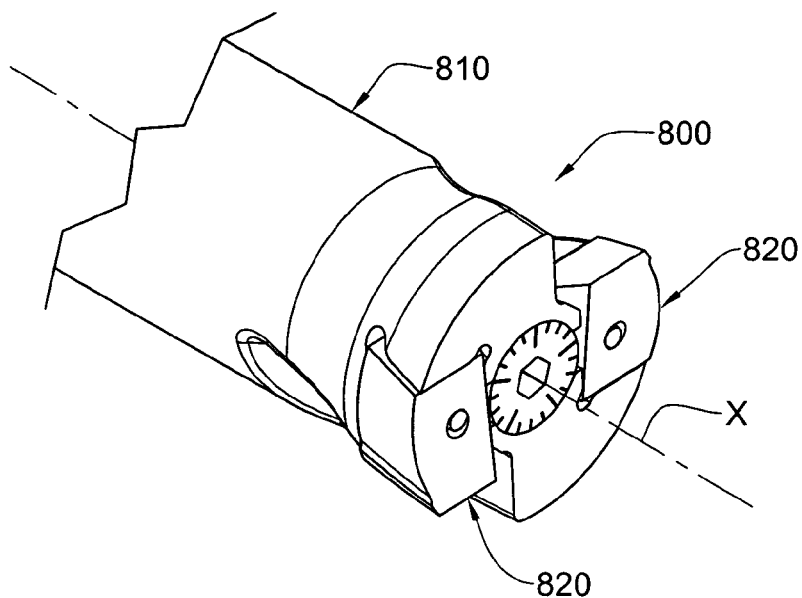
FIGS. 49A and 49B are isometric and top views of a variable diameter cutting tool according to another embodiment of the present invention.
Figure 49B:
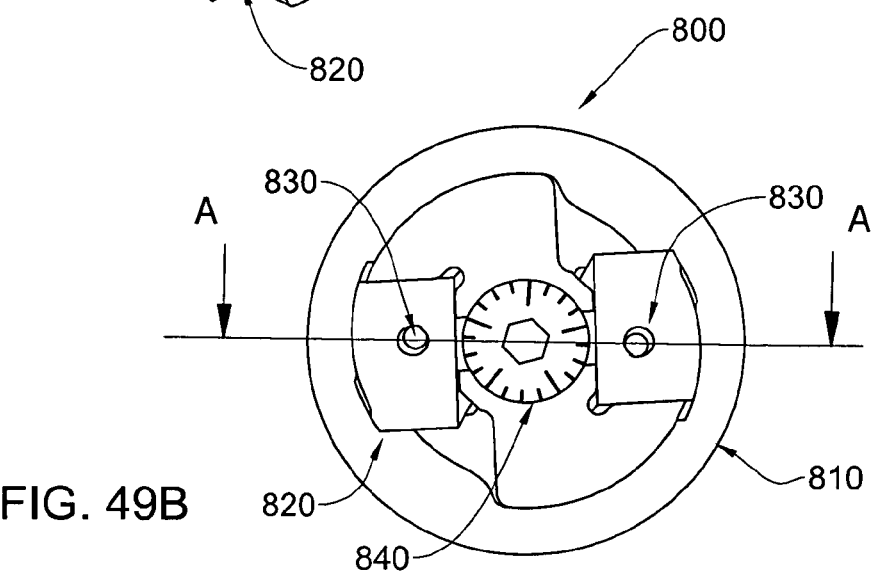
Figure 49C:
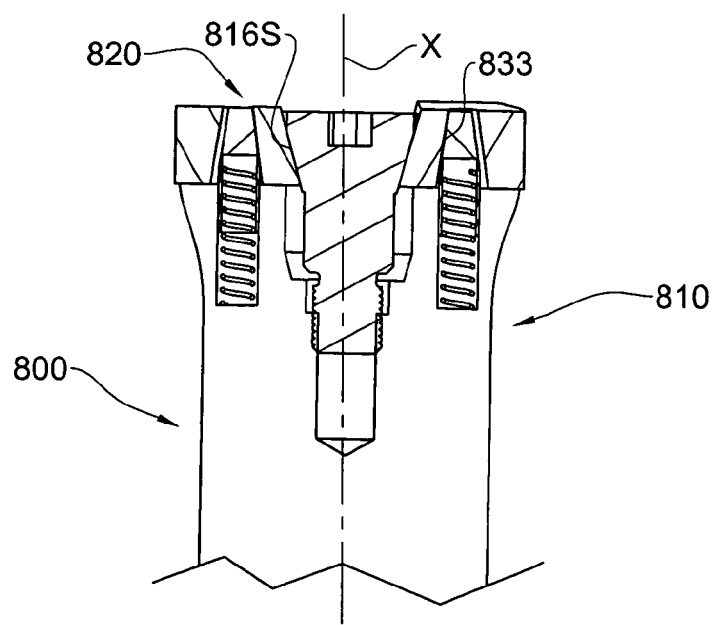
FIG. 49C is a cross-sectional view taken along line A-A shown in FIG. 47B.

Turning now to FIGS. 49A to 49C, an embodiment of a cutting too similar to that shown in FIGS. 47A to 48C, is shown generally designated 800, with the difference being it comprising only two cutting inserts 820. In all other ways, operation is the same as in FIGS. 47A to 48C.

Figure 50:
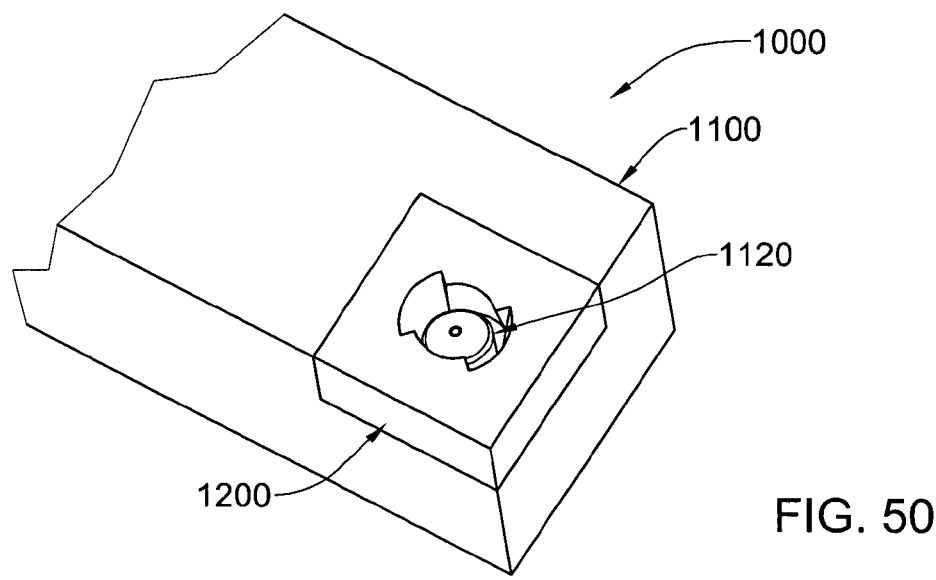
FIG. 50 is a schematic isometric view of a cutting tool comprising a reversible cutting insert according to still a further aspect of the present invention.
Figure 51A:
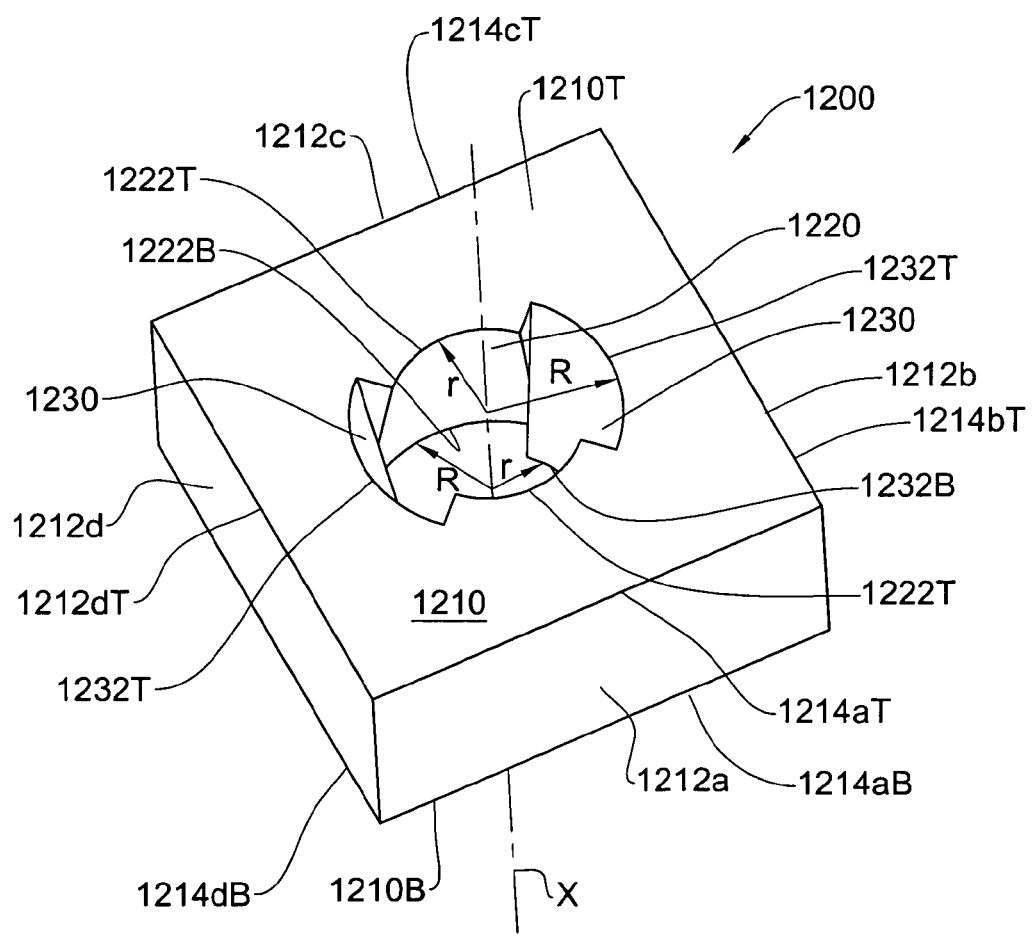
FIG. 51A is a schematic isometric view of the reversible cutting insert shown in FIG. 50.
Figure 51B:
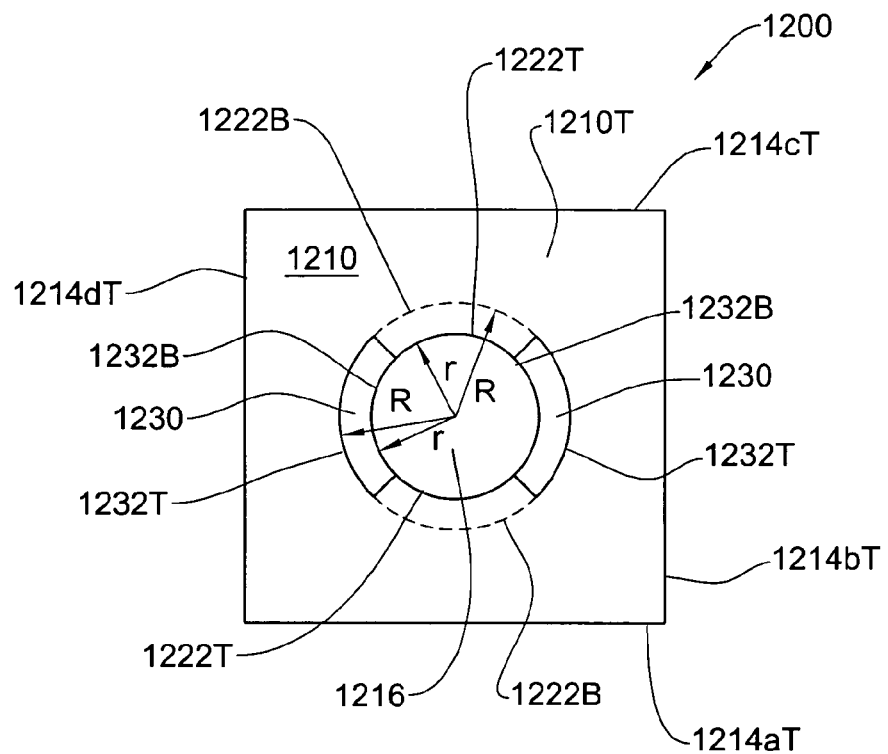
FIG. 51B is a schematic top view of the reversible cutting insert shown in FIG. 50.
Figure 51C:
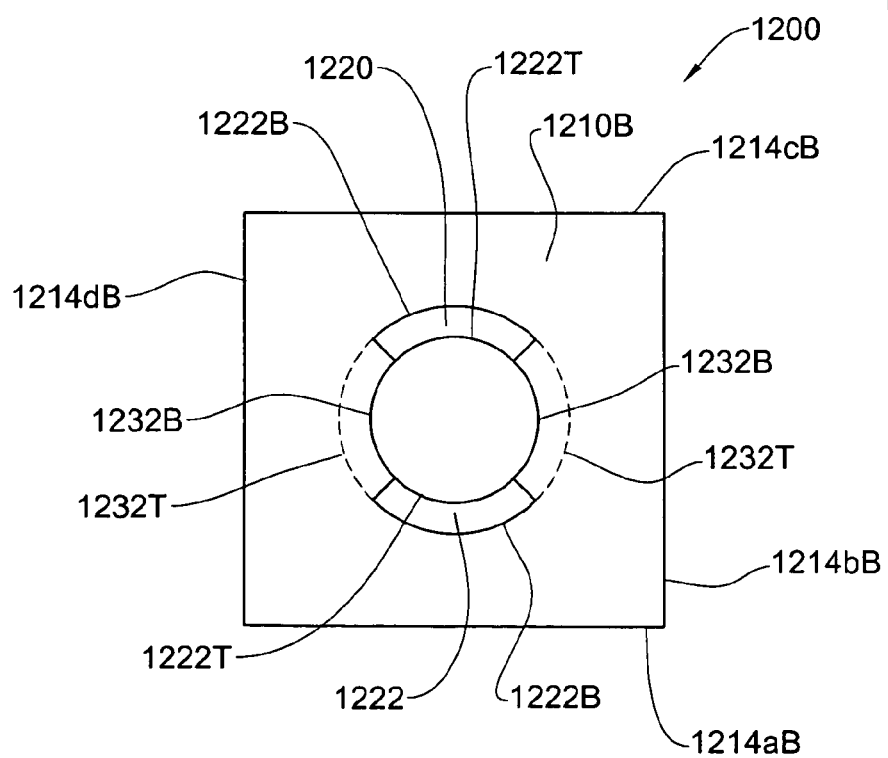
FIG. 51C is a schematic bottom view of the reversible cutting insert shown in FIG. 50.
Figure 51D:
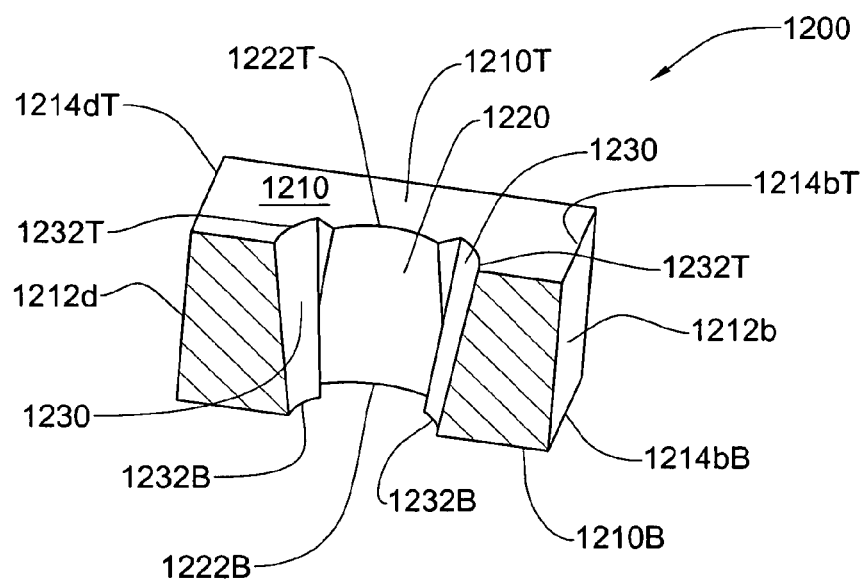
FIG. 51D is a schematic cross-section view of the reversible cutting insert shown in FIG. 50.

Attention is now drawn to FIG. 50, in which there is shown a cutting tool generally designated as 1000, comprising a cutting tool holder 1100 and a reversible cutting insert 1200 mounted thereon.

Figure 52A:
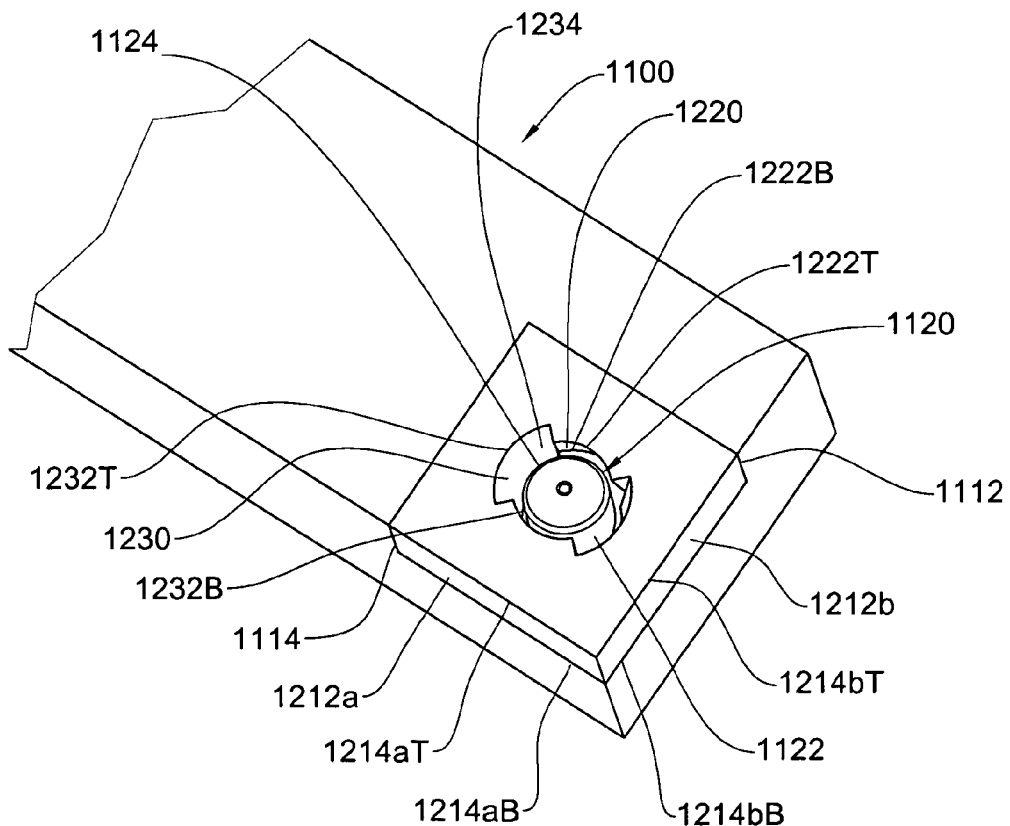
FIG. 52A is a schematic isometric view of the reversible cutting insert shown in FIG. 50 when mounted onto the cutting tool shown in FIG. 50, at a first position.
Figure 52B:
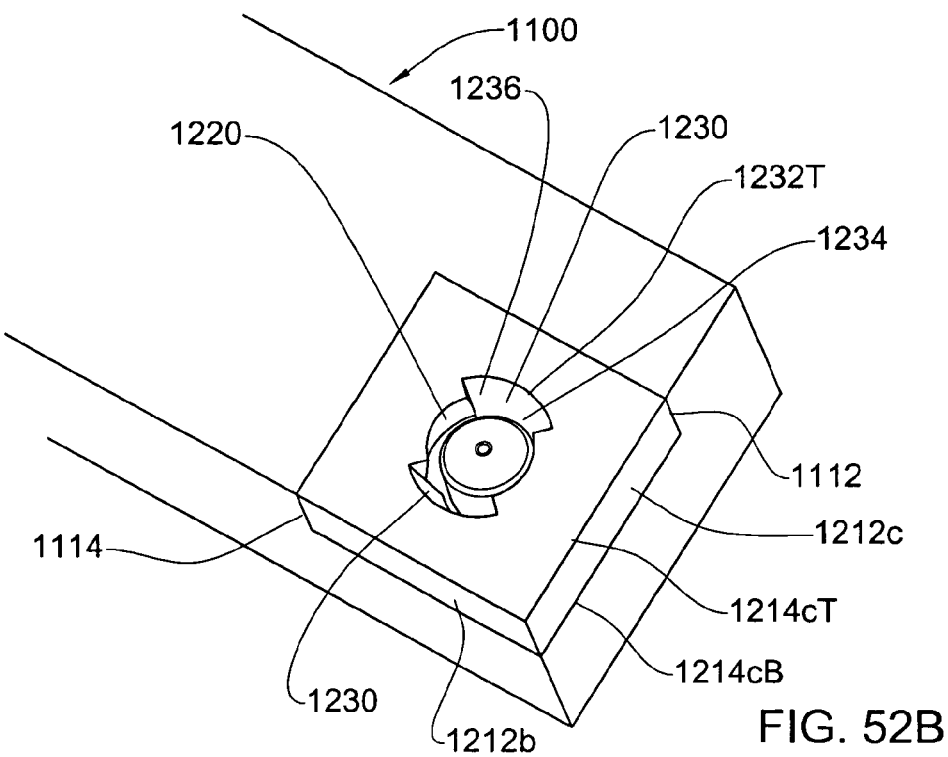
FIG. 52B is a schematic isometric view of the reversible cutting insert shown in FIG. 50 when mounted onto the cutting tool shown in FIG. 50, at a second position.
Figure 52C:
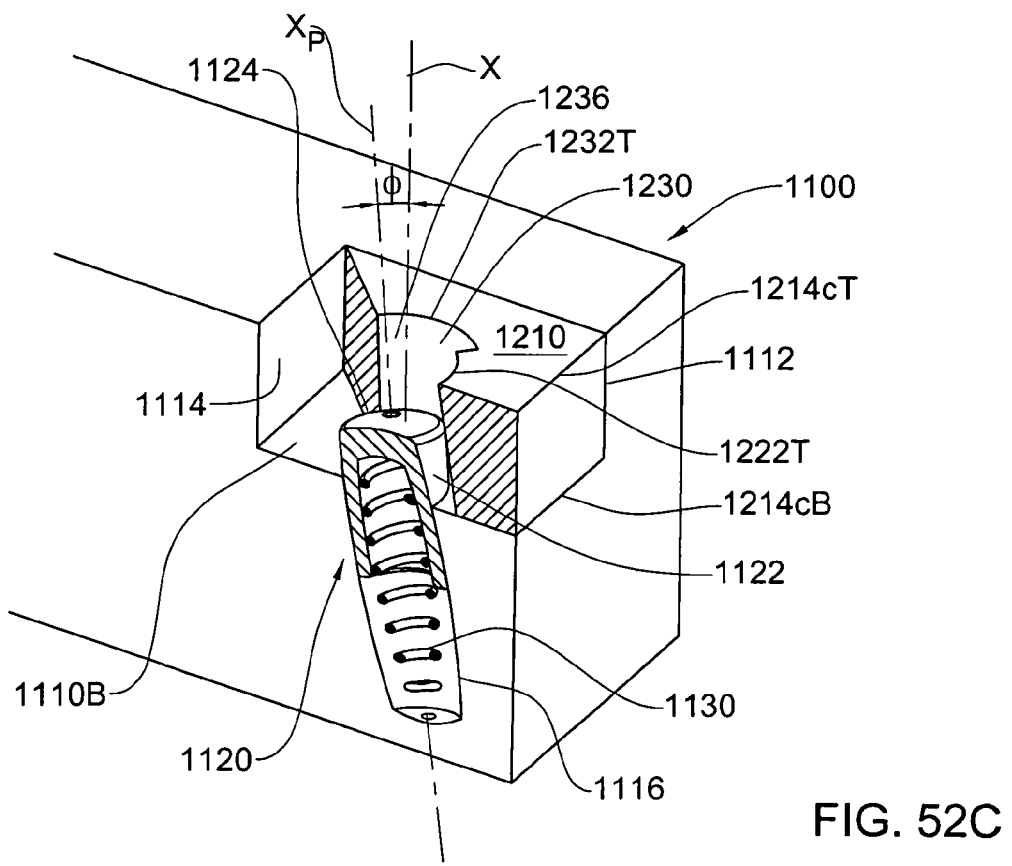
FIG. 52C is a schematic cross-section isometric view of the cutting tool shown in FIG. 52B with half of the reversible cutting insert being removed.

The cutting tool holder 1100 is generally similar to the cutting tool holder 150 shown in FIG. 22, and also comprises a securing mechanism 1120 similar to the securing mechanism 156 shown in FIG. 22. The cutting tool holder will be discussed later with reference to FIGS. 52A to 52C, showing the manner of operation thereof.

The cutting insert 1200 as shown in FIGS. 51A to 51D, has a body 1210 with a top face 1210T and a bottom face 1210B. The body 1210 is of square shape and thus has four side walls 1212a to 1212d extending between the top face 1210T and the bottom face 1210B. The intersection lines of the side walls 1212a to 1212a with the top and bottom faces 1210T and 1210B form eight cutting edges 1214aT, 1214aB, 1214bT, 1214bB, 1214cT, 1214cB, 1214dT, and 1214dB respectively.

The body 1210 of the cutting insert is further formed with a central bore 1216, also extending between the top face 1210T and the bottom face 1210B, and having a central axis X.

The bore 1216 has a unique form defined by four conical inner surfaces—two inner surfaces 1220, and two inner surfaces 1230. Observing the first inner surfaces 1220, each of the inner surfaces 1220 has a top rim 1222T defined as the intersection line between the inner surface 1220 and the top face 1210T, and a bottom rim 1222B defined as the intersection line between the inner surface 1220 and the bottom face 1210B. The inner surfaces 1230 similarly have corresponding top and bottom rims 1232T and 1232B respectively.

It is further observed, that the radial distance $r_1$ between the top rim 1222T of the inner surface 1220 and the central axis X is lesser than the radial distance $R_1$ between the bottom rim 1222B of the inner surface 1220 and the central axis X. The inner surfaces 1230 are similarly formed, however, they are 'reversed' with respect to the inner surfaces 1220, i.e. the radial distance $r_2$ between the bottom rim 1232B of the inner surface 1230 and the central axis X is lesser than the radial distance $R_2$ between the top rim from the Z axis is equal to R, the radial distance of the bottom rim 1222B of the inner surface 1220 from the central axis X of the bore 1216, and the radial distance of the bottom arc rim from the Z axis is equal to r, the radial distance of the bottom rim 1222T of the inner surface 1220 from the central axis X of the bore 1216.

Turning now to FIGS. 52A to 52C, the reversible cutting insert 1200 is shown mounted onto the cutting tool holder 1100, such that the securing mechanism 1120 secures the reversible cutting insert 1200 into the seat of the cutting tool holder 1100.

The cutting tool holder 1100 has an insert seat formed with a bottom surface 1110B, and two side walls 1112 and 1114 extending therefrom. The securing mechanism 1120 operates generally similar to the securing mechanism disclosed with reference to previous figures, i.e. with a pin 1122 biased by a spring 1130 (shown FIG. 52C). In this particular example, the central axis $X_P$ of the securing pin 1122 is angled with respect to the bottom face 1110B of the seat of the cutting tool holder 1100, in the direction of the corner formed by the side walls 1112 and 1114.

When mounted onto the seat of the cutting tool holder 1100, the reversible cutting insert 1200 is positioned such that two side walls thereof 1212c and 1212b are flush against to side walls 1112 and 1114 of the cutting tool holder 1100 respectively, and the bottom face thereof 1210B is flush against a bottom face 1110B of the cutting tool holder 1100. It should be noted that the cutting tool holder shown in this particular example is designed such that the side wall thereof 1112 and 1114 are perpendicular to the bottom face 1110B thereof, and the side walls 1212a to 1212d of the reversible cutting insert 1200 are perpendicular to its top and bottom faces 1210T and 1210B respectively.

In the mounted position shown in FIG. 52A, the reversible cutting insert 1200 is positioned such that one of the inner surfaces 1230 faces the side wall 1114 of the cutting tool holder 1100. In this position, the securing pin 1122 secures the reversible cutting insert 1200 into place by applying pressure with a tip 1124 thereof to the right portion 1234 of the inner surface 1230, thereby fastening it against the side walls 1112 and 1114 to retain it in place.

It is important to note that, much in the same manner disclosed with respect to previous embodiments, in the mounted position the reversible cutting insert 1200 cannot be displaced upwards to be removed from the seat due to the angle of the conical inner surface 1230 and the angle of the securing pin 1122.

In the position shown in FIG. 52A, the operating cutting edge may either be 1214aT or 1214bT. Alternatively, it may be a cutting corner rather than a cutting edge, formed at the intersection between 1214aT and 1214bT. In the present example, reference will be made to the cutting edge 1214bT as the cutting edge in the position shown in FIG. 52A.

Turning now to FIG. 52B, when the cutting edge 1214bT is worn out, or if there simply arises a need to use another cutting edge, the reversible cutting insert 1200 is dismounted from the seat by depressing the securing pin 1122, rotated 90° about the central axis X of the bore 1216 and replaced onto the seat of the cutting tool holder 1100 such that the side walls 1212a and 1212d are now flush with the side walls 1114 and 1112 respectively.

In this position, the inner surface 1230 faces the side wall 1112 of the cutting tool holder 1100, and the reversible cutting insert is secured in place by the tip 1124 of the securing pin 1122 applying pressure to the left portion 1236 of the inner surface 1230. Thus, the reversible cutting insert 1200 is adapted to provide four working positions achieved by rotating the cutting insert 1200 about the central axis X thereof (without turning it over).

In addition, so long as the reversible cutting insert 1200 is not turned over, i.e. so long as, in a working position, the bottom face 1210B thereof is flush against the bottom face 1110B of the seat of the cutting tool holder 1100, contact between the securing pin 1122 and the cutting insert 1200 is achieved solely through the inner surfaces 1230, with the inner surfaces 1220 being out of contact with the cutting insert 1200. Furthermore, it should also be noted that in any such working position, the only contact between the securing pin 1122 and the reversible cutting insert 1200 is achieved solely through a right portion 1234 or a left portion 1236 of one of the inner surfaces 1230, with the opposite inner surface 1230 being out of contact with the cutting insert 1200. This is best illustrated in FIG. 52C.

When all four cutting edges 1214aT, 1214bT, 1214cT and 1214dT have been worn out, or if there simply arises the need to use another cutting edge, the cutting insert 1200 is flipped over, i.e. such that in a working position its top face 1210T is flush against the bottom face 1110B of the cutting tool holder 1100. In this respect, it should be observed that if the cutting insert 1200, in the position shown in FIG. 52A, is to be flipped over, it would reach the position shown in FIG. 52B (obviously with the T indicators indicating the top face becoming B indicators indicating the bottom).

Figure 53:
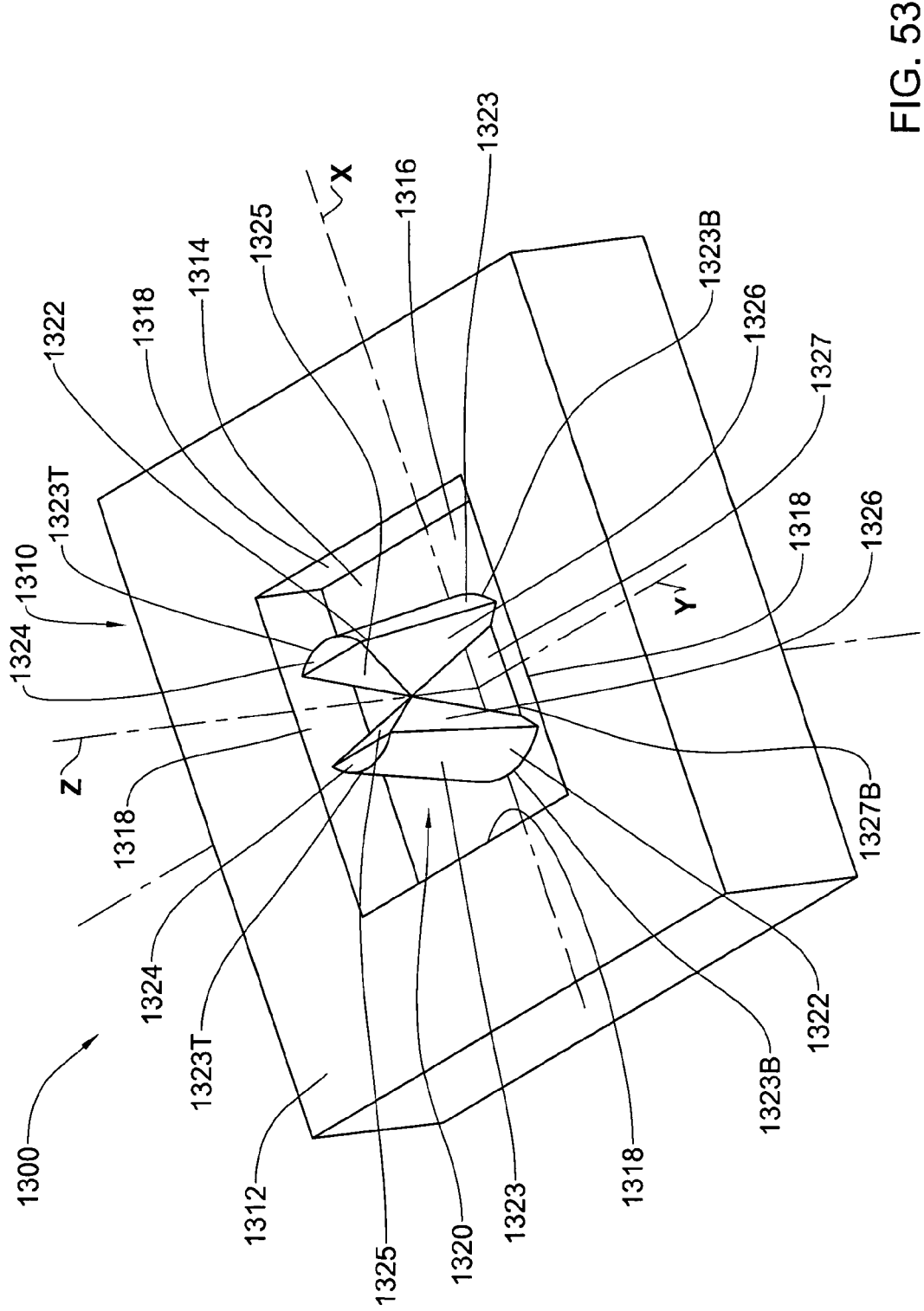
FIG. 53 is a schematic isometric view of a mold member constituting part of a mold adapted for manufacturing the reversible cutting insert shown in FIGS. 50 to 52B.
Figure 54:
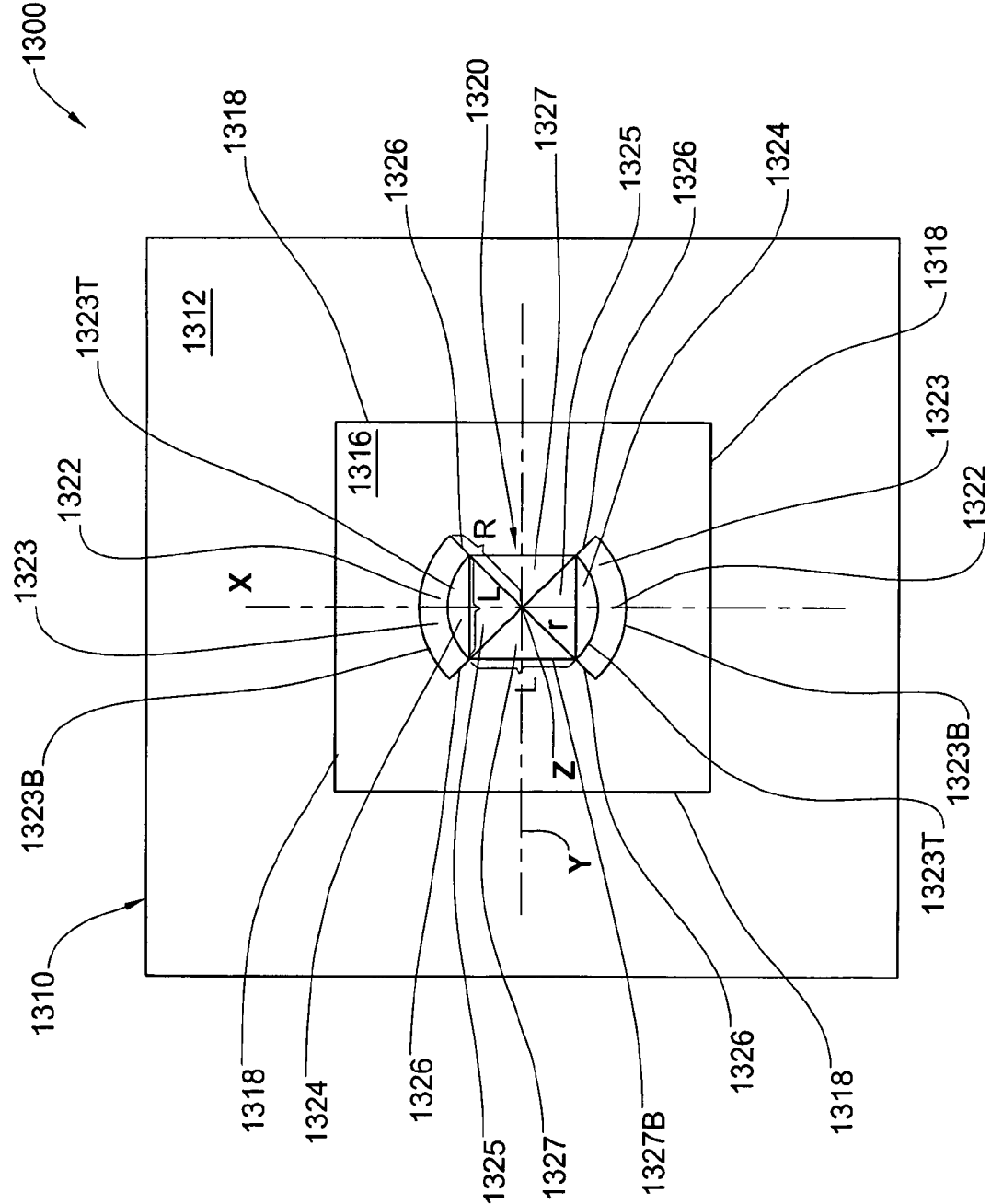
FIG. 54 is a schematic top view of the mold member shown in FIG. 53.

With reference to FIG. 53, the reversible cutting insert 1200 is manufactured, as most cutting inserts to date, by a pressing and sintering process in which powder is pressed within a mold under specific conditions to form the cutting insert compact and then sintered to form the cutting insert. In FIG. 53, a mold member generally designated as 1300 is shown, constituting one of two mold members adapted together to form the mold for the reversible cutting insert 1200.

The mold member 1300 has a body 1310 with a front surface 1312, and is formed with a central, non through-going square mold cavity 1314, having a cavity base surface 1316 at the bottom of the mold cavity 1314 and four side walls 1318.

Hereinafter, reference will be made to three main axes X, Y and Z such that the origin of the axis system lies on the cavity base surface 1316 and is located at the center of the square mold cavity 1314. The X and Y axes are perpendicular to each other and extend perpendicular to the opposite cavity side walls 1318. The Z axis extends perpendicular to the cavity base surface 1316.

The dimensions of the square mold cavity 1314 are chosen according to the dimensions of the reversible cutting insert 1200 to be manufactures. In particular, the X and Y dimensions of the square mold cavity 1314 are equal to the length and width of the reversible cutting insert 1200, and the Z dimension denoting the depth of the square mold cavity 1314 is half the distance between the bottom face 1210B and the top face 1210T of the reversible cutting insert 1200.

The mold member 1300 is further formed with a molding element 1320 erect from the center of the cavity base surface 1316 of the square mold cavity 1314, i.e. at the origin of the axis system. The molding element is formed of two identical partially conical portions 1322 disposed opposite one another along the X axis, such that the X axis constitutes a symmetry axis of the molding element 1320.

Each conical portion 1322 is further formed with a sloped front surface 1325 extending between the elevated surface 1324 towards the Z axis to contact its corresponding sloped front surface 1325 of the second conical portion 1322. In addition, each conical portion 1322 is also formed with two side surfaces 1326 extending from the external surface 1323 towards the Z axis.

The molding element 1320 is further formed with two support portions 1327 adapted for providing support for the two conical portions 1322. It should also be observed that length L of the base 1327B is equal to the length L of the intersection line between the elevated surface 1234 and the sloped front surface 1325. This design configuration will be further discussed with reference to FIG. 55 and the molding process.

Figure 55A:
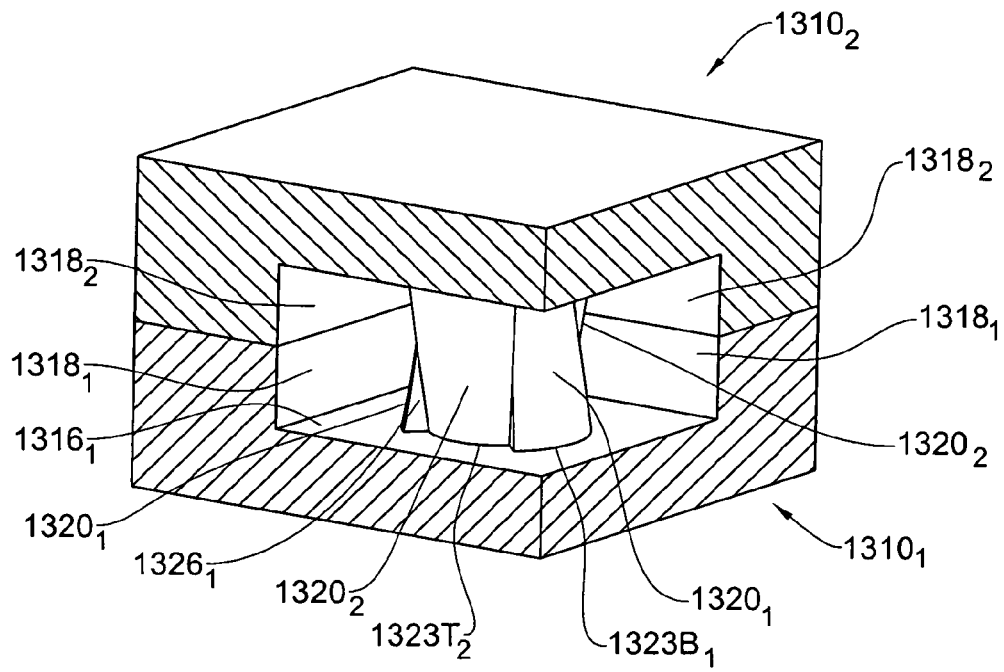
FIG. 55A is a schematic isometric multi cross-section view of a mold comprising a pair of mold members shown in FIG. 53.
Figure 55B:
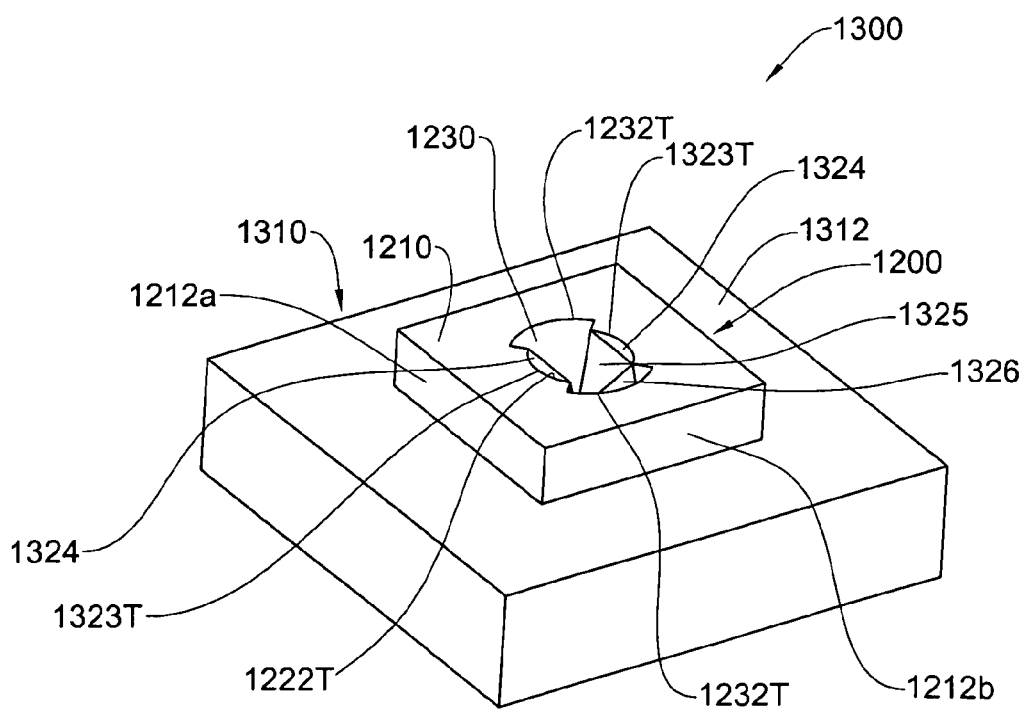
FIG. 55B is a schematic isometric view of the reversible cutting insert shown in FIGS. 50 to 52B when positions within the mold member shown in FIG. 53.

Turning now to FIG. 55, in manufacturing the reversible cutting insert 1200, two mold members 1310 are used, which will be referred herein as the first mold member $1310_1$ and the second mold member $1310_2$. The first mold member $1310_1$ and the second mold member $1310_2$ are oriented such that the front surfaces $1312_1$ and $1312_2$ thereof are flush against one another, i.e. the molding elements $1320_1$ and $1320_2$ extend one towards the other. However, the members are oriented such with respect to one another about the Z axis such that the molding element $1320_1$ of the first mold member $1310_1$ are disposed along the X axis while the molding element $1320_2$ of the second mold member $1310_2$ are disposed along the Y axis.

It is observed that the mold members $1310_1$ and $1310_2$ are designed such that conical portions $1322_2$ of the second molding element $1320_2$ fit in the spaces between the conical portions $1322_1$ of the molding element $1320_1$ of the first mold member $1310_1$. It is further noted that when arrange as disclosed above, the four side surfaces $1326_1$ of the first molding element $1320_1$ are completely flush with the four side surfaces $1326_2$ of the second molding element $1320_2$.

Once the reversible cutting insert 1200 has been properly formed in a pressing process within the mold 1300 under desired conditions to form the cutting insert compact, the second mold member $1310_2$ may be removed, and the reversible cutting insert compact 1200' may be taken out of the mold 1300.

It is important to note that the above described mold 1300 allows the manufacture of a reversible cutting insert 1200 designed such that it has two through going tapering portions without any need for an undercut. In other words, it provides for the manufacture of a cutting insert having similar characteristics to those of the cutting insert 153 shown in FIG. 22, only reversible.

Turning now to FIG. 56, the mold member 1310 is shown with the reversible cutting insert compact 1200' positioned therein. This is generally the position after the reversible cutting insert compact 1200' has been manufactured, and one of the mold members 1310 has been removed so as to allow removal of the reversible cutting insert compact 1200' from the mold 1300. It is observed in this position that the surface 1323 of the conical portions 1322 is flush against the inner surface 1220.

Figure 56A:
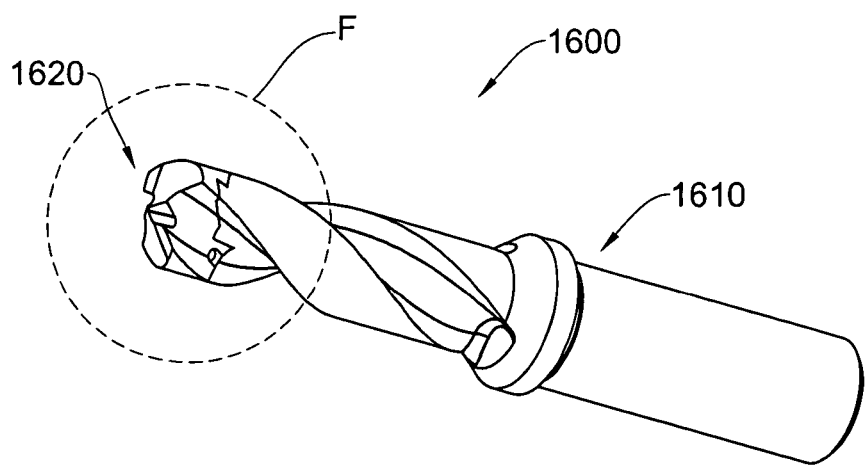
FIG. 56A is a schematic isometric view of a drilling tool comprising a drill holder and a drilling head according to another embodiment of the present invention.
Figure 56B:
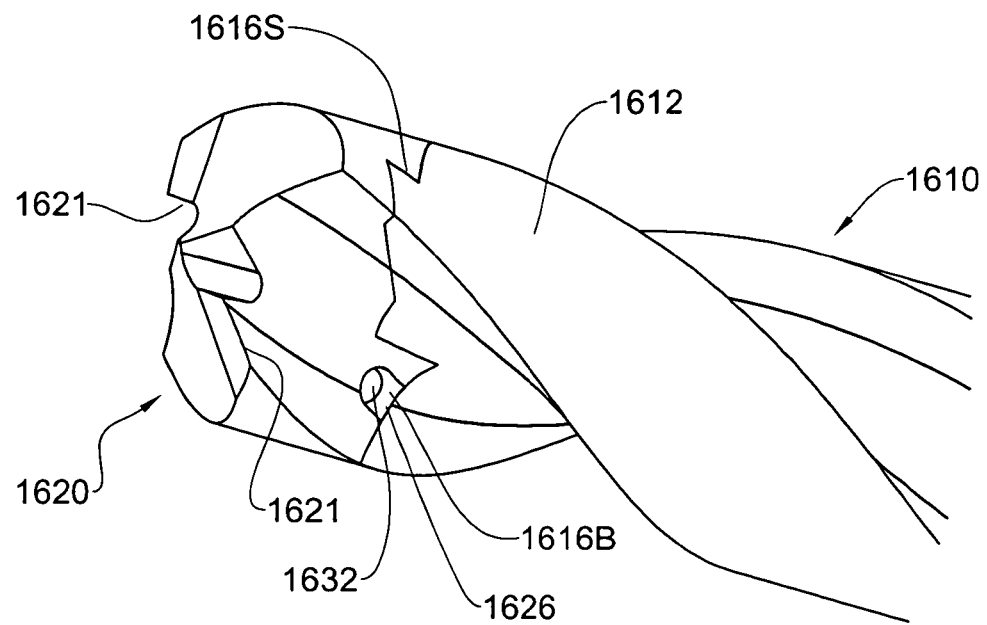
FIG. 56B is an enlarged view of detail F in FIG. 56A.

Attention is now drawn to FIGS. 56A and 56B, where a drilling tool generally designated as 1600 is shown having a construction similar to that of the drilling head shown in FIGS. 45A to 45L. For convenience, numbers designating similar elements of the drilling tool 1600 have been upped by a thousand with respect to the elements shown in FIGS. 45A to 45L.

The drilling tool 1600 comprises a drilling tool holder 1610 and a drilling head 1620 mounted thereon using a securing mechanism 1630 as previously described, comprising a securing pin 1632 and a biasing spring (not shown).

The drilling head 1620 has a body formed with two cutting edges 1621, and two mounting bores 1626, formed on a respective right and left side of the drilling head 1620. It should be appreciated that the insert bore 1626 is an open bore, i.e. it is in the form of an open channel formed in the side of the drilling head 1620. This is opposed to the drilling head 620 shown in FIGS. 45A to 45L, where the insert bore 626 is in the form of a hole.

Figure 56C:
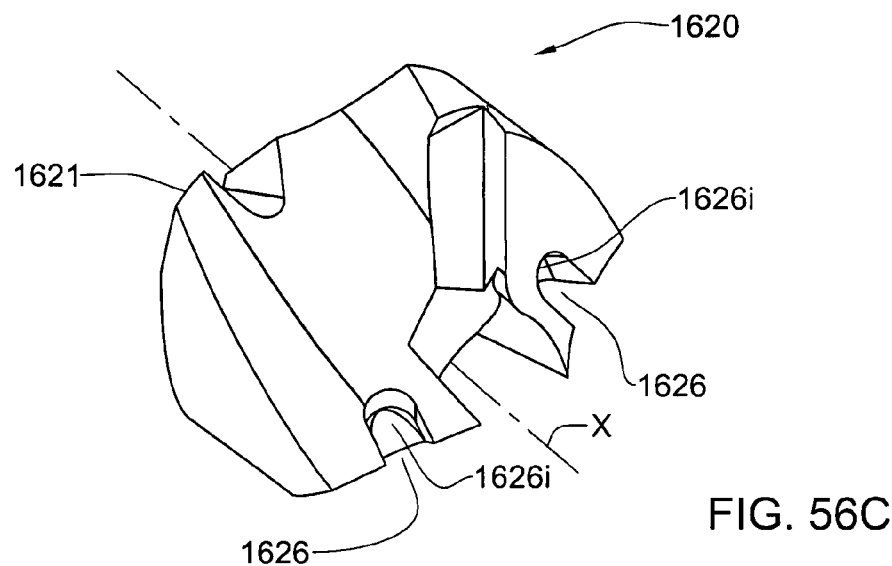
FIG. 56C is a schematic bottom isometric view of the drilling head shown in FIG. 56A.

Observing FIG. 56C, the open bore 1626 allows access to the securing pin 1632 (shown FIG. 56B) in order to dismount the drilling head 1620 from the drilling tool holder 1610. The drilling head 1620 further has within the open bore 1626 a contact surface 1626i adapted for coming in contact with the securing pin 1632 of the securing mechanism 1630.

It is also observed that since the insert bores 1626 are open from the side rather than from top (as shown in FIGS. 45A to 45L), in order to dismount the drilling head 1620 from the drilling tool holder 1610, the tool required to simultaneously depress both securing pins 1632 should be able to access the insert bores 1626 from both sides. This may be achieved by two individual tools, e.g. two screw drivers, or a single tool have two extensions adapted for insertion into the insert bores 1626.

Figure 57A:
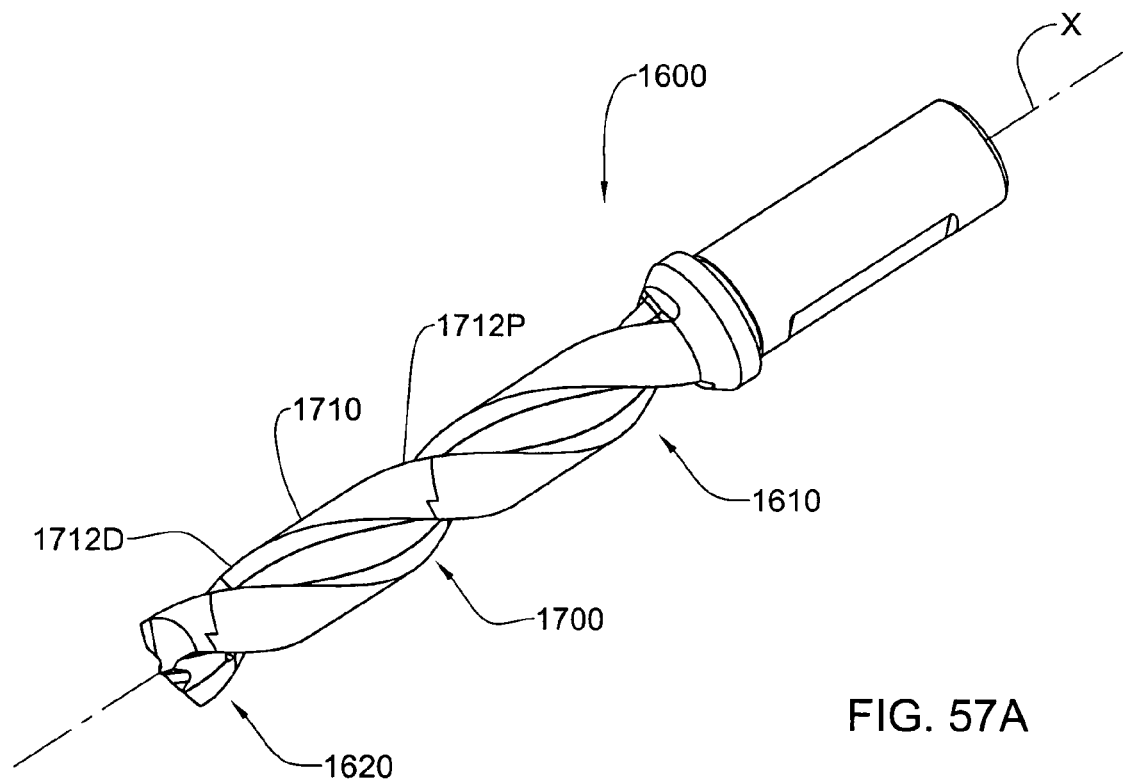
FIG. 57A is a schematic isometric view of the drilling tool shown in FIGS. 56A and 56B, further comprising an extension member according to another aspect of the present invention.
Figure 57B:
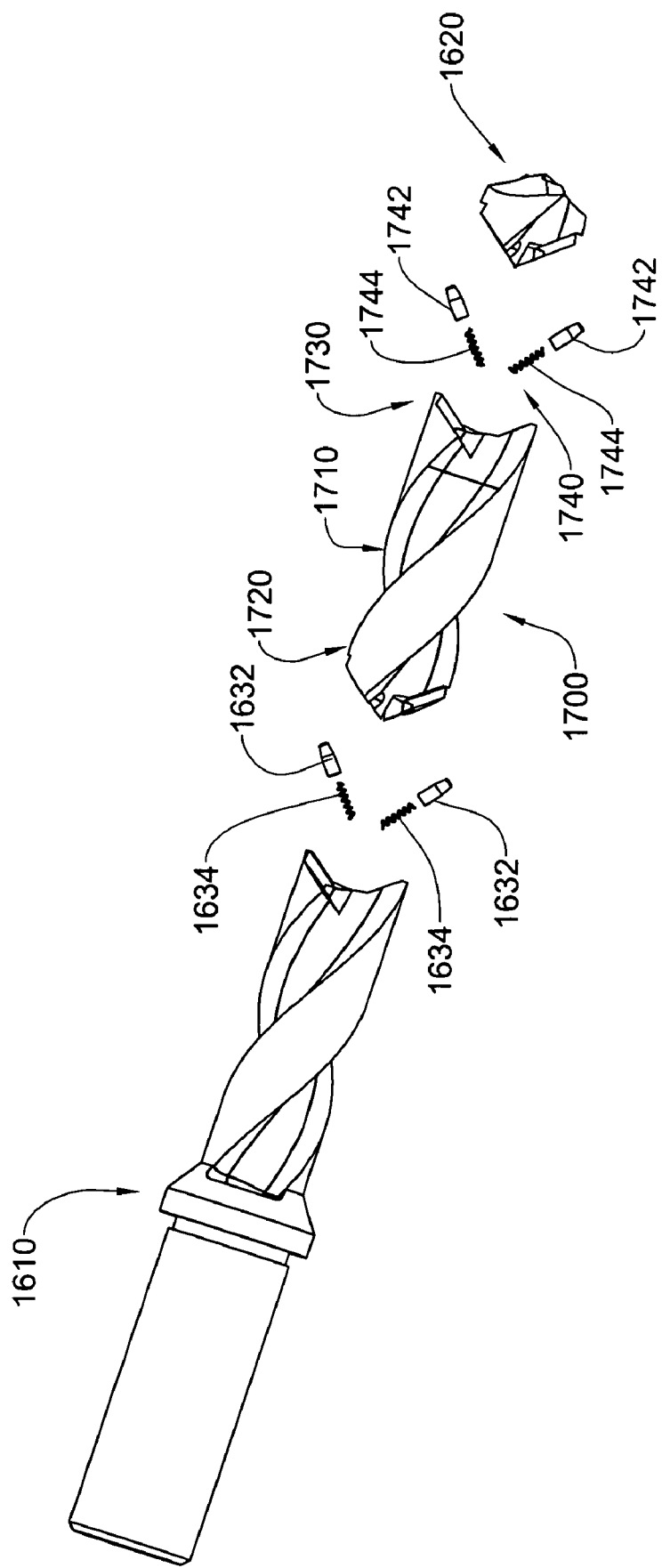
FIG. 57B is a schematic exploded isometric view of the drilling tool shown in FIG. 57A.

Turning now to FIGS. 57A and 57B, the drilling tool 1600 is shown comprising an extension member 1700 positioned between the drilling tool holder 1610 and the drilling head 1620. The body 1710 of the extension member 1700 is arranged such that a proximal end 1712$_P$ thereof is connected to the drilling tool holder 1610 and the distal end 1712$_D$ thereof is connected to the drilling head 1620.

Such an arrangement is achieved by the unique design of the extension member 1700—the proximal end 1712$_P$ thereof is designed with a mounting portion 1720 having a construction generally similar to that of the mounting portion of the drilling head 1620, and the distal end thereof being formed with a securing portion 1740 having a constructions similar to the securing portion of the drilling tool holder 1610.

Figure 58A:
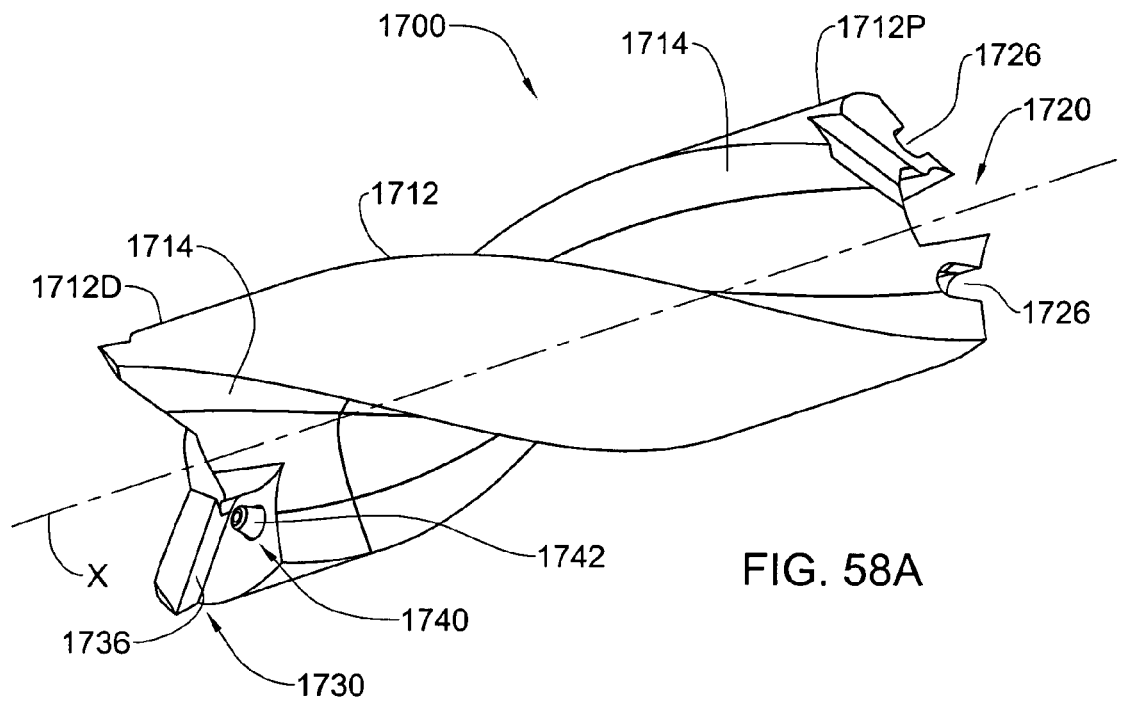
FIG. 58A is a schematic isometric view of the extension member shown in FIGS. 57A and 57B.
Figure 58B:
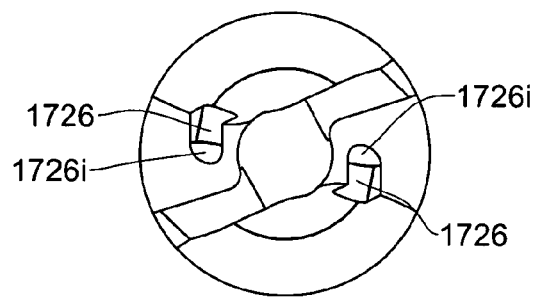
FIG. 58B is a schematic bottom view of the extension member shown in FIG. 58A.
Figure 58C:
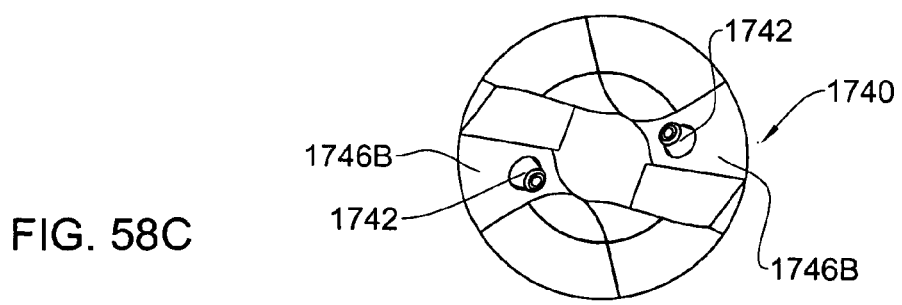
FIG. 58C is a schematic bottom view of the extension member shown in FIG. 58A.

Reference is now drawn to FIGS. 58A to 58C, in which the extension member 1700 is shown. It is observed that the mounting portion 1720 of the extension member 1700 is also formed with two open bores 1726 similar to the insert bores 1626 of the drilling head 1620, and with a contact surface 1726i adapted to engage the securing pin 1632 of the drilling tool holder 1610. It is also observed that the securing portion 1730 of the extension member 1700 comprises a securing mechanism 1740 having two securing pins 1742 and two base surfaces 1746, adapted for mounting and securing thereon of the drilling head 1620 in a similar manner to the securing mechanism 1630 of the drilling tool holder 1610.

It is also noticed that the body 1710 of the extension member 1700 is formed with helical channels 1714 spiraling about the central axis X and adapted to smoothly continue the channel pattern of both the drilling tool holder 1610 and of the drilling head 1620.

It should be appreciated that such an extension member 1700 provides for effectively extending the reach of a drilling tool 1600. It should also be appreciated that a plurality of extension members 1700 may be articulated to one another in a chain like manner to form an extremely long drilling tool 1600.

It should also be noted that an extension member may be formed with a securing portion adapted for securing thereon a drilling head which is of different diameter, or of different dimensions than those of the drilling head used in conjunction with the tool holder 1600.

According to one example, the extension member is of consistent diameter along the longitudinal axis thereof, and the securing portion of the extension member is designed for mounting thereon of the larger/smaller drilling head, e.g. the securing pins are respectively farther/closer apart from one another. According to another example, the extension member may be tapering, i.e. having a diameter which increase/decrease towards the distal end thereof, such that the it is adapted for mounting thereon a larger/smaller drilling head.

According to the above disclosed example, a kit may be provided comprising a plurality of extension members 1700 having various diameters and lengths. For example, a kit may comprise a set of several extension members 1700 all having the same diameter, but varying in length, allowing an operator to extend the length of the drilling tool 1600 to a desired amount according to a desired operation. In addition, a kit may comprise a set of several extension members 1700 all having the same length, but varying in diameter, allowing an operator to use various drilling diameters for various desired operations. A kit may also comprise both sets, i.e. extension members of varying length and of varying diameter.

Figure 59A:
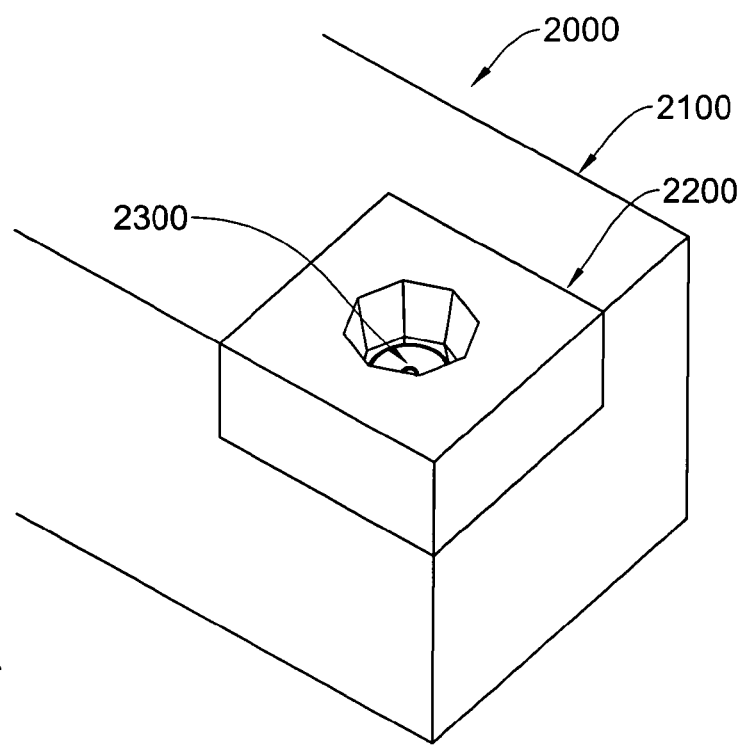
FIG. 59A is a schematic isometric view of a cutting tool comprising a cutting insert and a securing pin according to another embodiment of the present invention.

Attention is now drawn to FIG. 59A, in which a turning tool generally designated as 2000 is shown comprising a turning tool holder 2100, a cutting insert 2200 and a securing mechanism 2300. The securing mechanism 2300 operates in a much similar manner to the previously disclosed embodiments, i.e. with a securing pin 2310 (shown FIGS. 59A to 60) and a biasing spring 2340 (shown FIGS. 59D and 59E).

Figure 60:
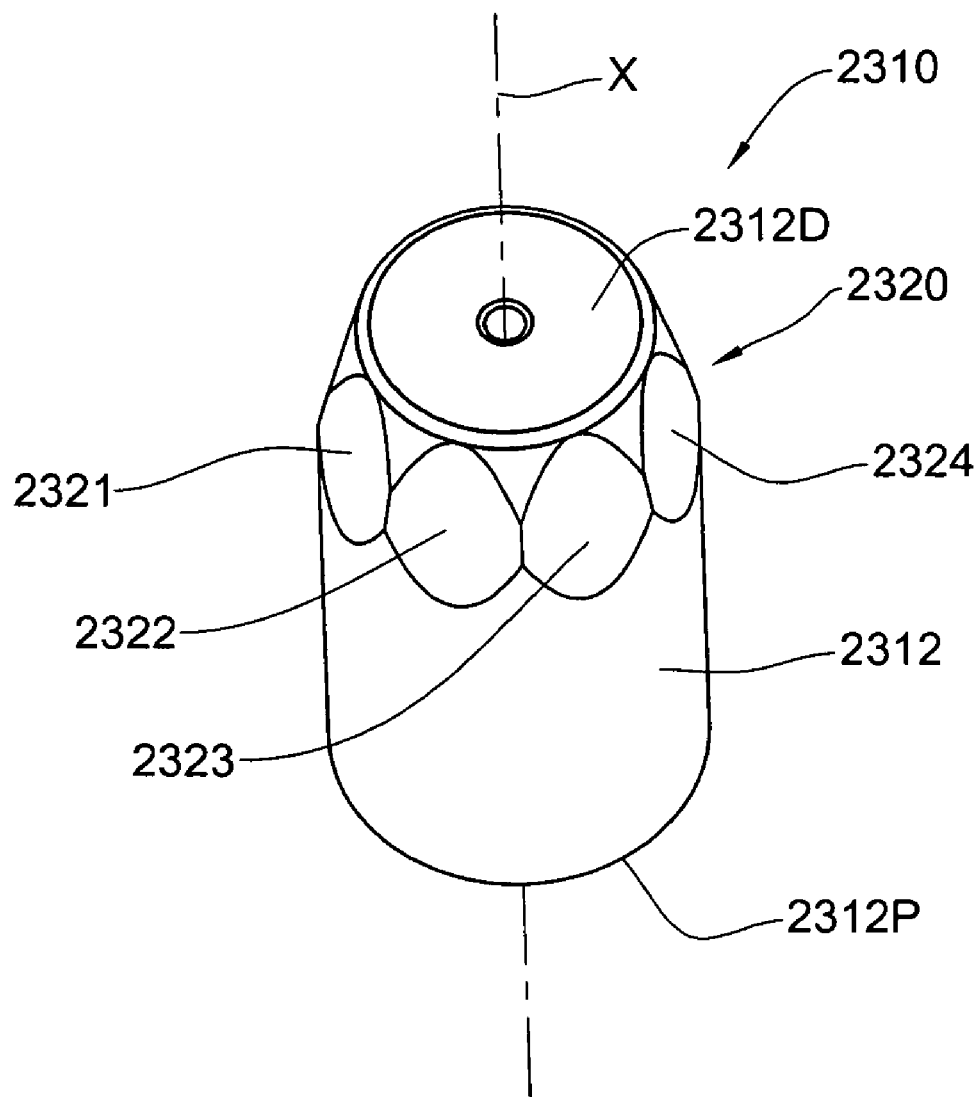
FIG. 60 is a schematic isometric view of the securing pin shown in FIG. 59A.
Figure 61A:
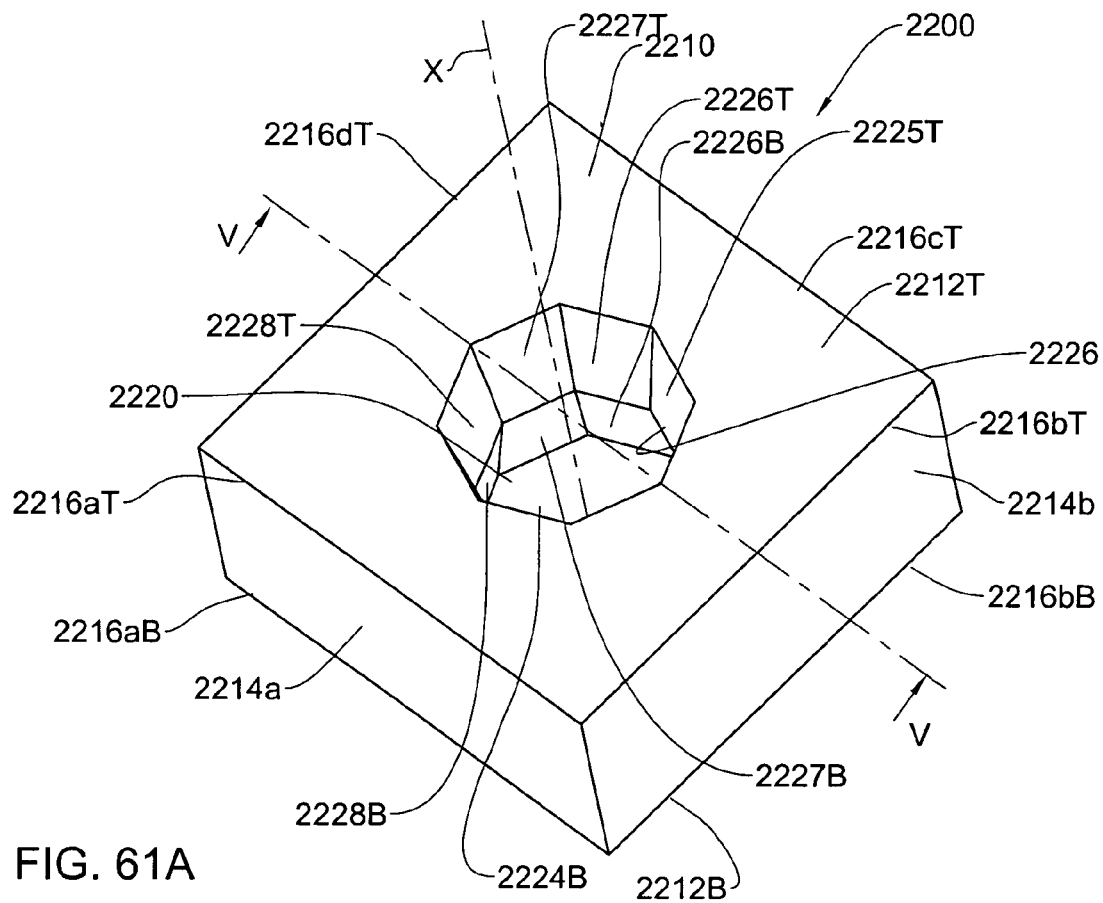
FIG. 61A is a schematic isometric view of the cutting insert shown in FIG. 59A.
Figure 61B:
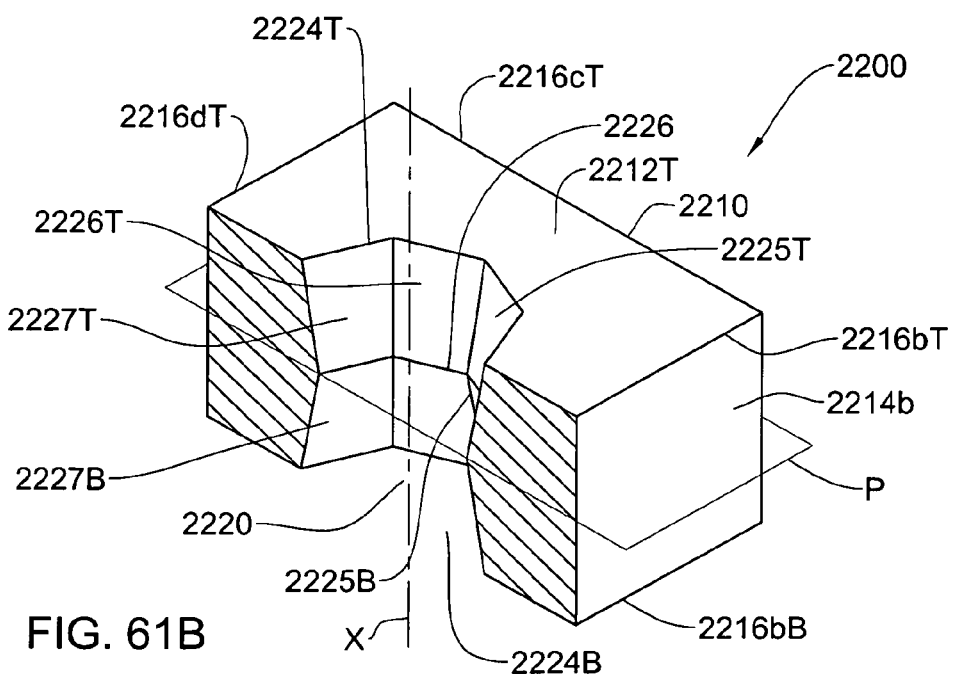
FIG. 61B is a schematic cross-section view of the cutting insert shown in FIG. 61A taken along line V-V in FIG. 61A.

With particular reference to FIGS. 60 to 61B, it is observed that the cutting insert 2200 is formed with a body 2210 having a top face 2212T and a bottom face 2212B, with four side walls 2214a to 2214d extending therebetween. The cutting insert 2200 further has eight cutting edges defined at the intersections of the top face 2212T and the bottom face 2212B with the side walls 2214a to 2214d, the cutting edges being respectively designated as 2216aT, 2216aB, 2216bT, 2216bB, 2216cT, 2216cB, 2216dT, 2216dB, where the little index refers to the side wall, and the big index refers to a top or a bottom cutting edge of the side wall.

The cutting insert 2200 is also formed with a central faceted bore 2220 having a central axis X, and symmetric about a plane P (shown FIG. 61B) extending between to the top face 2212T and the bottom face 2212B and parallel thereto. The faceted bore 2220 is formed with two sets securing facets, one set of securing facets extending from the top face 2212T towards the plane P, and hence referred to as top securing facets, and another set of securing facets extending from the bottom face 2212B towards the plane P, and hence referred to as bottom securing facets.

Thus, each top securing facet is bordered on the left and right side thereof by an adjacent top securing facet, from top by the intersection line with the top face 2212T, and from bottom by the intersection line with a corresponding bottom securing facet. Similarly, each bottom securing facet is bordered on the left and right side thereof by an adjacent bottom securing facet, from bottom by the intersection line with the bottom face 2212B, and from top by the intersection line with a corresponding top securing facet.

According to the above design, there may be defined:
- a top opening 2224T defined by the intersection lines of the top securing facets with the top face 2212T;
- a bottom opening 2224B defined by the intersection lines of the bottom securing facets with the bottom face 2212B; and
- a central opening 2226 defined by the intersection lines between the top securing facets and the bottom securing facets.

With particular reference to FIGS. 61A and 61B, the bore 2220 of the cutting insert 2200 is formed with eight top faces 2221T to 2228T and eight bottom faces 2221B to 2228. The top securing facets 2221T to 2228T taper towards the plane P such that the intersection line thereof with the top face 2212T is greater in length than the intersection line thereof with a corresponding bottom securing facet. Similarly, the bottom securing facets 2221B to 2228B taper towards the plane P such that the intersection line thereof with the bottom face 2212B is greater in length than the intersection line thereof with a corresponding top securing facet.

It is also noted that the top and bottom securing facets 2221T to 2228T and 2221B to 2228B respectively are arranged such that the intersection lines thereof with the top and bottom faces 2212T and 2212B respectively are not parallel to the side walls 2214a to 2214d, but rather at an angle of 45° thereto.

The advantages of the above design will become evident with respect to the mounting of the cutting insert 2200 onto the turning tool holder 2100 which will be discussed with reference to FIGS. 59B to 59E.

Turning now to FIG. 60, a securing pin 2310 of the securing mechanism 2300 is shown comprising a body 2312 extending along a central axis X and having a proximal end 2312P adapted for being received within a corresponding bore 2130 (shown FIGS. 59D and 59E) of the turning tool holder 2100, and a distal end 2312D adapted for protruding from the turning tool holder 2100.

The distal end 2312D is formed with a securing arrangement 2320, having a plurality of pin securing facets disposed about the central axis X. The pin securing facets are inclined at an angle so as to form a conic-like portion. In this particular example, the securing pin is formed with eight pin securing facets, designated 2321 to 2328 respectively.

Figure 59B:
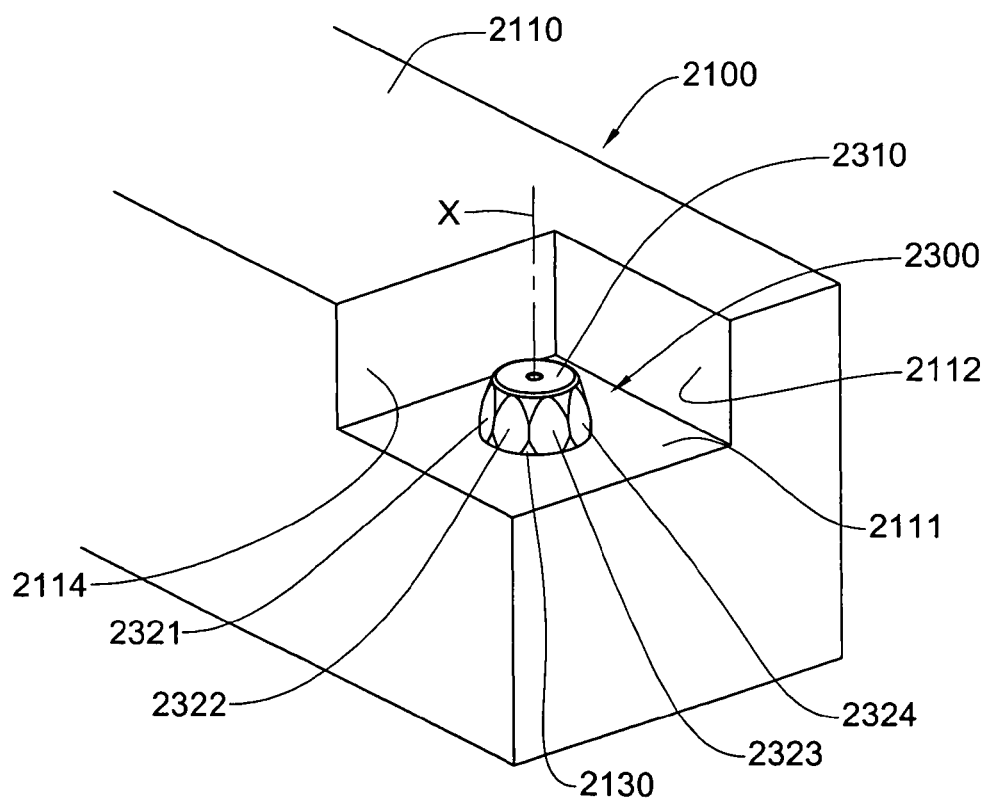
FIG. 59B is a schematic isometric view of the cutting tool shown in FIG. 59A shown without the cutting insert.

Attention is now drawn to FIG. 59B, the turning tool holder 2100 is shown before the cutting insert 2200 is mounted thereon. The turning tool holder 2100 has a body 2110 and formed with a seat defined by a bottom face 2111 and two side walls 2112 and 2114. The bottom face 2111 is formed with a pin bore 2130 receiving therein the securing pin 2310.

It is observed that the distal end 2312D of the securing pin 2310 protrudes from bottom face 2111 of the seat of the turning tool holder 2100 in a manner similar to that disclosed with respect to previous embodiments. It is also noted that the securing pin 2310 is free to rotate about the central axis X thereof.

Figure 59C:
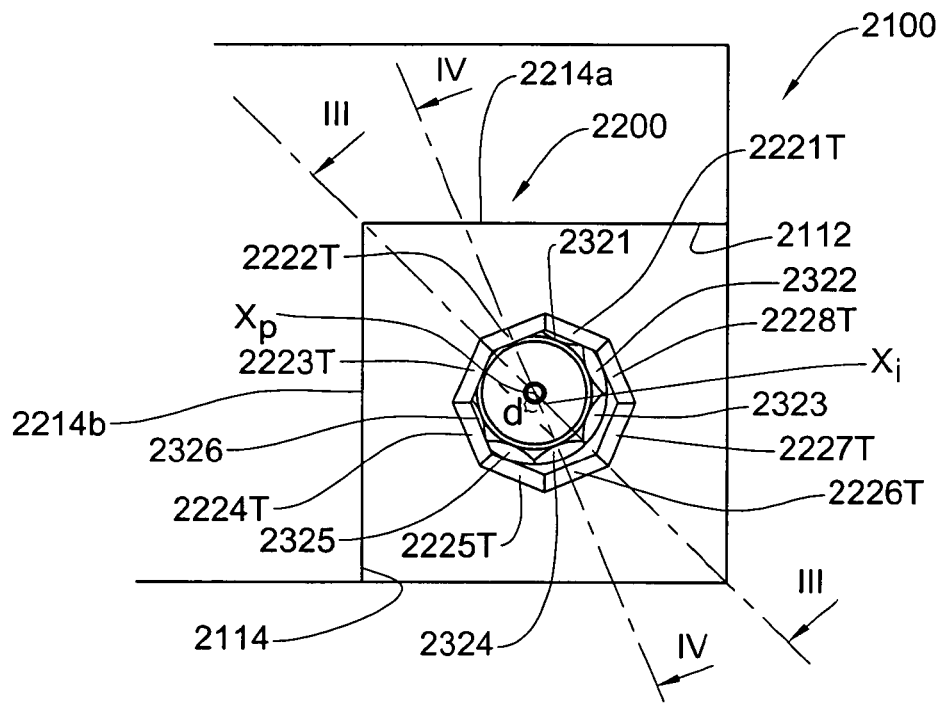
FIG. 59C is a schematic top view of the cutting tool shown in FIG. 59A.
Figure 59D:
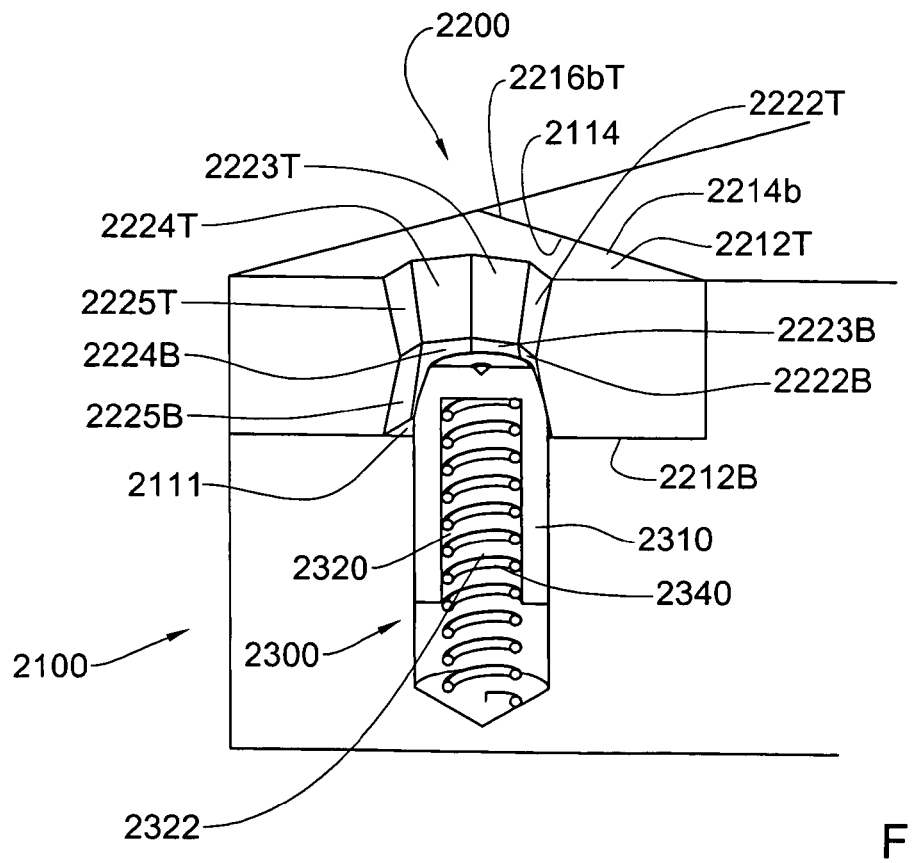
FIG. 59D is a schematic cross-section view taken along line III-III in FIG. 59C.
Figure 59E:
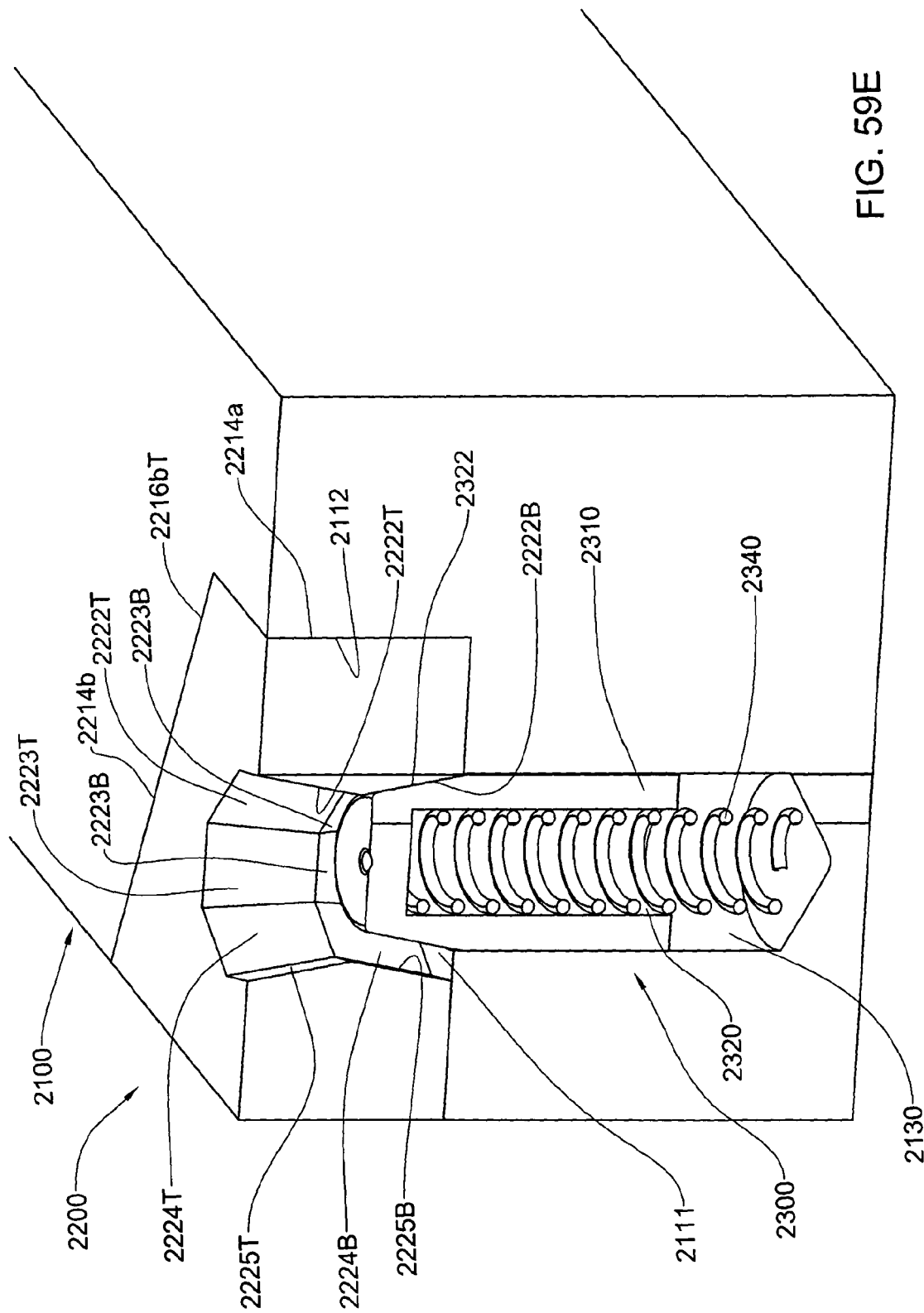
FIG. 59E is a schematic cross-section view taken along line IV-IV in FIG. 59C.

Turning now to FIGS. 59C to 59E, when the cutting insert 2200 is mounted onto the seat of the cutting too holder 2100, the arrangement is such that the securing pin 2310 comes in contact with the cutting insert 2200 via two bottom securing facets thereof.

In particular, it is observed that the central axis $X_P$ of the securing pin 2310 is at an offset d to the central axis $X_i$ of the bore 2220 of the cutting insert 2200. Thus, when the cutting insert 2200 is mounted onto the seat of the turning tool holder 2100, the securing pin 2310 is urged up by the biasing spring 2340 so that two of the pin securing facets thereof contact two of the bottom securing facets of the cutting insert 2200. It is also noted that the angle δ at which the pin securing facets 2321 to 2328 are formed is equal to the angle δ at which the top securing facets 2221T to 2228T, and bottom facets 2221B to 2228B taper towards the plane P.

With particular reference to FIGS. 59D and 59E, the pin securing facets 2322 and 2323 come in contact with the bottom securing facets 2222B and 2223B, urging the cutting insert 2200 towards the corner between the side walls 2112 and 2114 of the turning tool holder 2100.

Such an arrangement provides for firmer securing of the cutting insert 2200 by the securing pin 2310 within the seat of the turning tool holder 2100. It should also be appreciated that since the securing pin 2310 is free to revolve about the central axis $X_P$ thereof, if the pin securing facets thereof are not aligned with the corresponding bottom securing facets of the cutting insert 2200, it will simply be urged to revolve about its axis so as to assume the position shown in FIGS. 59C to 59E.

In addition, since in the above arrangement, contact between the securing pin 2310 and the cutting insert 2200 is achieved through two flat surfaces, the cutting insert 2200 is held much firmer within the seat of the turning tool holder. Moreover, it is appreciated that cutting inserts, in general, are made of an extremely hard material, in comparison with which, steel (from which the securing pin is usually manufactured) is very soft. In the event a circular pin is used (without a faceted securing arrangement), the contact between the securing pin and the cutting insert is achieved either through a contact line, or a contact point. Such contact will yield to considerable ware of the securing pin over a short period of time. Using a faceted securing pin 2310 as disclosed above, allows prolonging the life span of the securing pin 2310 with respect to a securing pin previously disclosed, for example, with reference to FIG. 34A.

Figure 62A:
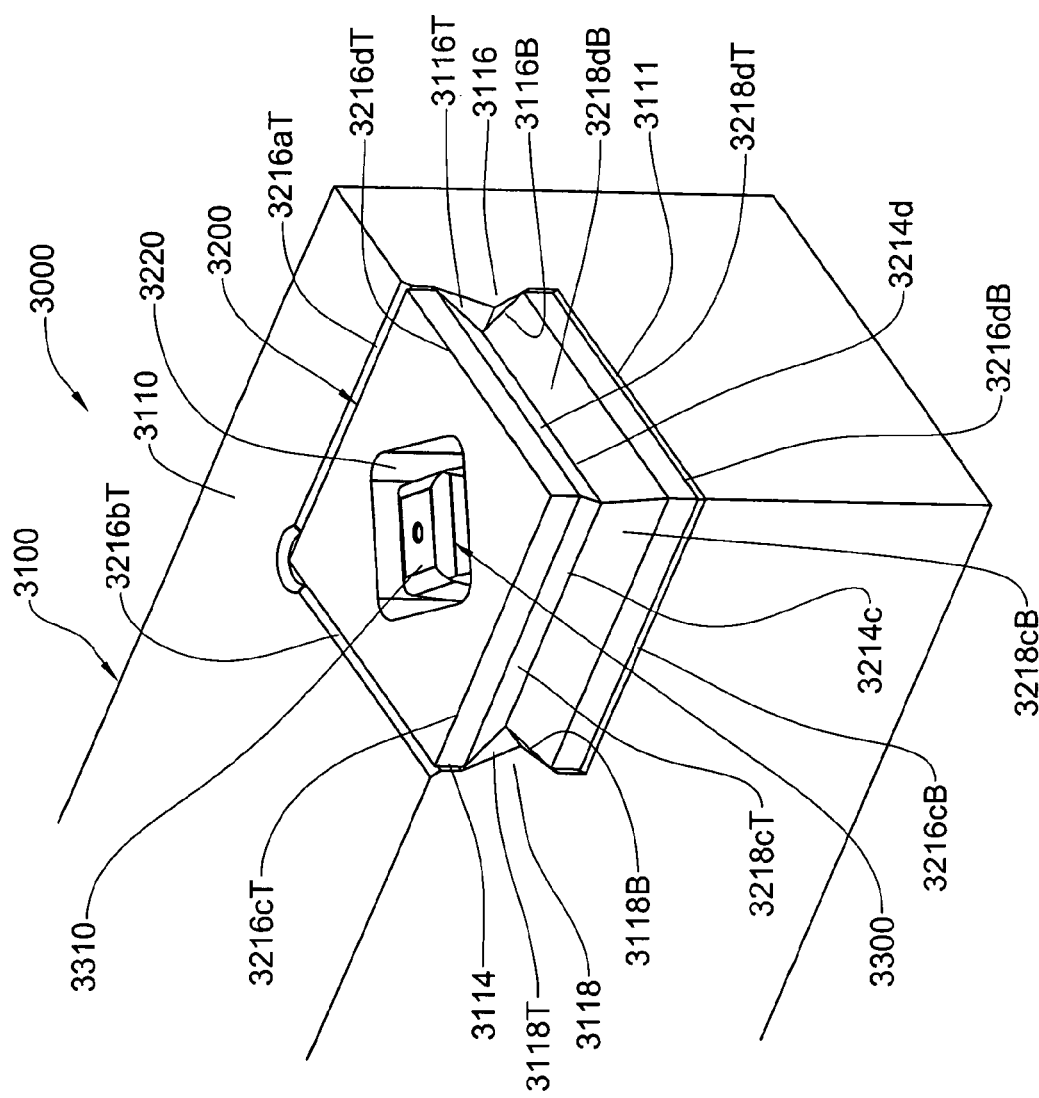
FIG. 62A is a schematic isometric view of a cutting tool comprising a cutting insert and a securing pin according to yet another embodiment of the present invention.

Attention is now drawn to FIG. 62A where a cutting tool generally designated as 3000 is shown comprising a cutting tool holder 3100, a cutting insert 3200 and a securing mechanism 3300. The securing mechanism 3300 operates in a much similar manner to the previously disclosed embodiments, i.e. with a securing pin 3310 (shown FIGS. 62A to 63) and a biasing spring 3340 (shown FIG. 62C).

The cutting tool holder 3100 is formed with a seat defined by seat defined by a bottom face 3111 and two side walls 3112 and 3114. Each of the side walls 3112 and 3114 is formed with a securing ridge 3116 and 3118 respectively, defined by respective top ridge faces 3116T and 3118T and bottom ridge faces 3116B and 3118B. The securing ridges 3116 and 3118 are used in a manner similar to the ridges 371 shown in FIG. 38.

In addition, the bottom face 3111 is formed with a pin bore 3130 (shown FIG. 62C) receiving therein the securing pin 3310.

Figure 64:
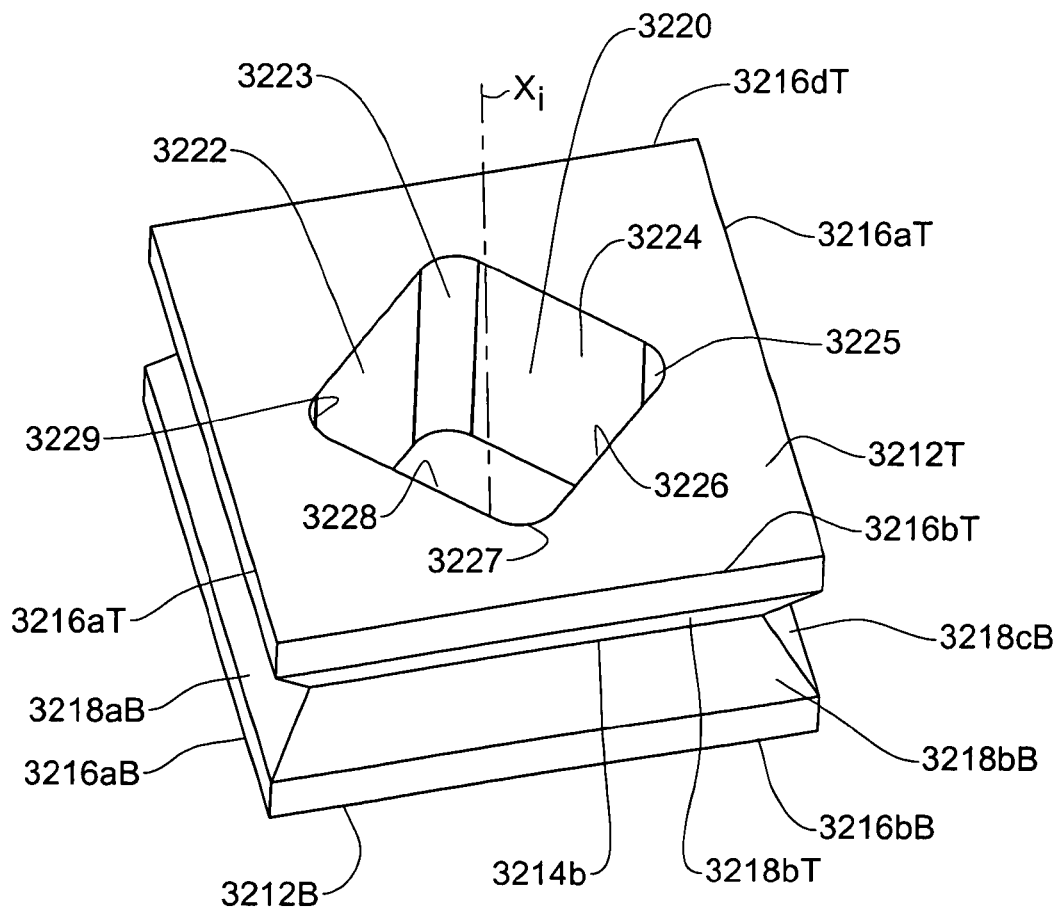
FIG. 64 is a schematic isometric view of the cutting insert shown in FIG. 62A.

Turning to FIG. 64, the cutting insert 3200 is shown formed with a body 3210 having a top face 3212T and a bottom face 3212B, and four side walls 3214a to 3214d extending therebetween. The intersection between the side walls 3214a to 3214d and the top and bottom face 3212T and 3212B respectively, defines eight cutting edges designated 2216aT, 2216aB, 2216bT, 2216bB, 2216cT, 2216cB, 2216dT and 2216dB respectively. In addition, each side wall 3214a to 3214d is formed with a v-shaped groove defined by a top and a bottom groove face, designated 2218aT, 2218aB, 2218bT, 2218bB, 2218cT, 2218cB, 2218dT and 2218dB respectively. The v-shaped grooves are adapted for further securing the cutting insert 3200 into the seat of the cutting tool 3100 in a manner similar to that described with respect to FIGS. 38 and 39A.

The cutting insert 3200 is also formed with a central bore 3220 defined by four inner securing surfaces 3222, 3224, 3226 and 3228, connected via rounded fillet surfaces 2223, 2225, 2227 and 2229 respectively. It is noted that the inner surfaces 3222, 3224, 3226 and 3228 are generally planar and extend at an angle of 45° with respect to the side walls 3214a to 3214d.

Figure 62C:
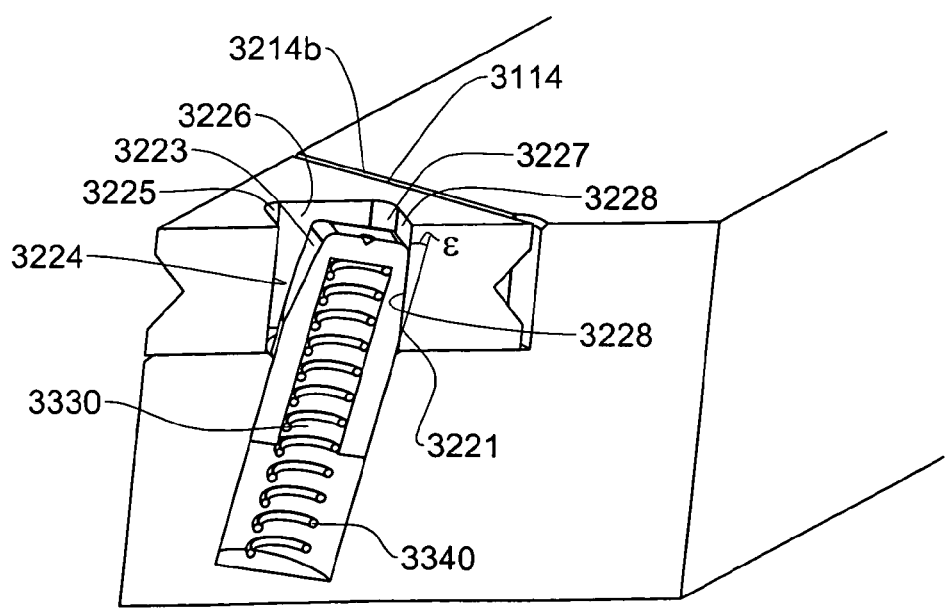
FIG. 62C is a schematic cross-section view taken along line III-III in FIG. 62A.
Figure 63:
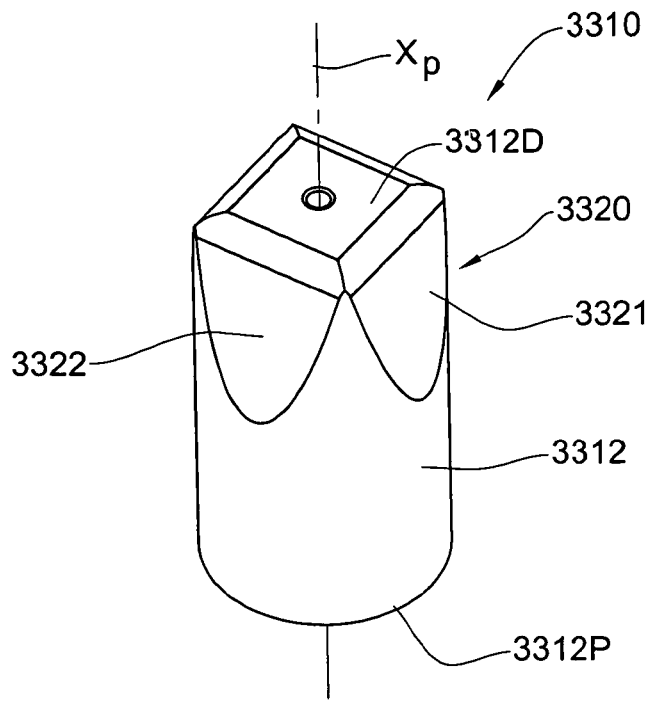
FIG. 63 is a schematic isometric view of the securing pin shown in FIG. 62A.

Turning to FIG. 63, the securing pin 3310 is shown comprising a body 3312 extending along a central axis $X_P$ and having a proximal end 3312P adapted for being received within a corresponding bore 3130 (shown FIG. 62C) of the cutting tool holder 3100, and a distal end 3312D adapted for protruding from the cutting tool holder 3100.

The distal end 3312D is formed with a securing arrangement 3320, having a plurality of pin securing facets disposed about the central axis $X_P$. The pin securing facets are inclined at an angle so as to form a pyramid-like portion. In this particular example, the securing pin 3310 is formed with four pin securing facets, designated 3321 to 3324 respectively.

Figure 62B:
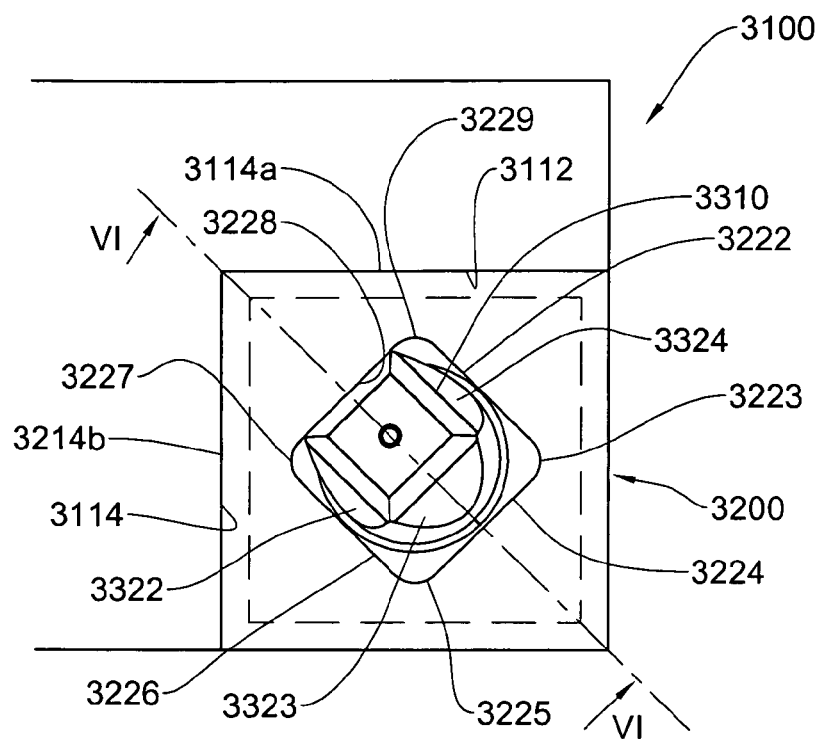
FIG. 62B is a schematic top view of the cutting tool shown in FIG. 62A.

Attention is now drawn to FIGS. 62B and 62C, where the cutting insert 3200 is shown mounted into the seat of the cutting tool holder 3100. In this position, the bottom face 3212B of the cutting insert 3200 is flush against the bottom face 3111 of the cutting tool holder 3100, and the securing grooves 3116 and 3118 of the cutting tool holder 3100 are received within respective securing grooves 3118a and 3118b so as to prevent disengagement of the cutting insert 3200 from the bottom face 3111 of the cutting tool holder 3100.

It is observed that the pin bore 3130 has an axis X angled to the bottom face 3111 of the cutting tool holder 3100, therefore causing the central axis $X_P$ of the securing pin 3310 to be angled to the bottom surface 3111. Thus, in the position shown in FIGS. 62B and 62C, the securing pin 3310 applies pressure to the cutting insert 3200 via the inner surface 3222 of the bore 3220, so as to urge it towards the corner of the seat of the cutting tool holder 3100 defined by the intersection between the side walls 3112 and 3114.

In particular, it is noted that the facet angle $\epsilon$ of the securing pin 3310 is equal to the tilt angle at which the central axis X of the pin bore 3130 is angled to the bottom face 3111, allowing full contact between the pin securing facet (in this case 3321) and the inner securing surface 3228 of the cutting insert 3200.

It is also appreciated that using the faceted securing pin 3310 as disclosed above, allows prolonging the life span of the securing pin 3310 with respect to a securing pin previously disclosed, for example, with reference to FIG. 34A.

Figure 65:
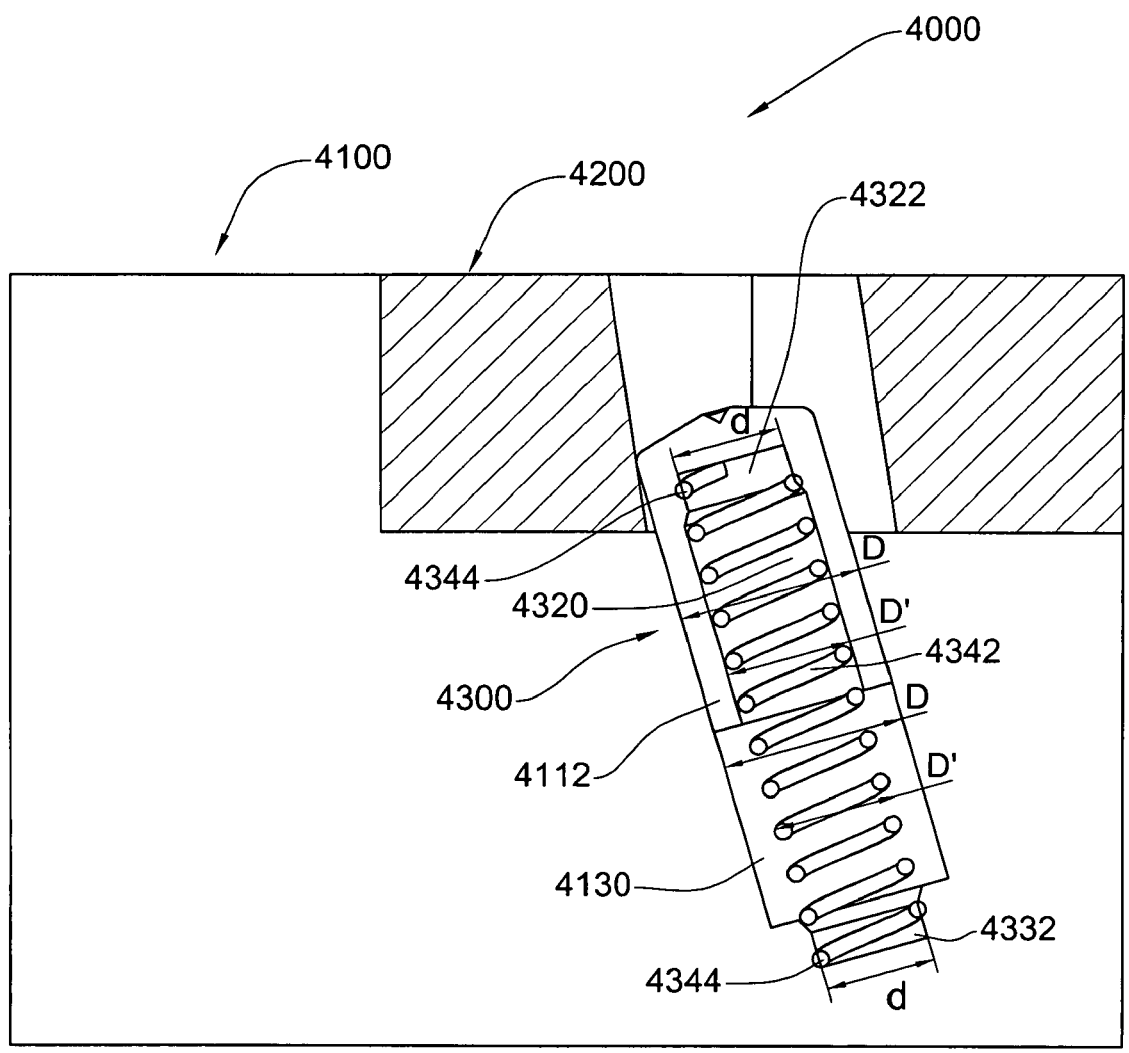
FIG. 65 is a schematic cross-section view of a cutting tool comprising a biasing spring according to one embodiment of the present invention.

Attention is now drawn to FIG. 65 where a cutting tool generally designated as 4000 is shown comprising a tool holder 4100, a cutting insert 4200 and a securing mechanism 4300. The securing mechanism 4300 operates in a much similar manner to the previously disclosed embodiments, i.e. with a securing pin 4310 (as 3310 shown FIGS. 62A to 63) and a biasing spring 4340 (as 3340 shown FIG. 62C).

The cutting tool holder 4100 is formed with a bore 4130 of diameter D and a nook 4132 at a proximal end thereof having a diameter d<D. The securing pin 4310 has a body 4312 of diameter D, corresponding to the diameter D of the bore 4130, and is formed with a pin bore 4320 of diameter D'<D, and a nook 4322 at a distal end thereof having a diameter d equal to the diameter d of the nook 4132, such that d<D'<D.

It is observed that the biasing spring 4340 is formed as a coil having a nominal diameter D' corresponding to the diameter D' of the pin bore 4320. In addition, the first and last wraps 4344 of the biasing spring 4340 are of smaller diameter d' which is slightly greater than the diameter d.

The design disclosed above allows the first and last wraps 4344 of the biasing spring 4340 to be received within the respective nooks 4132 and 4322 such that they apply pressure to the nooks 4132 and 4322 due to the difference in diameters (d'>d). This pressure allows the first and last wraps 4344 to firmly engage the respective nooks 4132 and 4322, providing the necessary means for preventing disengagement of the biasing spring 4340 from the securing pin 4310 and/or the cutting tool holder 4100.

Figure 66A:
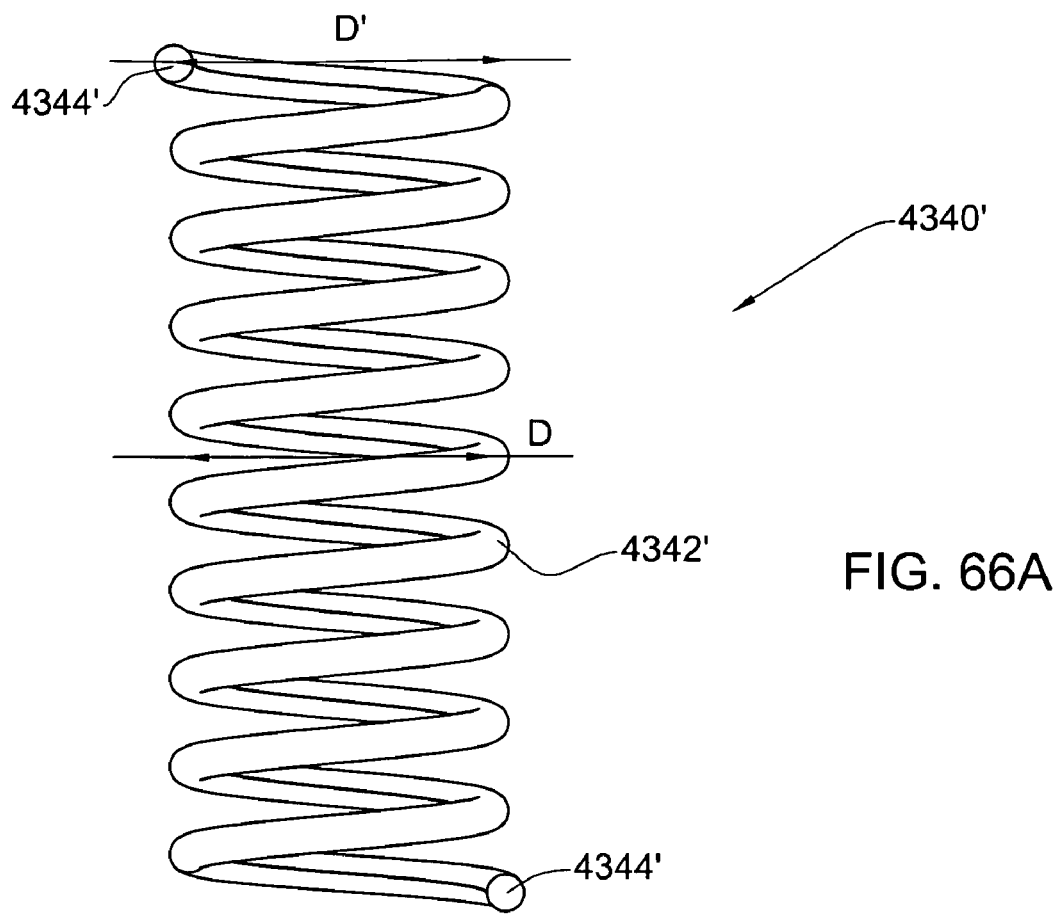
FIGS. 66A and 66B are respective schematic front and bottom views of a biasing spring according to another embodiment of the present invention.
Figure 66B:
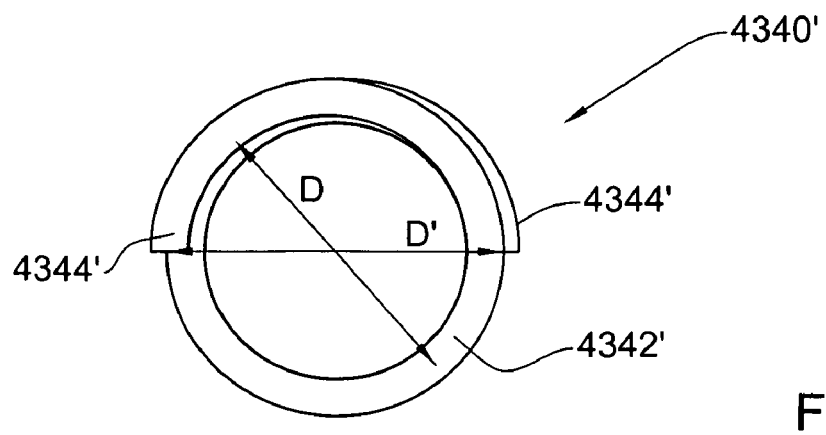

Turning now to FIGS. 66A and 66B, another embodiment of a biasing spring generally designated as 4340' is shown comprising a spring body 4342' having a nominal diameter D. The first and last wraps 4344' of the biasing spring 4340' are shown to have a slightly greater nominal diameter D'>D.

Such a design allows the biasing spring to be received within a bore of a cutting tool holder (not shown) having a diameter D, and a securing pin (not shown) having a pin bore of diameter D, with the first wrap 4344' firmly engaged with a proximal end of the bore of the cutting tool holder, and the last wrap 4344' firmly engaged with the distal end of the pin bore so as to achieve a similar effect of preventing disengagement of the securing pin from the bore as disclosed with reference to FIG. 65.

Those skilled in the art to which this invention pertains will readily appreciate that numerous changes, variations, and modification can be made without departing from the scope of the invention, mutatis mutandis.

The invention claimed is:

1. A reversible cutting insert comprising top face, a bottom face, at least one side wall extending therebetween, and a central bore having a central axis X, said central bore extending between said top face and said bottom face, and being formed with at least a first inner surface and a second inner surface, each extending between said top face and said bottom face and each having a respective first and second top rim at said top face and a respective first and second bottom rim at said bottom face, wherein a maximal distance $R_1$ between said first bottom rim and said central axis X is greater than the maximal distance $r_1$ between said first top rim and said central axis X, and a maximal distance $R_2$ from said central axis X of said second top rim is greater than the maximal distance $r_2$ between said second bottom rim and said central axis X.

2. A cutting insert according to claim 1, wherein a minimal distance $R_1'$ between said first bottom rim and said central axis is greater than a minimal distance $r_1'$ between said first top rim and said central axis X, and a minimal distance $R_2'$ between said second top rim and said central axis X is greater than a minimal distance $r_2'$ between said second bottom rim and said central axis X.

3. A cutting insert according to claim 1, wherein the distance $R_1$ equals to the distance $R_2$, and the distance $r_1$ equals to the distance $r_2$.

4. A cutting insert according to claim 1, wherein said first and second surface are symmetric to one another, such that the second surface is identical to the first surface if the cutting insert is turned over.

5. A cutting insert according to claim 1, wherein the bore of said cutting insert is formed with a plurality of inner surfaces depending on the number of top and bottom cutting edges in the cutting insert, the inner surfaces of said cutting insert being arranged in an alternating order such that each inner surface having a top rim with a distance from said central axis greater than that of its corresponding bottom rim, has neighboring thereto an inner surface having a top rim with a distance from said central axis smaller than that of its corresponding bottom rim.

6. A mold for the manufacture of the cutting insert of claim 1, said mold comprising a first mold member and a second mold member, each member comprising a body having a front surface, and formed with a mold cavity in said front surface defined by at least one cavity side wall and a cavity base surface and having a central axis perpendicular to said base surface, each mold member further comprising a molding element projecting from said cavity base surface and generally perpendicular thereto, said molding element being formed with an elevated surface elevated from the base surface, and an external surface extending therebetween such that it forms a cavity base rim defined by the intersection of the external surface with the cavity base surface and an elevated rim defined by the intersection between said external surface and said elevated surface, wherein the distance of said base edge from said central axis is greater than the distance of said elevated edge from said central axis.

7. A mold according to claim 6, wherein the molding element of each of the mold members is formed with two conical portions disposed along an X axis and symmetric about a Y axis, and such that there extend two gaps between the portions along the Y axis.

8. A mold according to claim 7, wherein each of the conical portions has a base rim arc disposed on the base surface and an elevated rim arc elevated above the base surface, said base rim arc having a radius R with respect to the central axis and said elevated rim arc having a radius r with respect to the central axis, the measures of R and r corresponding to the distances R and r of the inner surfaces of the cutting insert.

9. A cutting tool holder configured for mounting thereon a cutting insert having a top face, a bottom face and formed with an insert bore having an inner surface extending between said top and said bottom face; said holder comprising a seat defined by a bottom surface and at least one side wall angled to said bottom surface, a seat bore with a bore axis having an open end at the bottom surface of said seat, and a securing mechanism for securing said cutting insert in said seat, said securing mechanism comprising a securing pin received within said seat bore and having a body with an outer surface extending between a proximal end and a distal end of the body and defining a pin axis therealong, said distal end being formed with a faceted portion, and a displacement arrangement configured for displacing the securing pin along the bore axis of said seat bore between at least a first, mounting position in which said distal end protrudes from within the seat bore through said bottom surface into said seat to a first extent so as to allow said cutting insert to be placed within the seat, having its bottom face aligned against said bottom surface, and a second, securing position in which said distal end protrudes from within the seat bore through said bottom surface into said seat to a second extent, greater than said first extent, so as to allow the faceted portion of said distal end to engage the inner surface of said insert bore, thereby securing said insert in place.

10. A cutting tool holder according to claim 9, wherein said seat bore is non-threaded.

11. A cutting tool holder according to claim 10, wherein in both said mounting position and said securing position, said securing pin remains in engagement with the tool holder, and said proximal end is located within said seat bore.

12. A cutting tool holder according to claim 10, wherein said displacement arrangement is a biasing spring, and wherein switching the securing pin's position to the mounting position is achieved by depression of the biasing spring.

13. A cutting tool holder according to claim 10, wherein said faceted portion is of a tapered shape.

14. A cutting tool holder according to claim 9, wherein said displacement arrangement is separate from the securing pin and is configured to mechanically engage the securing pin.

15. A cutting tool holder according to claim 9, wherein said cutting tool holder constitutes a part of a cutting tool, said cutting tool further comprising a cutting insert having a top face, a bottom face and formed with an insert bore having an inner surface extending between said top and said bottom face, said insert bore being faceted in a manner corresponding to the faceted portion of the distal end of said securing pin such that engagement between the faceted inner surface of said insert bore and the faceted distal end of said securing pin is provided by surface contact between two corresponding facets.

16. A cutting tool holder according to claim 15, wherein said securing pin is free to revolve about said pin axis, so as to spontaneously assume the above engagement.

17. A cutting tool holder according to claim 15, wherein said cutting insert is formed with a side face, and wherein, when the cutting insert is secured within the seat of the cutting tool holder, the securing pin is adapted to apply pressure on the inner surface of said insert bore so as to facilitate firm engagement of said at least one side face with said at least one side wall of said seat.

18. A cutting tool holder according to claim 15, wherein the arrangement of said securing pin and the inner surface of said cutting insert bore is such that the pin axis is at an angle to the inner surface of said cutting insert bore such that a portion of the cutting insert defined between the inner surface and said at least one side face facing the side wall of said seat is fastened between the distal end of said securing pin and said side wall.

19. A cutting insert having a top face, a bottom face and formed with an insert bore configured for engagement of the cutting insert with a corresponding cutting tool holder, said insert bore having a faceted inner surface extending between said top and said bottom face.

20. A method for mounting a cutting insert onto a cutting tool holder, said cutting insert having a top face, a bottom face and formed with an insert bore configured for engagement of the cutting insert with a corresponding cutting tool, said insert bore having a faceted inner surface extending between said top and said bottom face; said cutting tool holder comprising a seat defined by a bottom surface and at least one side wall angled to said bottom surface, a seat bore with a bore axis having an open end at the bottom surface of said seat, and a securing mechanism for securing said cutting insert in said seat, said securing mechanism comprising a securing pin received within said seat bore and having a body with an outer surface extending between a proximal end and a distal end of the body and defining a pin axis therealong, said distal end being formed with a faceted portion, and a displacement arrangement configured for displacing the securing pin along the bore axis of said seat bore between at least a first, mounting position in which said distal end protrudes from within the seat bore through said bottom surface into said seat to a first extent so as to allow said cutting insert to be placed within the seat, having its bottom face aligned against said bottom surface, and a second, securing position in which said distal end protrudes from within the seat bore through said bottom surface into said seat to a second extent, greater than said first extent, so as to allow the faceted portion of said distal end to engage the inner surface of said insert bore, thereby securing said insert in place; said method including the steps of:

i. displacing the securing pin of said tool holder into a first, mounting position in which the distal end thereof protrudes from within the seat bore of the cutting tool holder through said bottom surface into said seat to a first extent;

ii. placing said cutting insert onto said seat such that the bottom face thereof is aligned with the bottom surface of said seat; and iii. moving the cutting insert so as to allow the securing pin to be displaced by the displacement arrangement comprised in said cutting tool holder into a second, securing position in which the faceted portion of said distal end protrudes from within the seat bore through said bottom surface into the bore of said cutting insert to a second extent, greater than said first extent; and iv. rotating said securing pin about the central axis thereof in order to allow surface contact engagement between a facet of the faceted portion of said securing pin and a facet of the faceted inner surface of said insert bore, thereby securing said insert in place.

21. A method according to claim 20, wherein step (i) is performed using the bottom face of the cutting insert, and wherein rotation of said securing pin about the central axis is performed spontaneously due to pressure applied to the faceted distal end thereto by the insert bore of said cutting insert.

22. An extension member configured for the axial extension of a cutting tool constituted by a cutting tool holder according to claim 9 and a cutting insert mounted thereon, said extension member having a body extending along a central axis and formed at a distal end thereof with an extension member securing mechanism adapted for mounting thereon of the cutting insert, and at a proximal end thereof with an extension member mounting portion adapted for mounting said extension member onto said cutting tool holder, said securing mechanism being configured to simulate the securing mechanism of said cutting tool holder and said mounting portion being configured to simulate the mounting portion of said cutting insert.

23. An extension member according to claim 22, wherein said cutting tool holder is a drilling tool holder and said cutting insert is a drilling head, the body of said extension member is formed along the central axis with channels adapted for evacuation of chips corresponding to those formed on the drilling head and/or drilling tool holder.

24. An extension member according to claim 23, said extension member constituting a part of a kit for a cutting tool holder, said kit comprising a plurality of extension members.

* * * * *